(12) United States Patent
Resch et al.

(10) Patent No.: US 10,140,178 B2
(45) Date of Patent: Nov. 27, 2018

(54) VERIFYING A STATUS LEVEL OF STORED ENCODED DATA SLICES

(71) Applicant: CLEVERSAFE, INC., Chicago, IL (US)

(72) Inventors: Jason K. Resch, Chicago, IL (US); Kumar Abhijeet, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/680,575

(22) Filed: Apr. 7, 2015

(65) Prior Publication Data
US 2015/0355966 A1 Dec. 10, 2015

Related U.S. Application Data

(60) Provisional application No. 62/008,207, filed on Jun. 5, 2014.

(51) Int. Cl.
*G06F 11/10* (2006.01)
*H04L 29/08* (2006.01)
(Continued)

(52) U.S. Cl.
CPC ...... *G06F 11/1076* (2013.01); *G06F 11/0709* (2013.01); *G06F 11/0727* (2013.01); *G06F 11/0775* (2013.01); *G06F 17/30* (2013.01); *H04L 67/1097* (2013.01); *G06F 2211/1004* (2013.01); *G06F 2211/1028* (2013.01)

(58) Field of Classification Search
CPC ............. G06F 11/0775; G06F 11/0709; G06F 11/1076; G06F 11/0727; H04L 67/1097
See application file for complete search history.

(56) References Cited

U.S. PATENT DOCUMENTS

| 4,092,732 A | 5/1978 | Ouchi |
|---|---|---|
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Kyle Vallecillo
(74) *Attorney, Agent, or Firm* — Garlick & Markison; Timothy W. Markison; Patricia A. Markison

(57) ABSTRACT

A method begins by a processing module of a dispersed storage network (DSN) retrieving a decode threshold number of encoded data slices of a set of encoded data slices from a first grouping of storage units of the DSN. The method continues with the processing module determining a first status level indication of the retrieved decode threshold number of encoded data slices and sending check status request messages to a second grouping of storage units of the DSN. The method continues with the processing module receiving check status response messages and processing the check response messages to produce a second status level indication. When the second status level indication is substantially equal to the first status level indication, the method continues with the processing module indicating that the decode threshold number of encoded data slices is of a common status level as other encoded data slices of encoded data slices.

24 Claims, 57 Drawing Sheets

(51) Int. Cl.
*G06F 11/07* (2006.01)
*G06F 17/30* (2006.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0286594 A1* | 11/2011 | Resch | H04L 9/085 380/46 |
| 2012/0109885 A1* | 5/2012 | Grube | G06F 11/0727 707/609 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

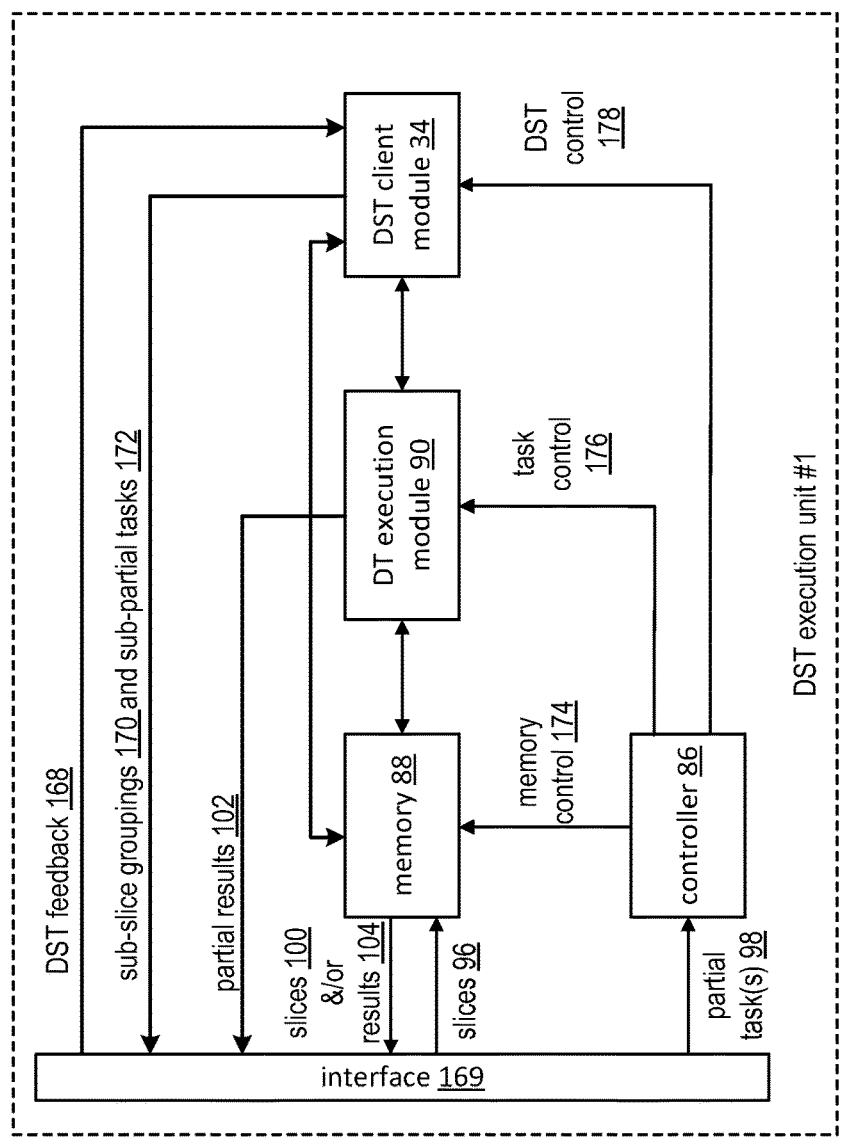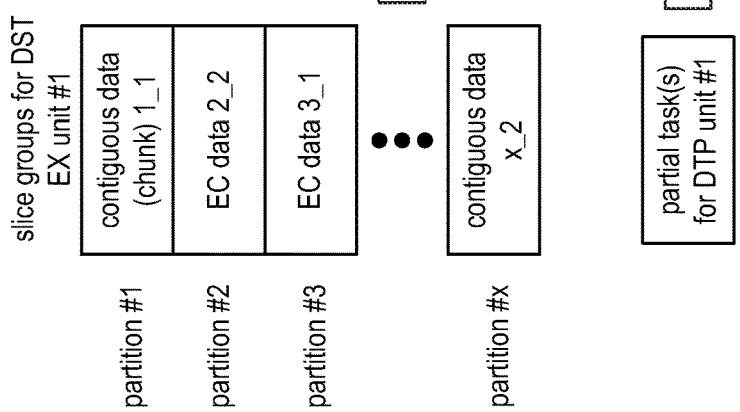
FIG. 11

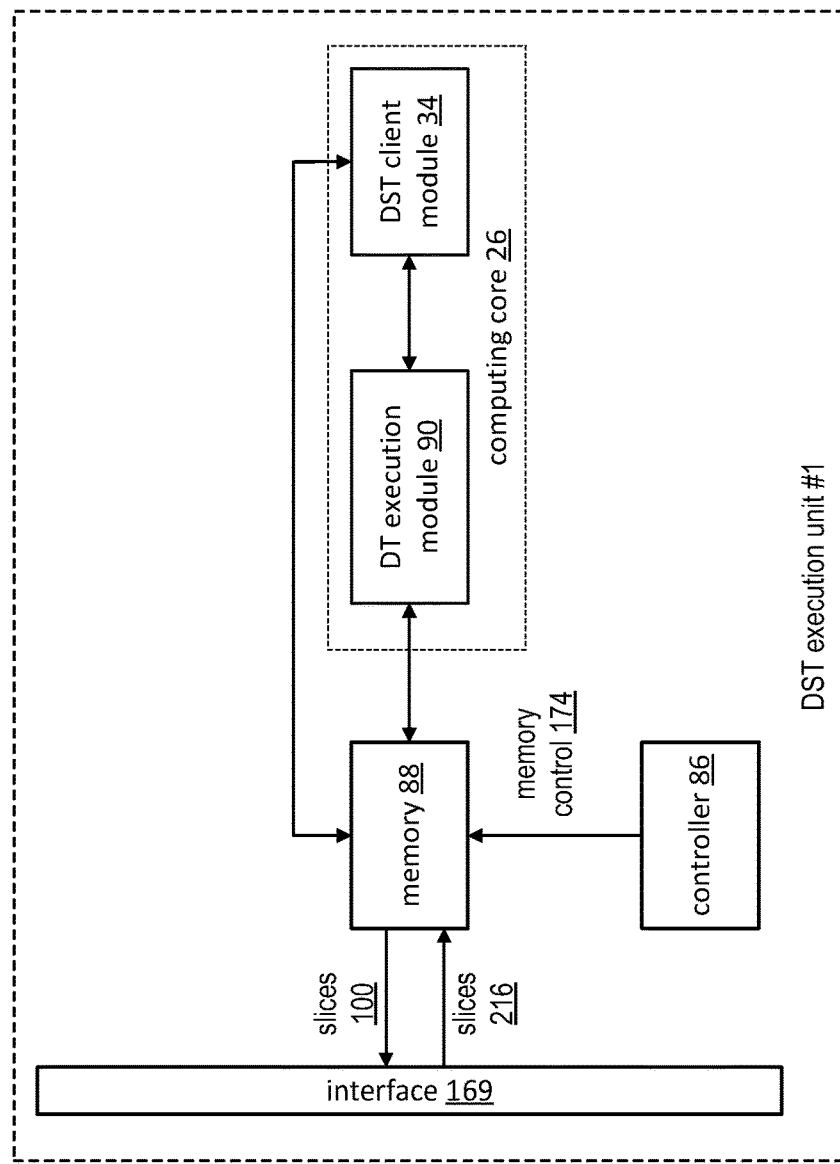
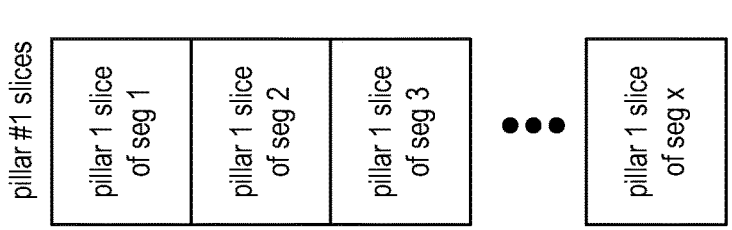
FIG. 24

| DST allocation info 242 | data partition info 320: data ID; No. of partitions; Addr. info for each partition; format conversion indication | | | | | intermediate result info 324 | | |
|---|---|---|---|---|---|---|---|---|
| | task execution info 322 | | | | | | | |
| task 326 | task ordering 328 | data partition 330 | set of DT EX mods 332 | Name 334 | interm. result processing 336 | scratch pad storage 338 | intermediate result storage 340 | |
| 1_1 | none | 2_1 - 2_z | 1_1, 2_1, 3_1, 4_1, & 5_1 | R1-1 | DST unit 1 | DST unit 1 | DST units 1-5 | |
| 1_2 | none | 2_1 - 2_4 | 1_1, 2_1, 3_1, 4_1, & 5_1 | R1-2 | DST unit 1 | DST unit 1 | DST units 1-5 | |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 | |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 | |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 | |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 | |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 | |
| 2 | none | 2_1 - 2_z | 3_1, 4_1, 5_1, 6_1, & 7_1 | R2 | DST unit 7 | DST unit 7 | DST units 7, 1-4 | |
| 3_1 | none (same as 1_3) | use R1_3 | | R1-1 | | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 | |

FIG. 32

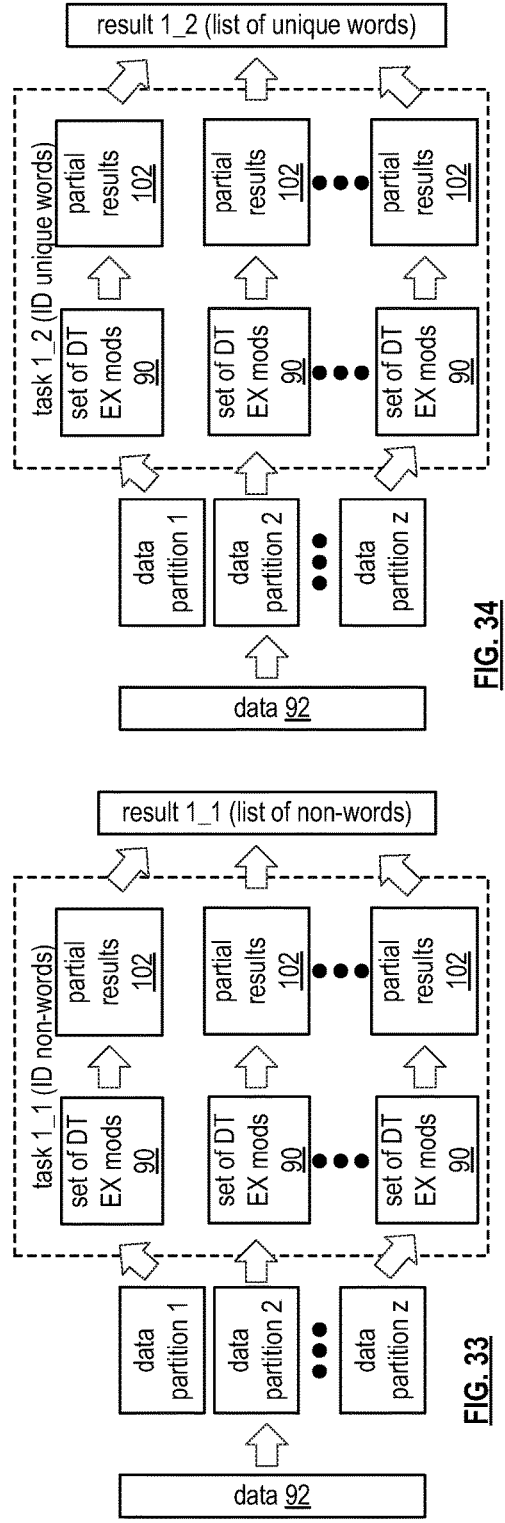
FIG. 33
FIG. 34
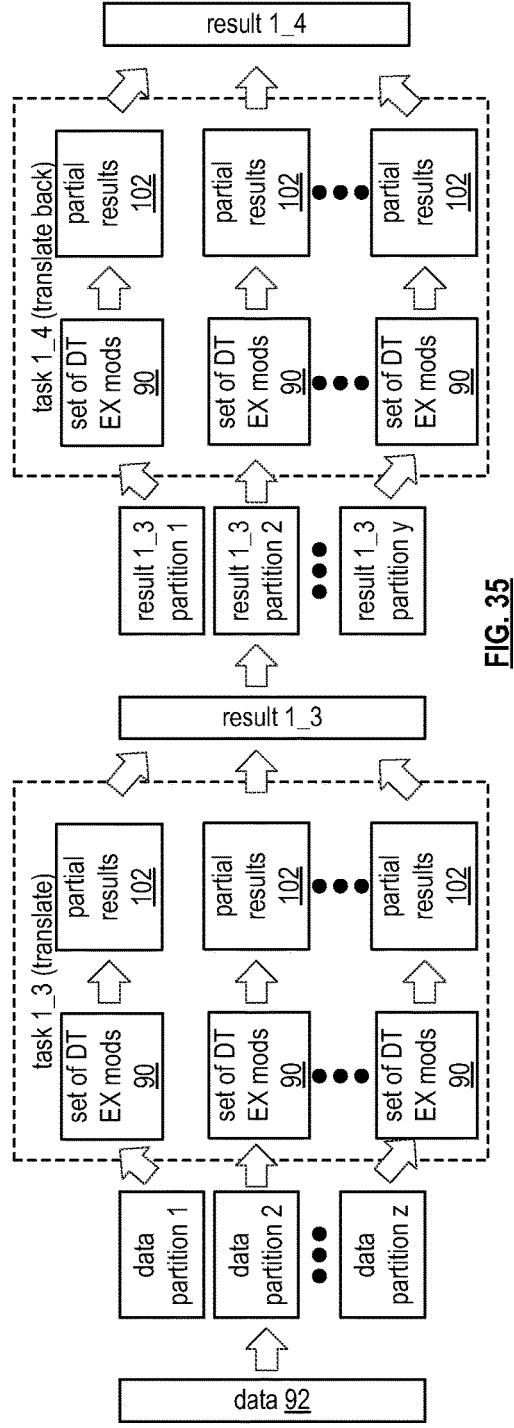
FIG. 35

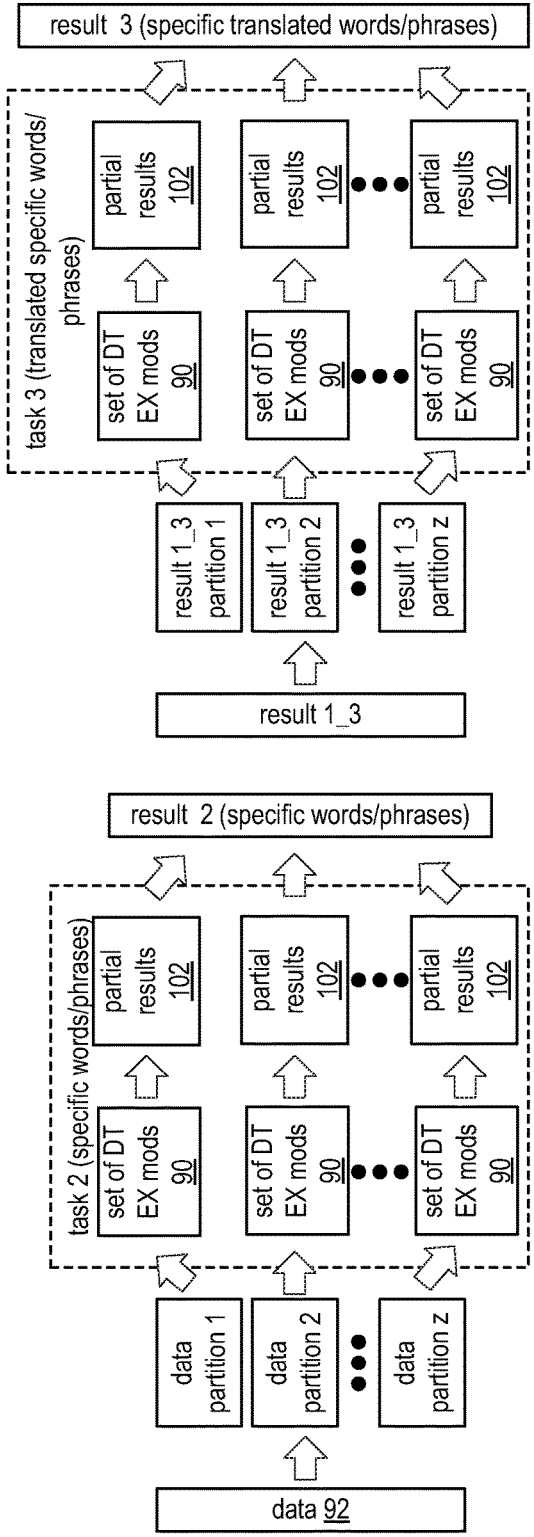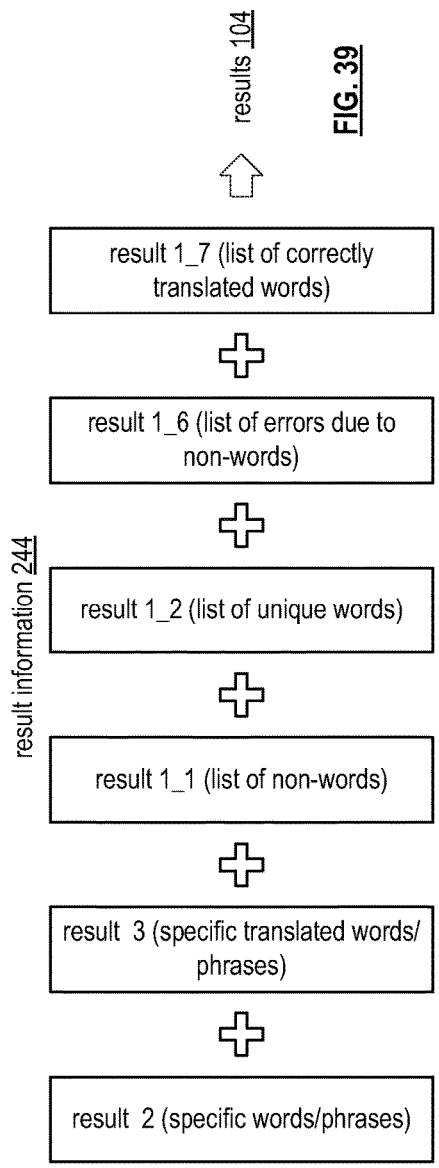

VERIFYING A STATUS LEVEL OF STORED ENCODED DATA SLICES

CROSS REFERENCE TO RELATED PATENTS

The present U.S. Utility Patent Application claims priority pursuant to 35 U.S.C. § 119(e) to U.S. Provisional Application No. 62/008,207, entitled "PRIORITIZING TASKS IN A STORAGE UNIT", filed Jun. 5, 2014, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 11 is a schematic block diagram of an embodiment of a DST execution unit in accordance with the present invention;

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 42A:
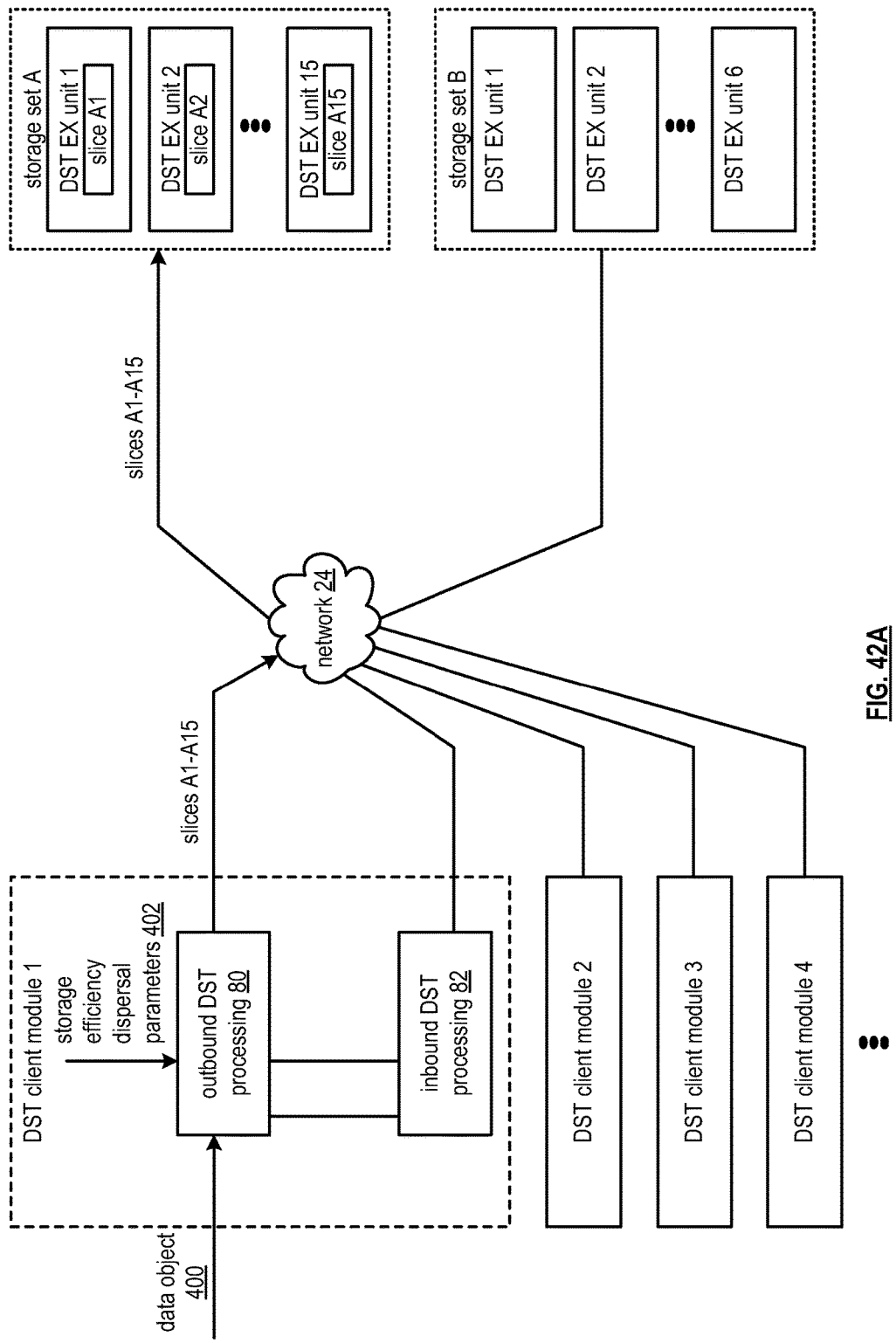
Figure 42B:
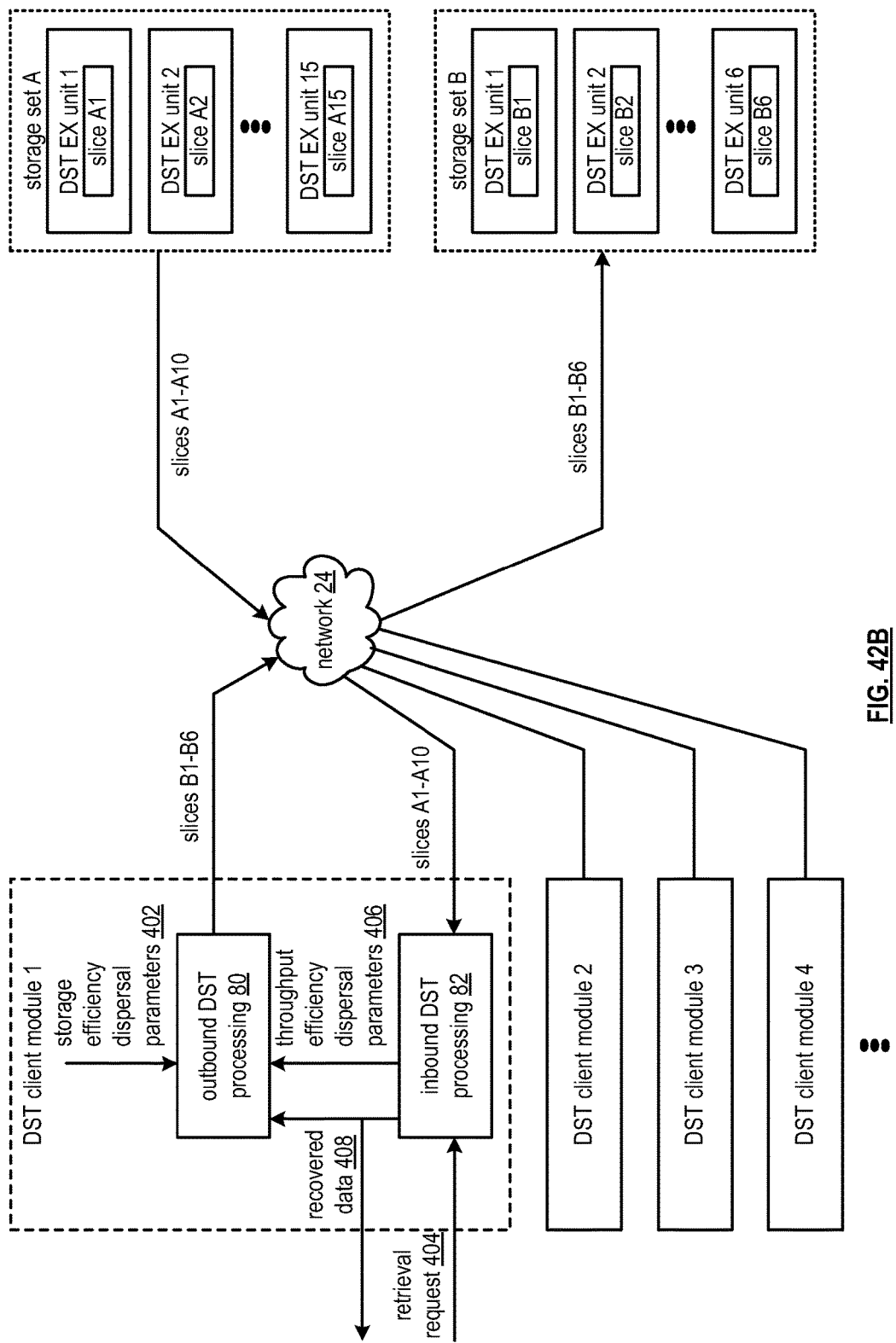
Figure 42C:
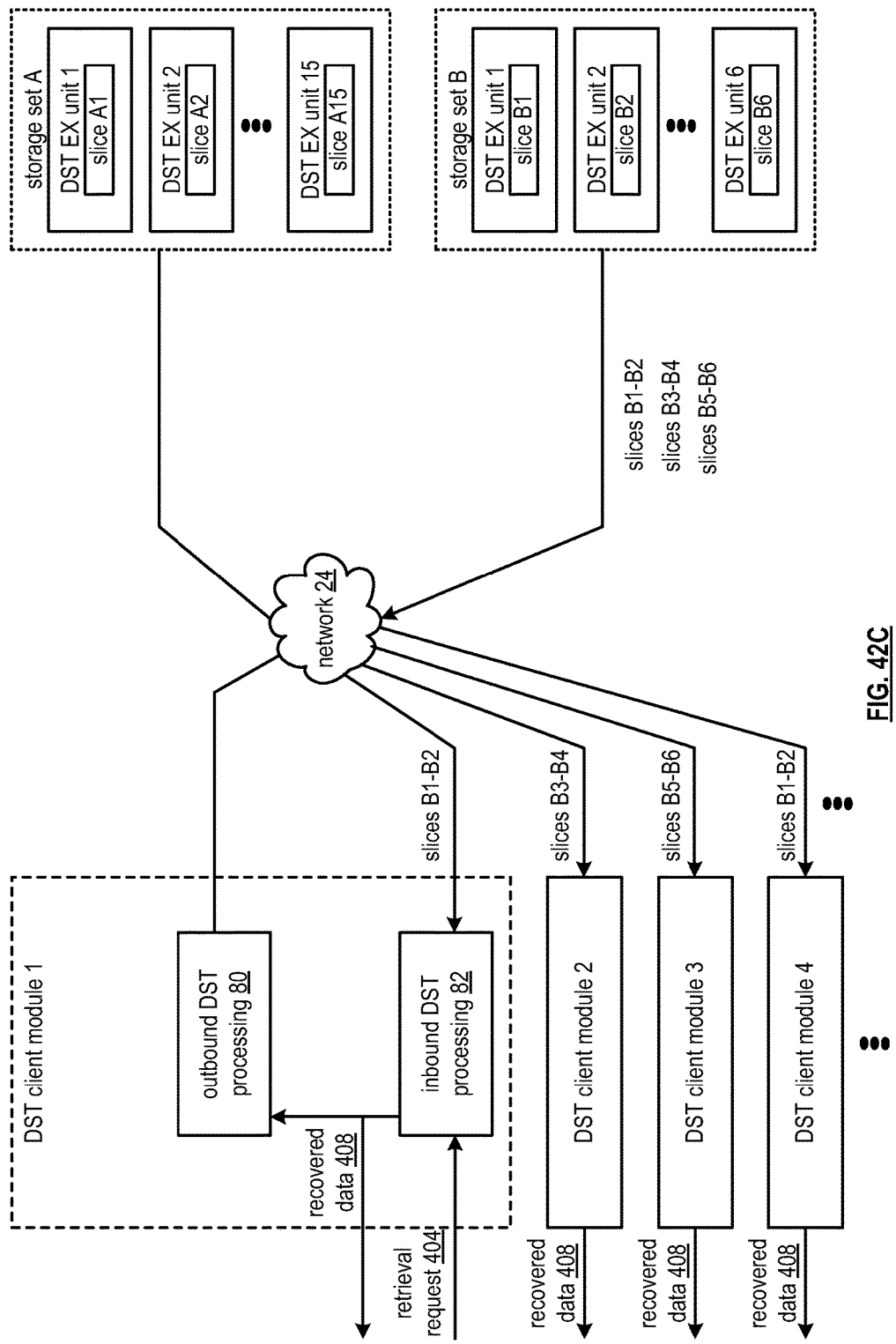
Figure 42D:
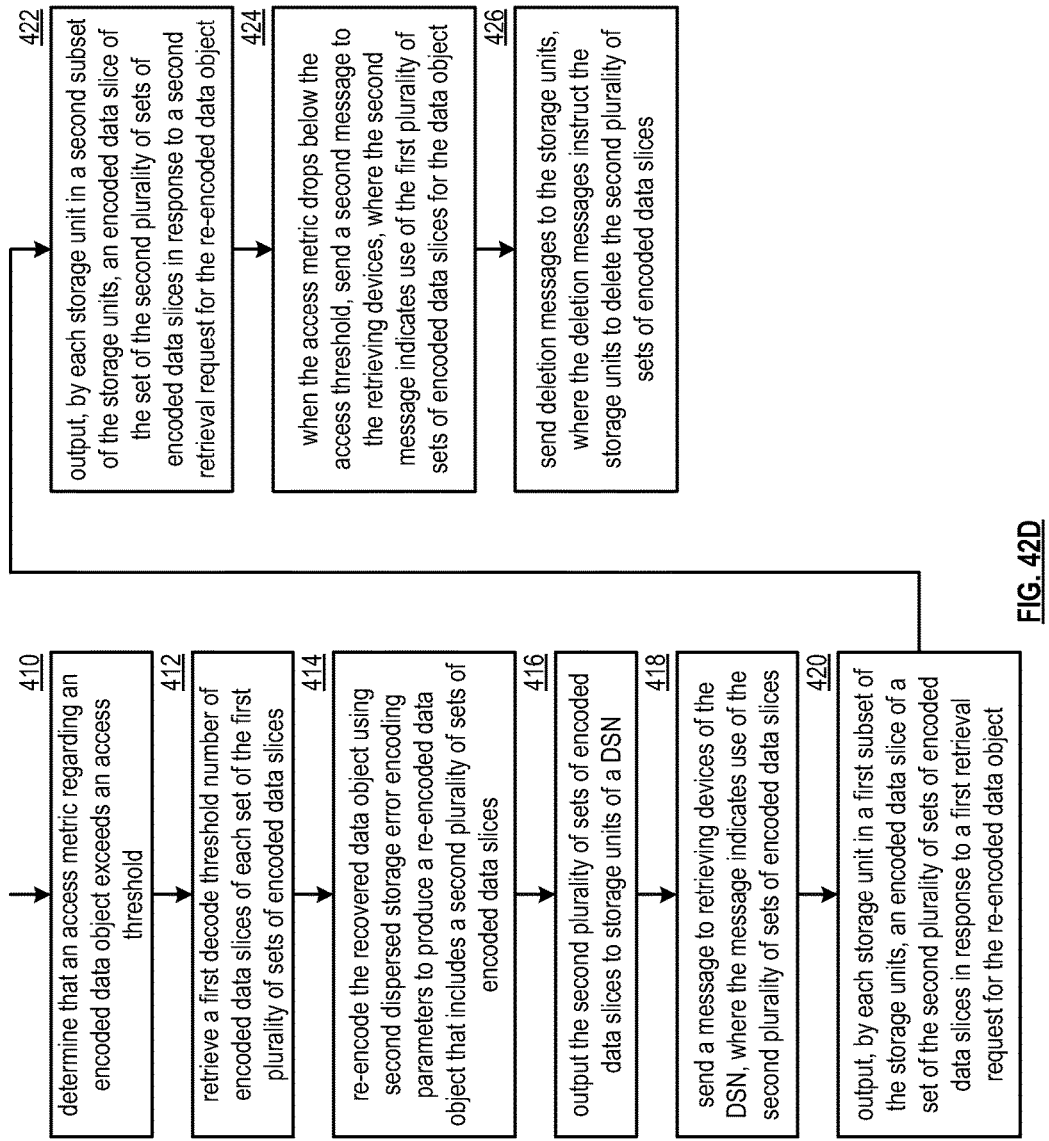
Figure 43A:
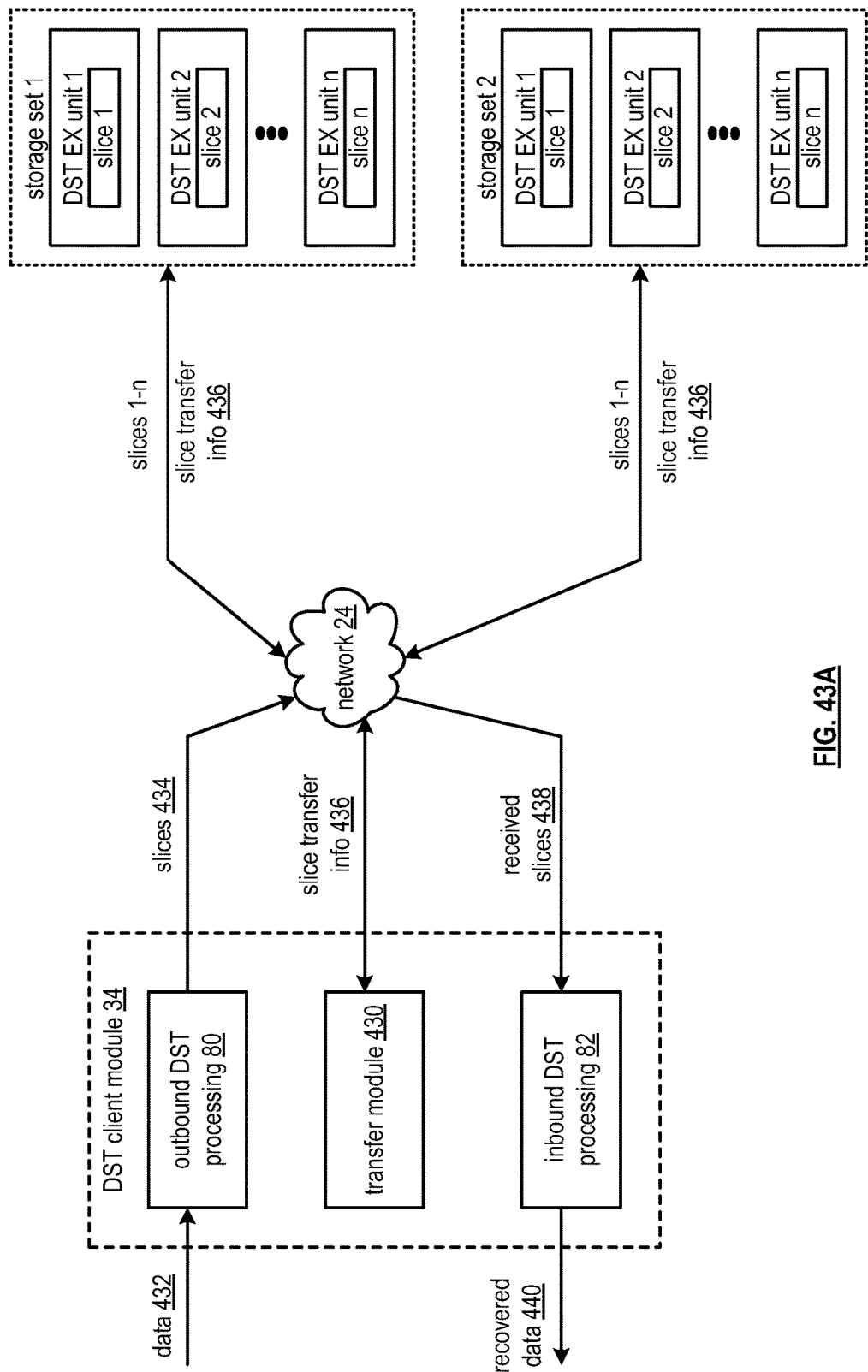
Figure 43B:
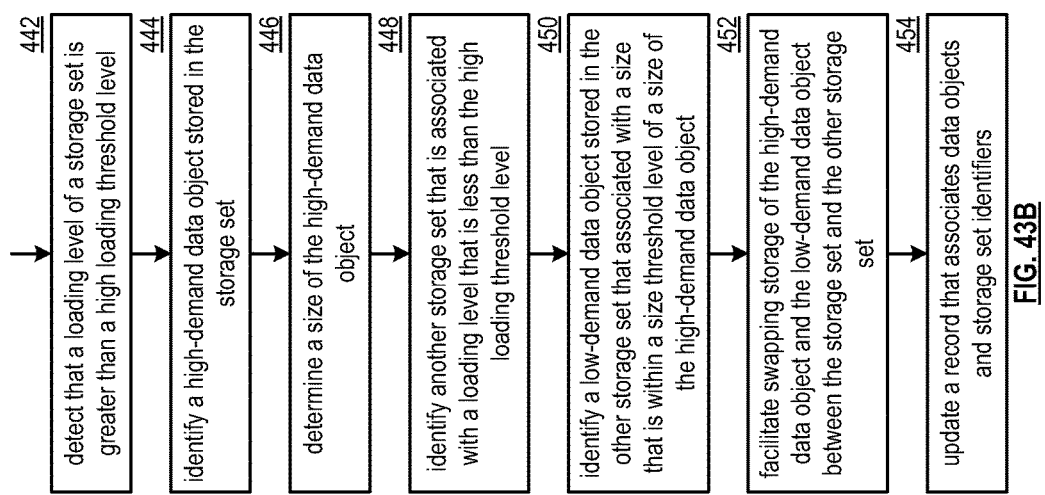
Figure 44A:
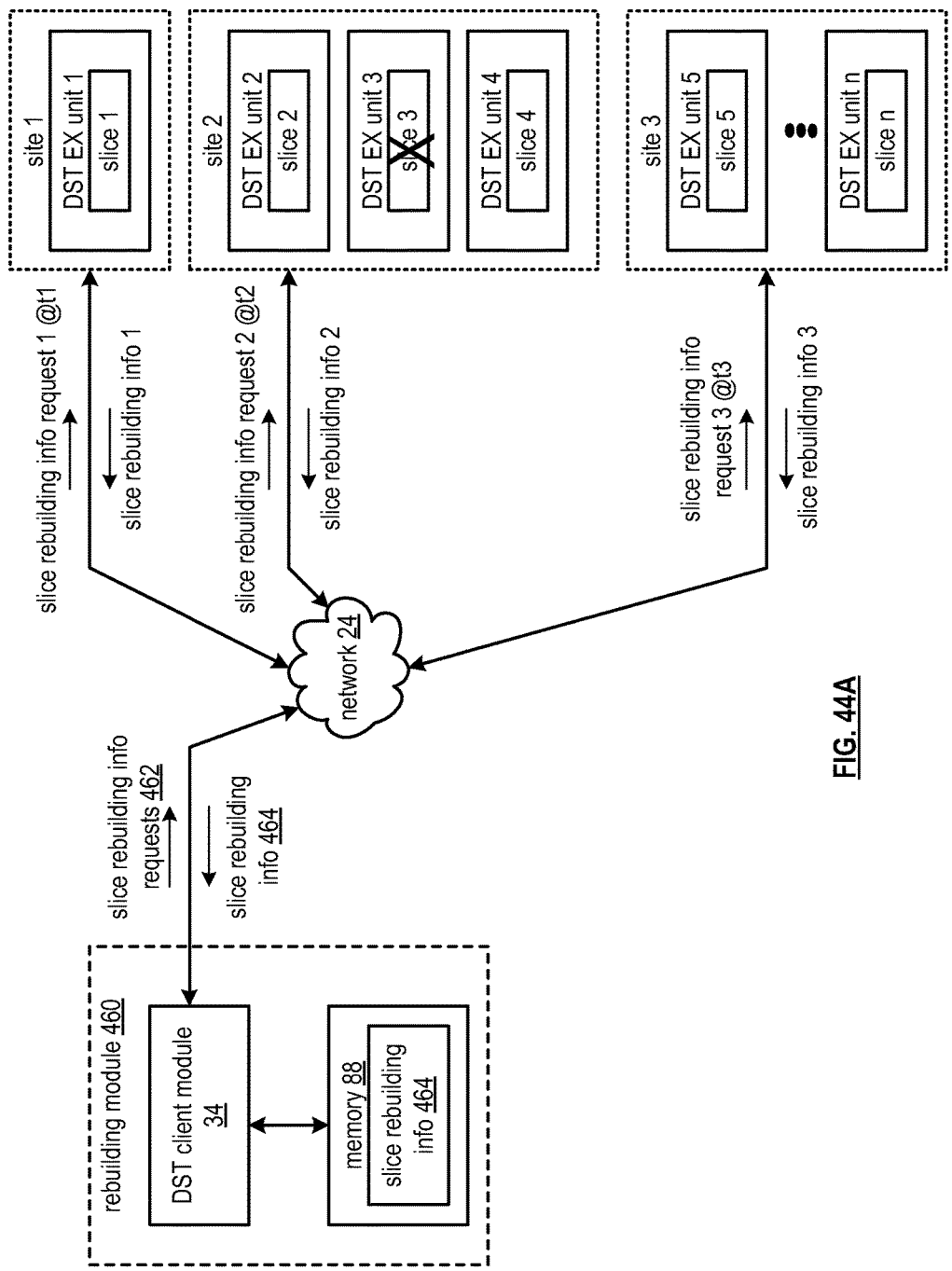
Figure 44B:
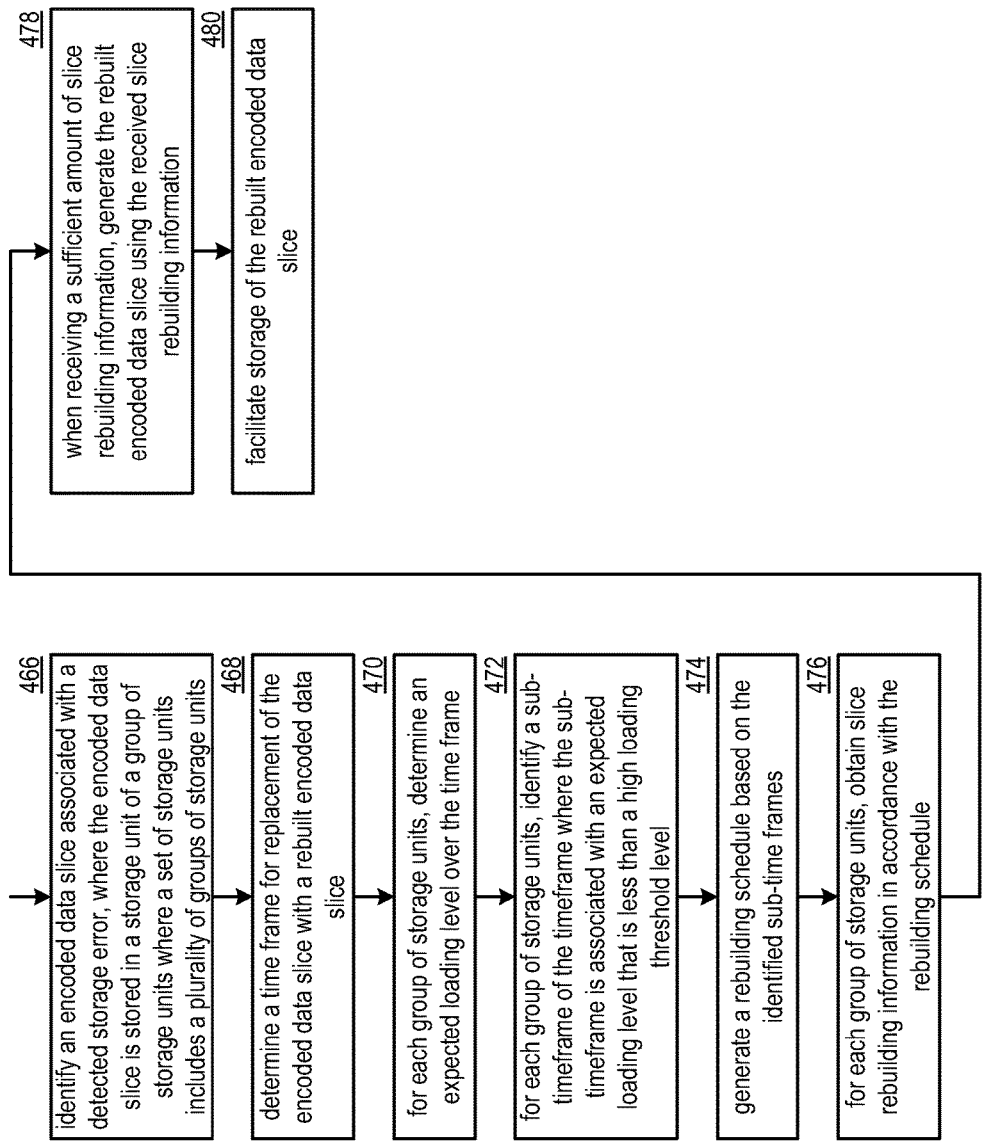
Figure 45A:
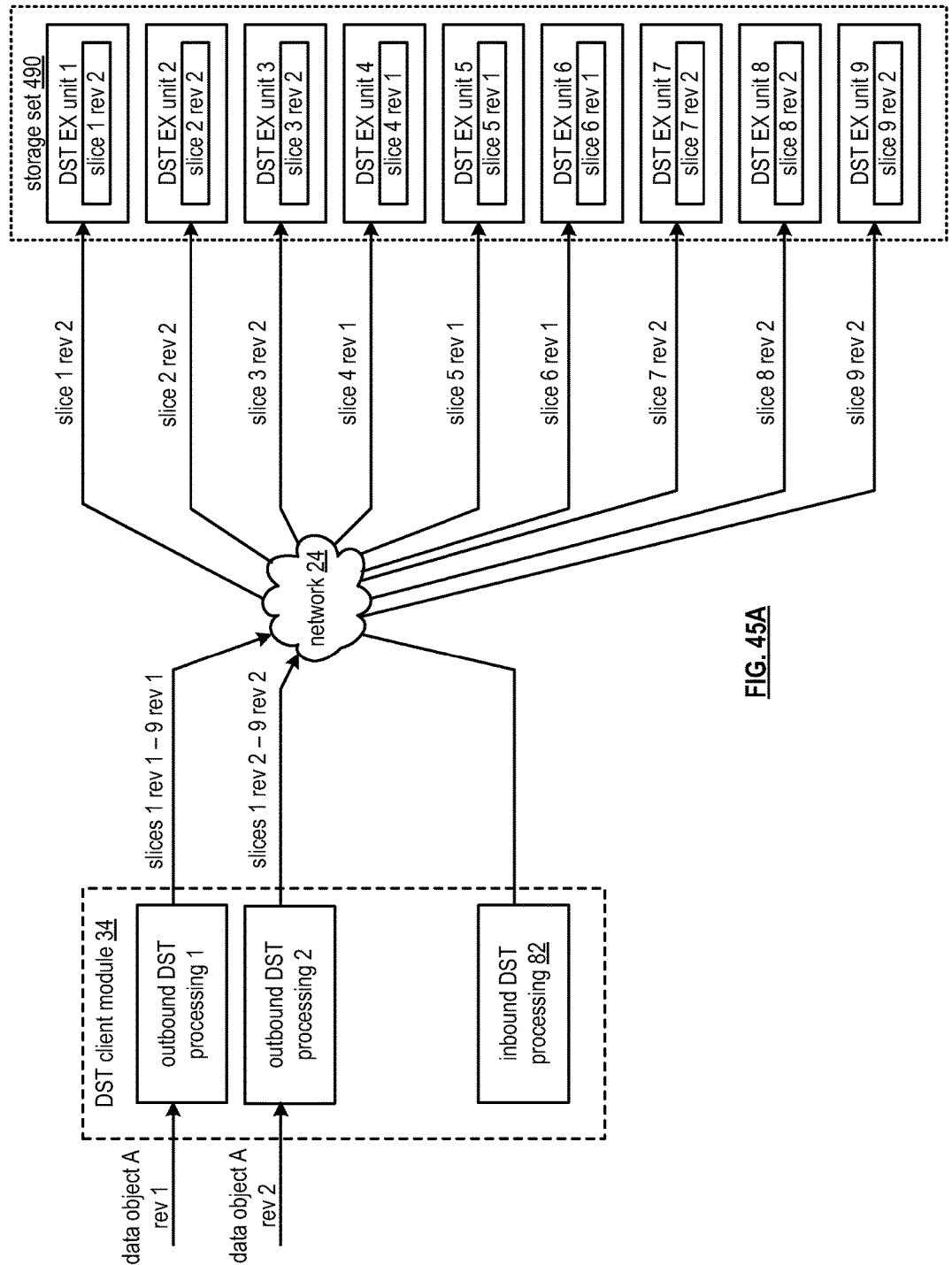
Figure 45B:
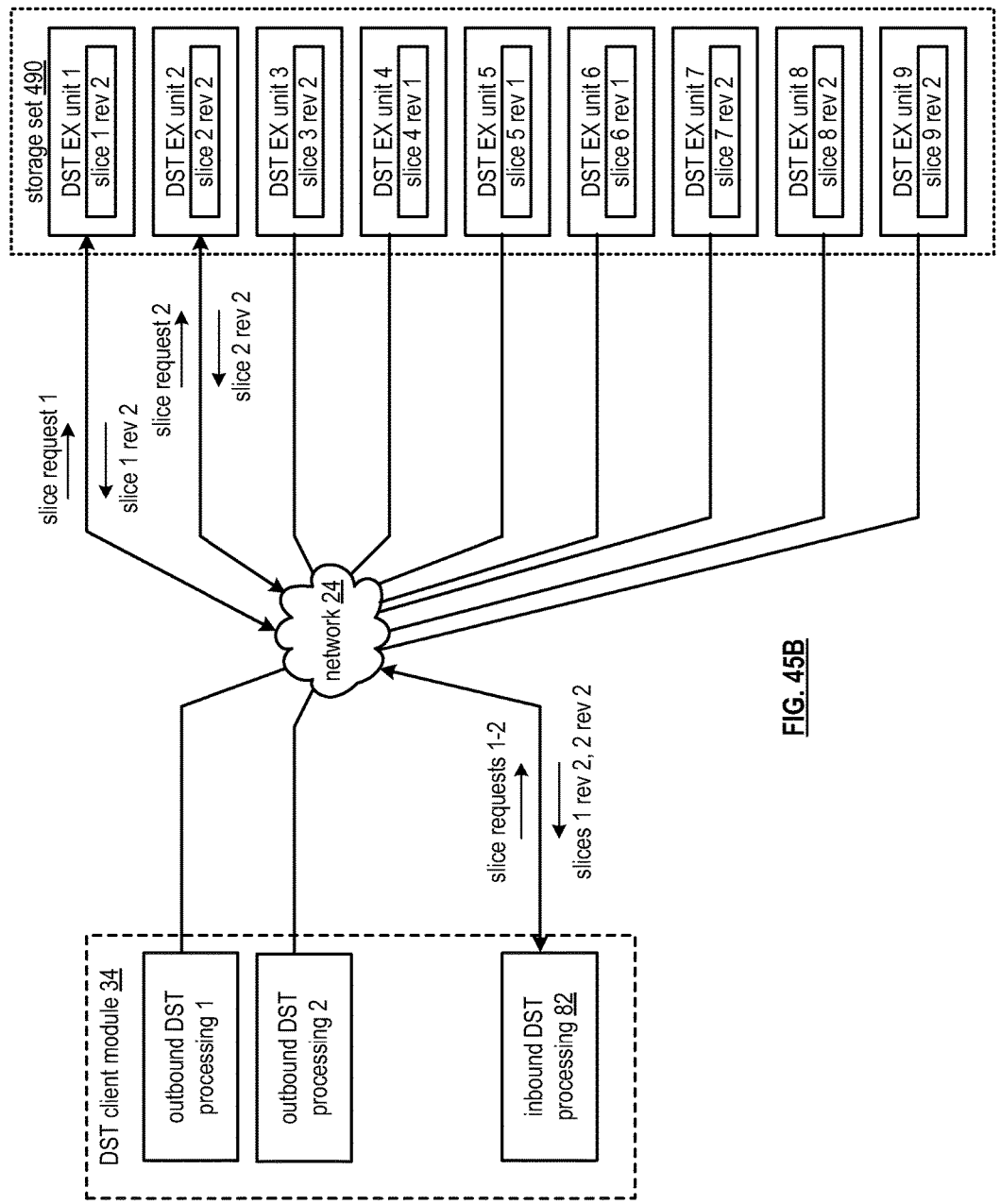
Figure 45C:
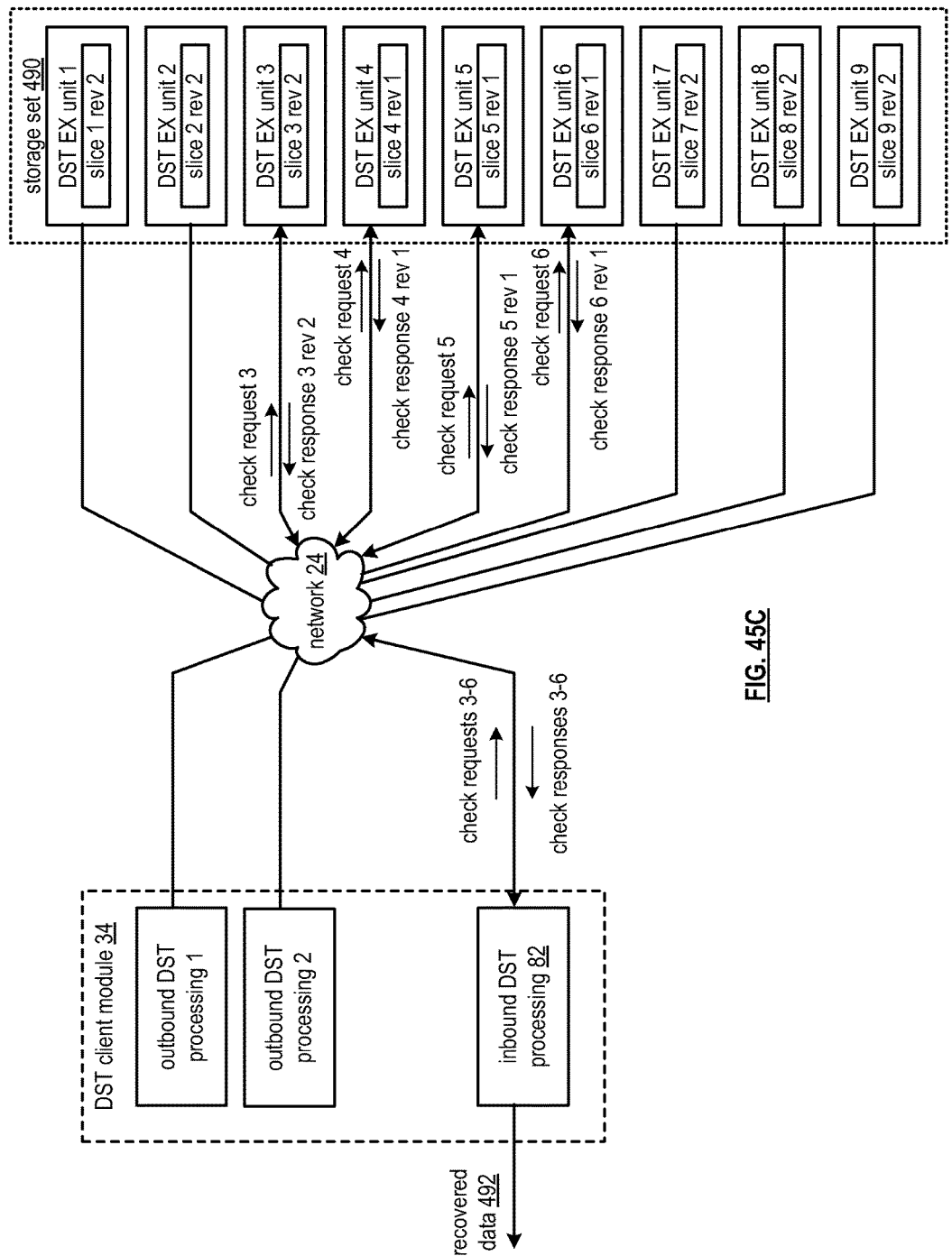
Figure 45D:
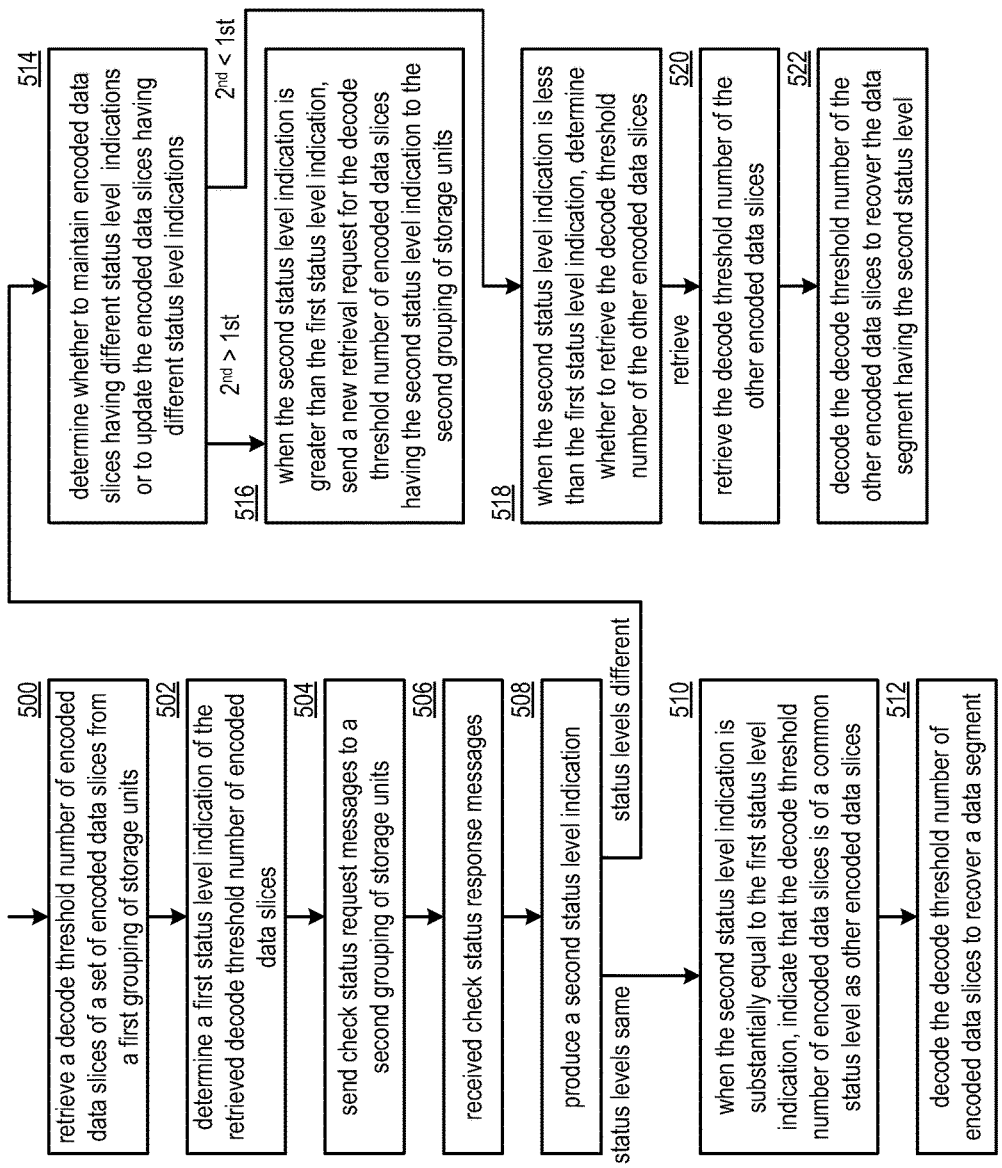
Figure 46A:
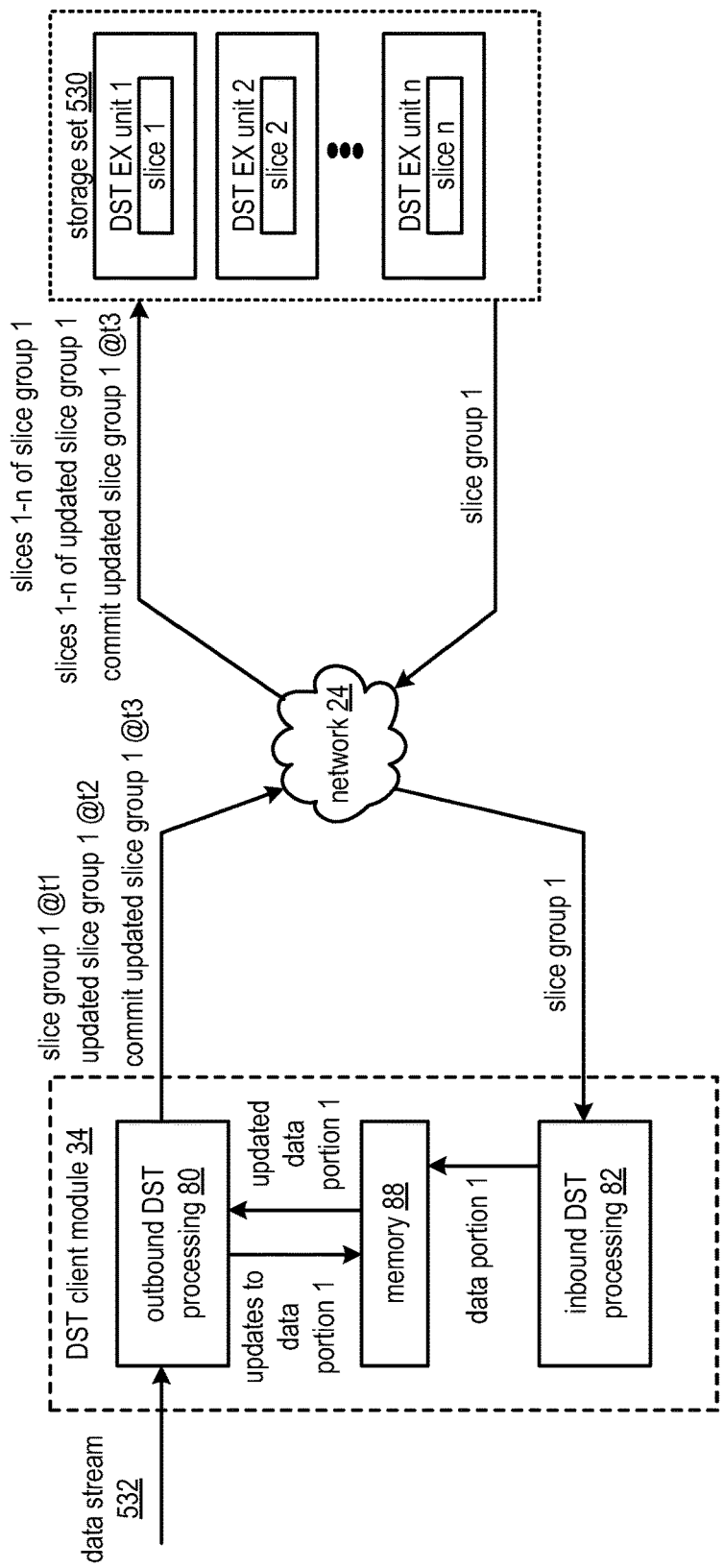
Figure 46B:
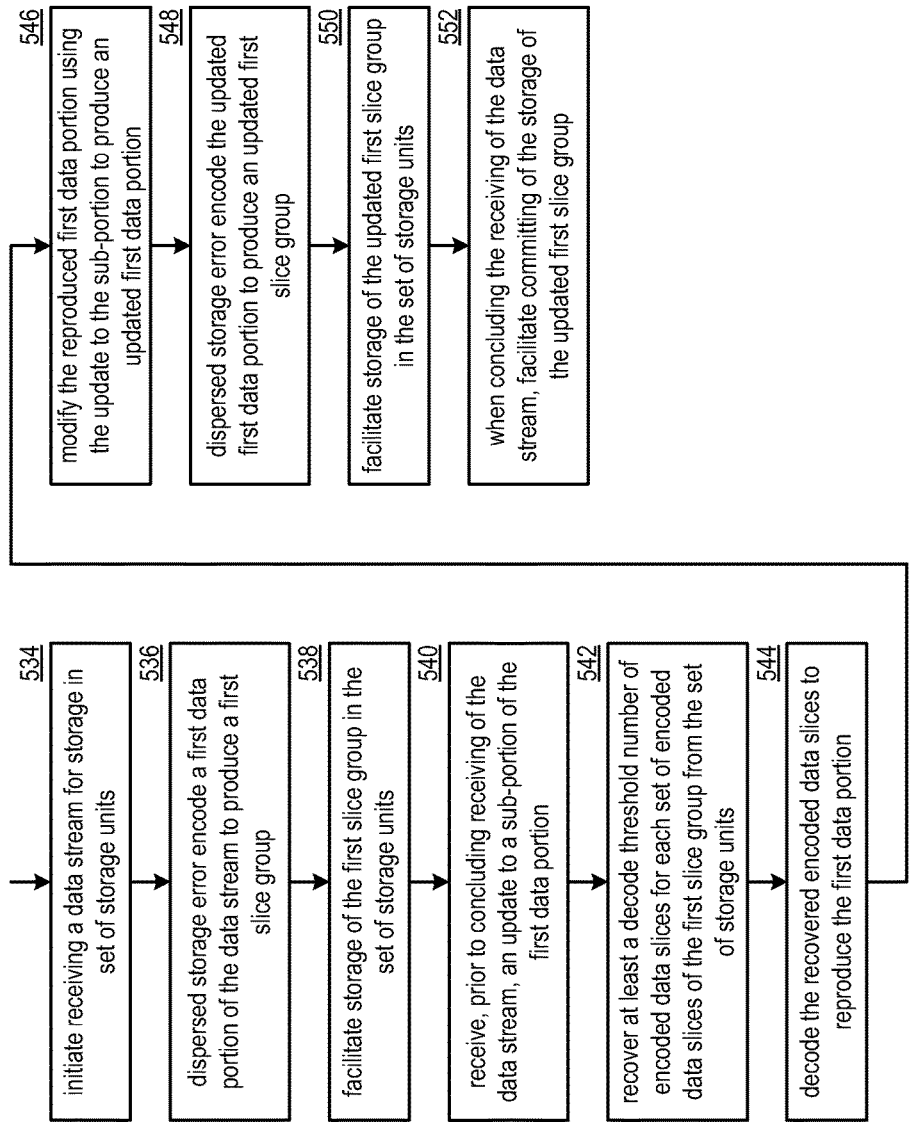
Figure 47A:
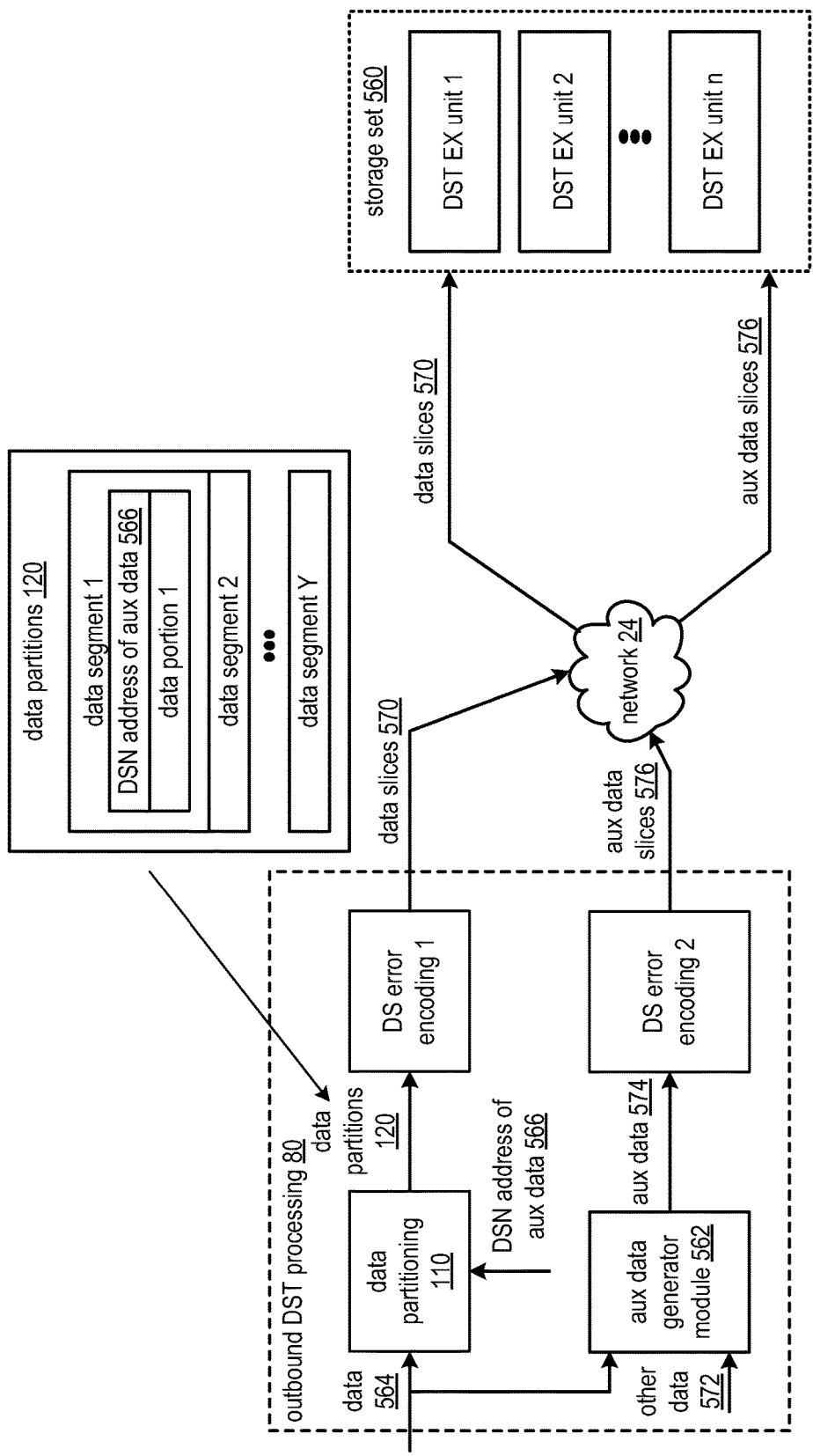
Figure 47B:
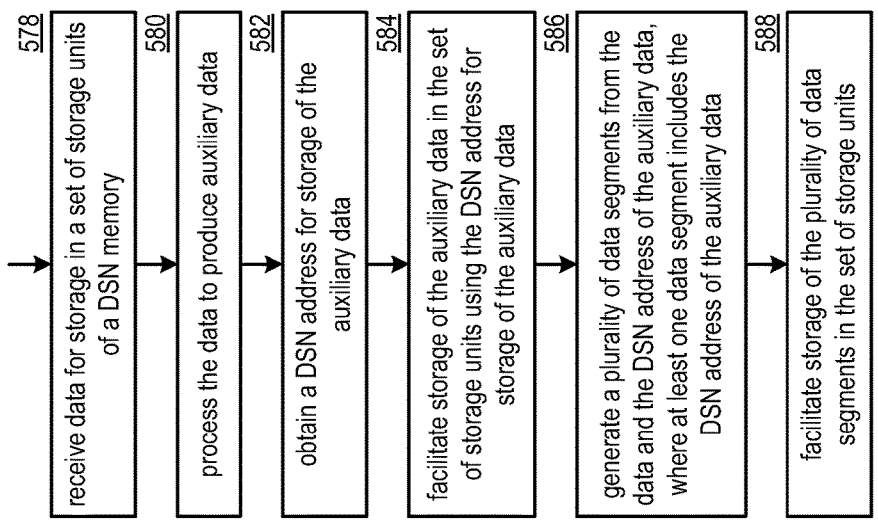
Figure 48A:
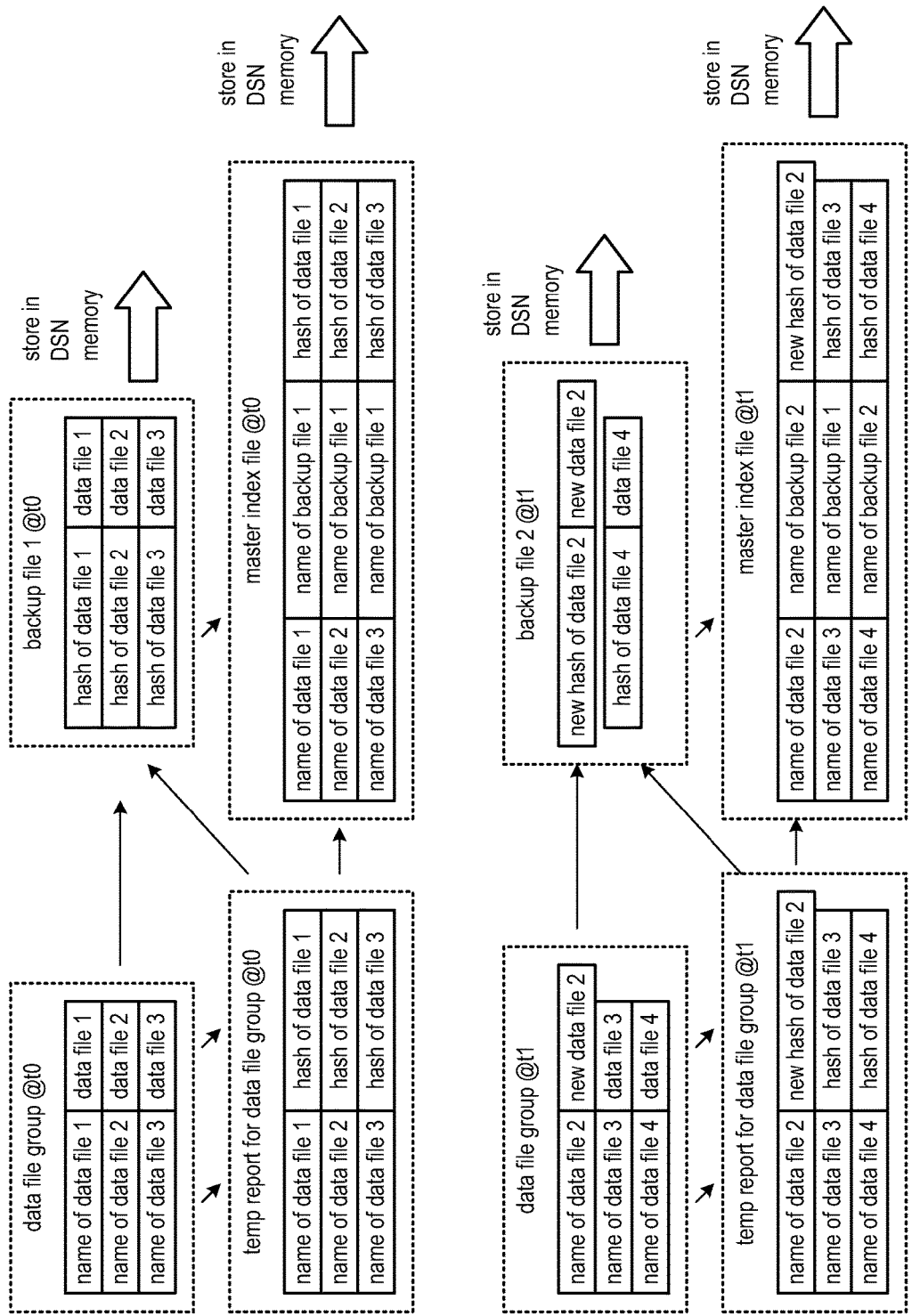
Figure 48B:
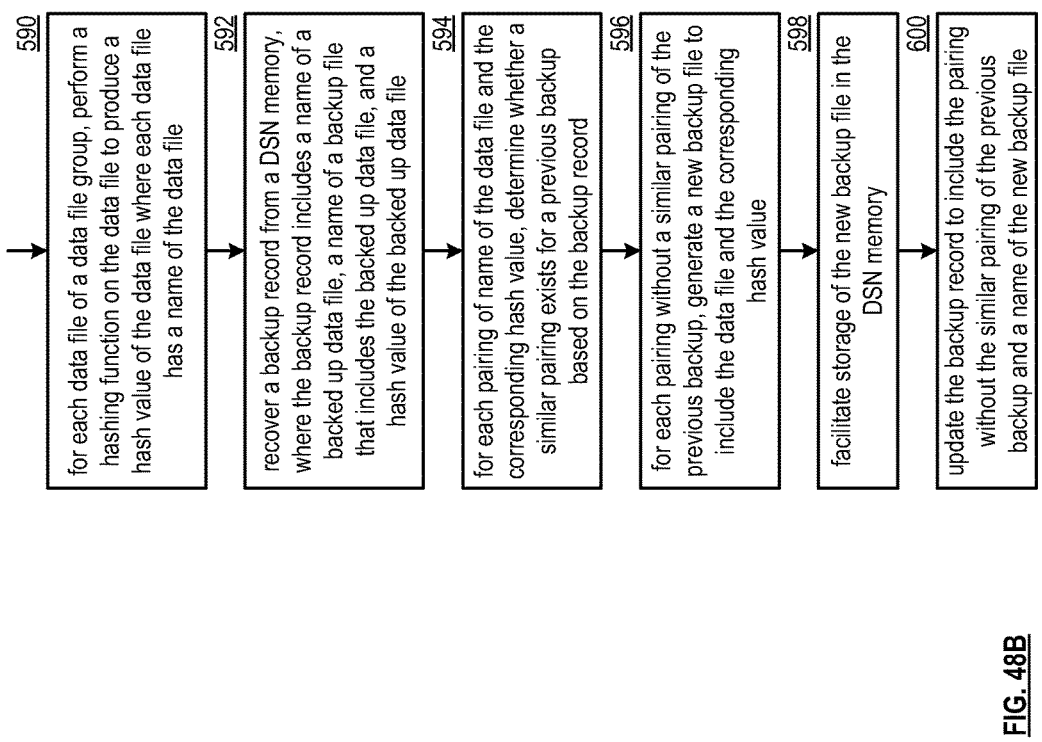

FIGS. 42A-C are a schematic block diagram of another embodiment of a dispersed storage network (DSN) in accordance with the present invention;

FIG. 42D is a flowchart illustrating an example of maintaining data storage in accordance with an access metric in accordance the present invention;

FIG. 43A is a schematic block diagram of another embodiment of a dispersed storage network (DSN) in accordance with the present invention;

FIG. 43B is a flowchart illustrating an example of balancing loading of storage resources in accordance the present invention;

FIG. 44A is a schematic block diagram of another embodiment of a dispersed storage network (DSN) in accordance with the present invention;

FIG. 44B is a flowchart illustrating an example of rebuilding an encoded data slice in accordance the present invention;

FIGS. 45A-C are a schematic block diagram of another embodiment of a dispersed storage network (DSN) in accordance with the present invention;

FIG. 45D is a flowchart illustrating an example of verifying a status level of stored encoded data slices in a dispersed storage network in accordance the present invention;

FIG. 46A is a schematic block diagram of another embodiment of a dispersed storage network (DSN) in accordance with the present invention;

FIG. 46B is a flowchart illustrating an example of updating captured data in accordance the present invention;

FIG. 47A is a schematic block diagram of another embodiment of a dispersed storage network (DSN) in accordance with the present invention;

FIG. 47B is a flowchart illustrating an example of associating storage of data and auxiliary data in a dispersed storage network in accordance the present invention;

FIG. 48A is a diagram of an embodiment of a backup file system structure in accordance with the present invention; and FIG. 48B is a flowchart illustrating an example of performing an efficient backup of a group of data files using a dispersed storage network in accordance the present invention.

DETAILED DESCRIPTION OF THE INVENTION

Figure 1:
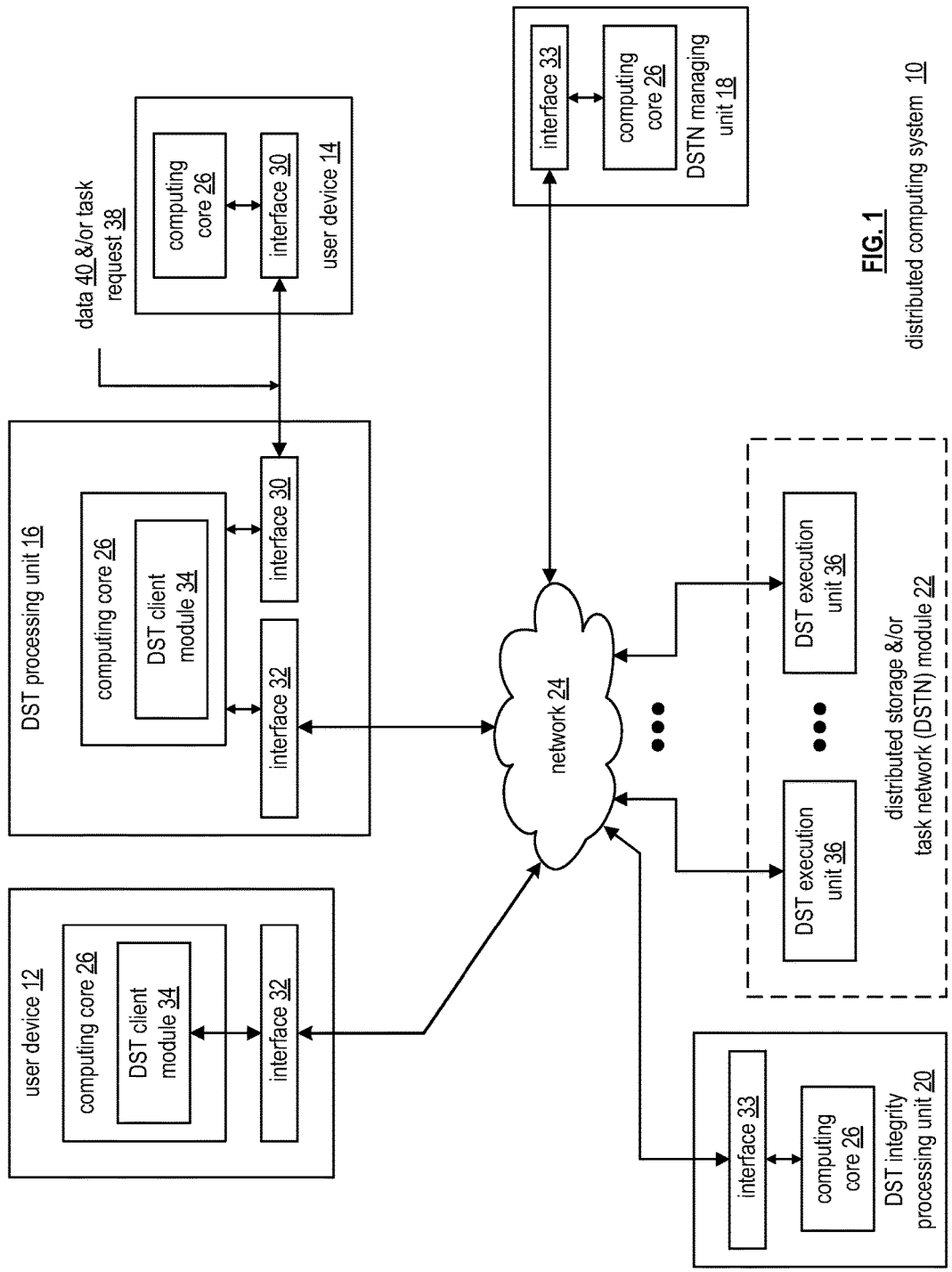
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
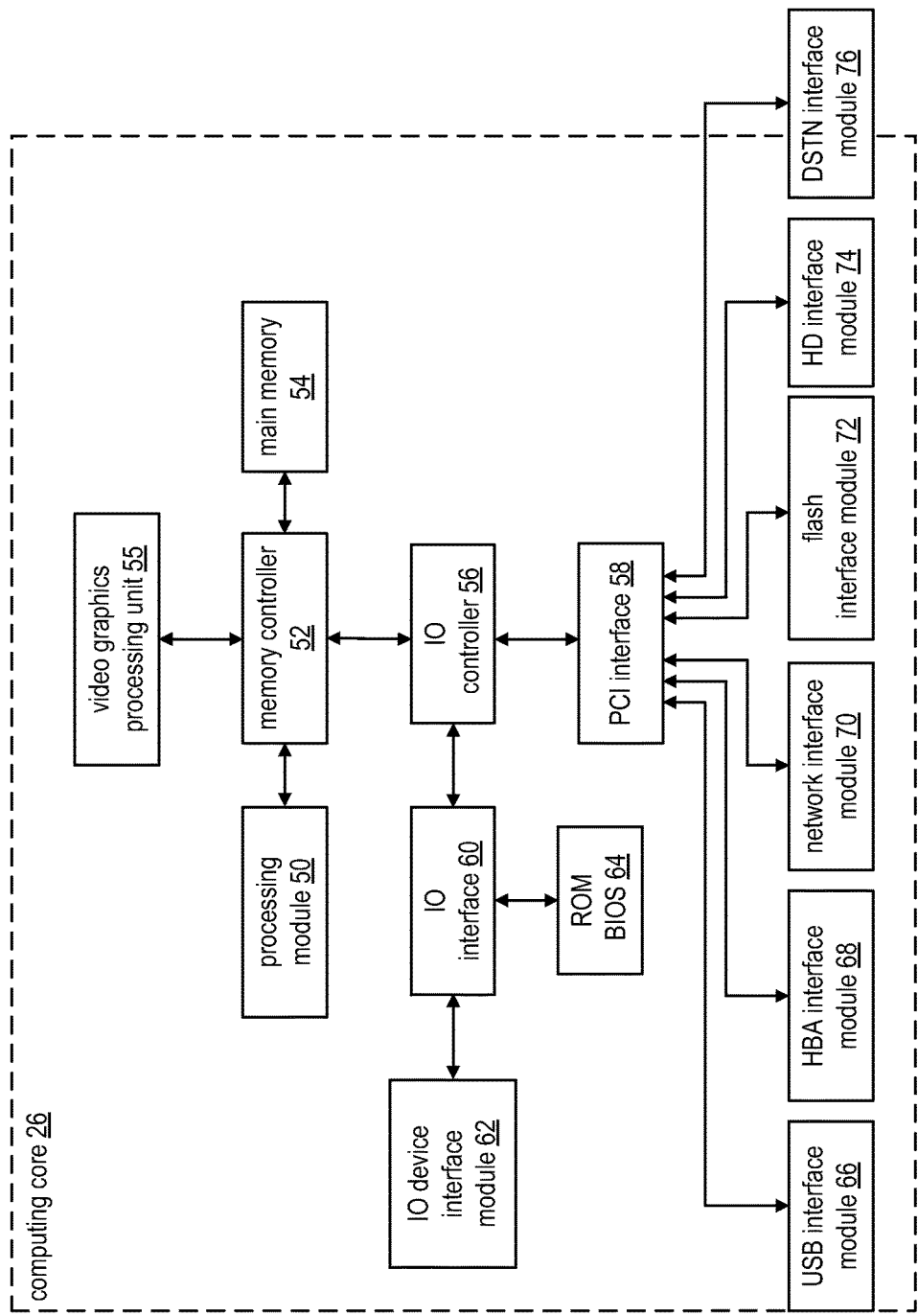
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
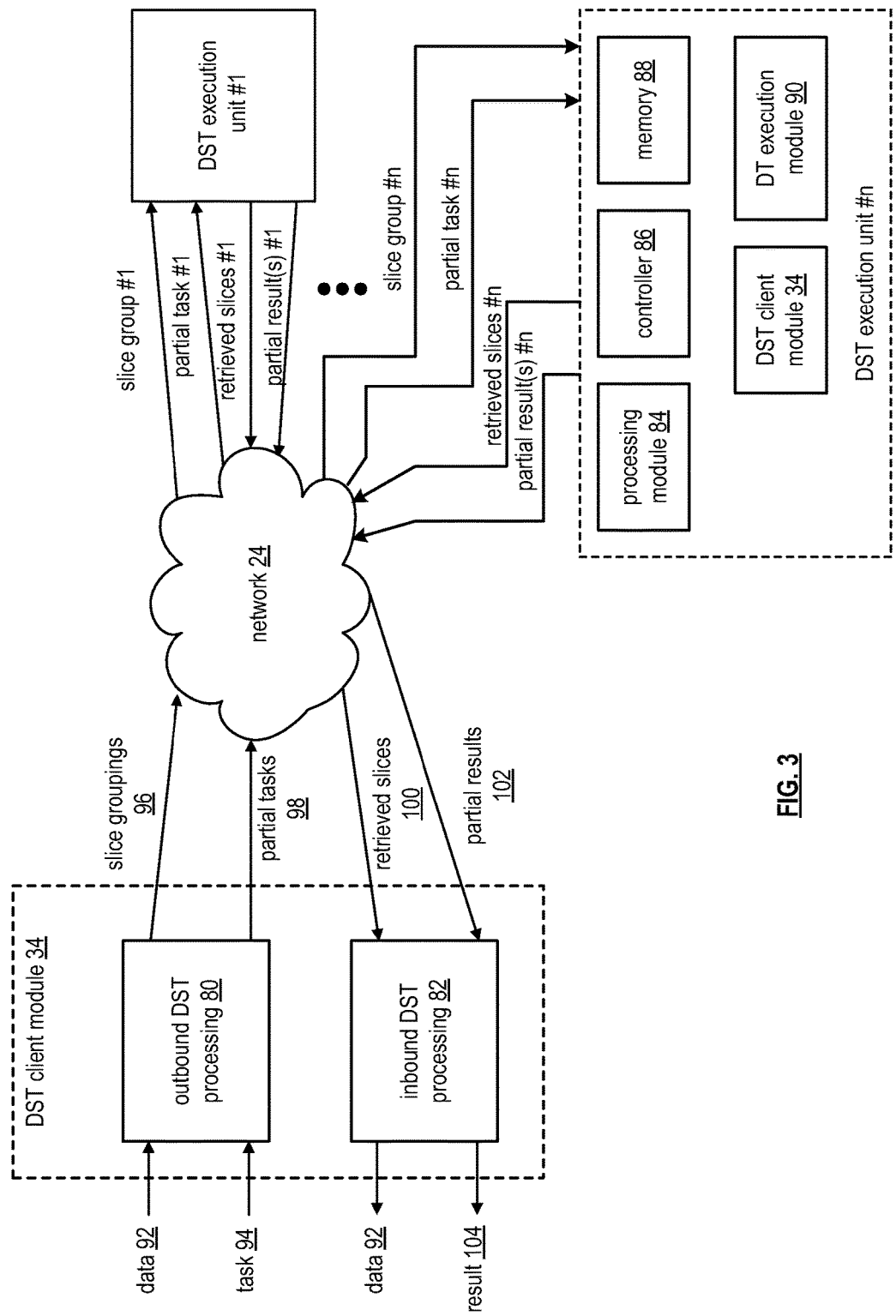
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
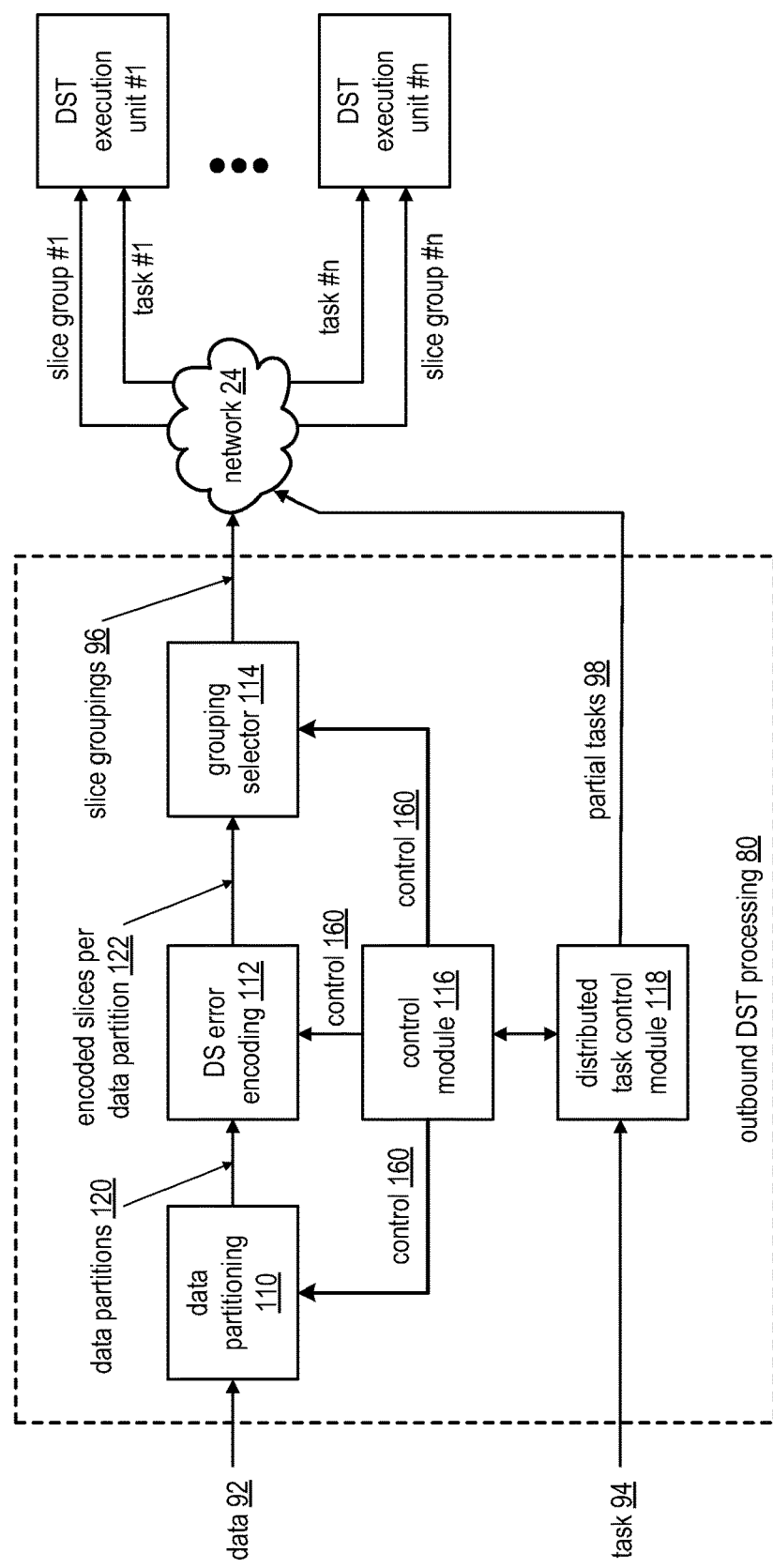
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the group selecting module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
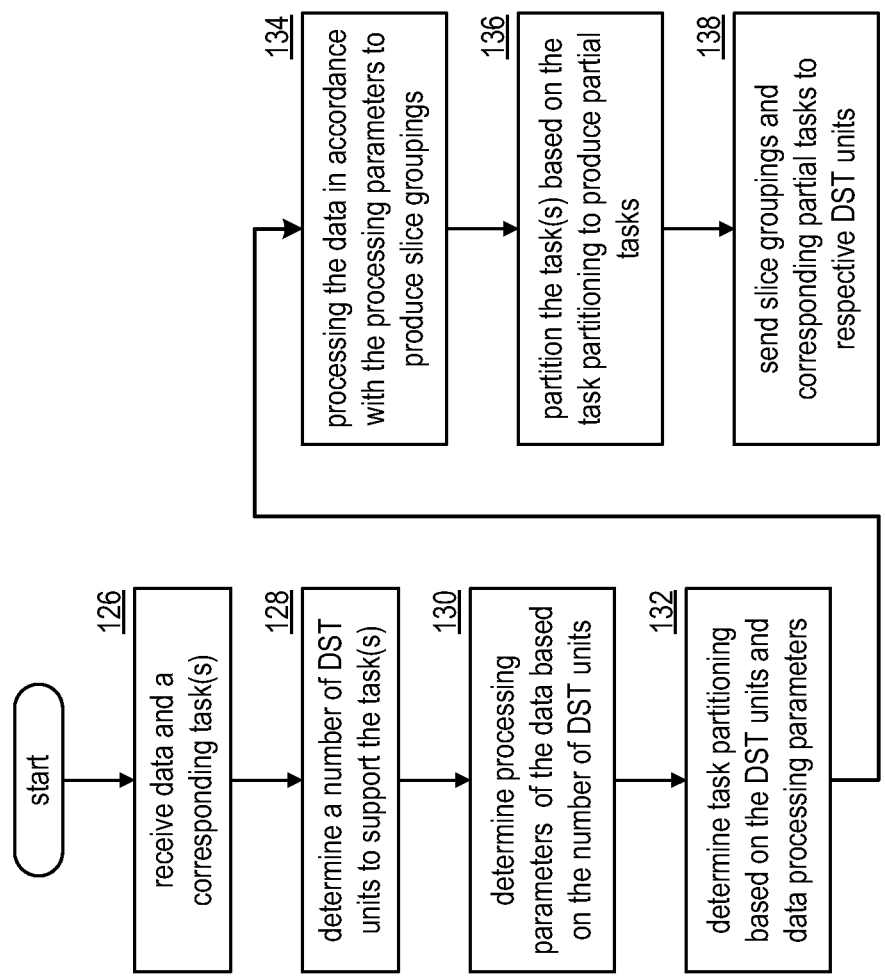
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
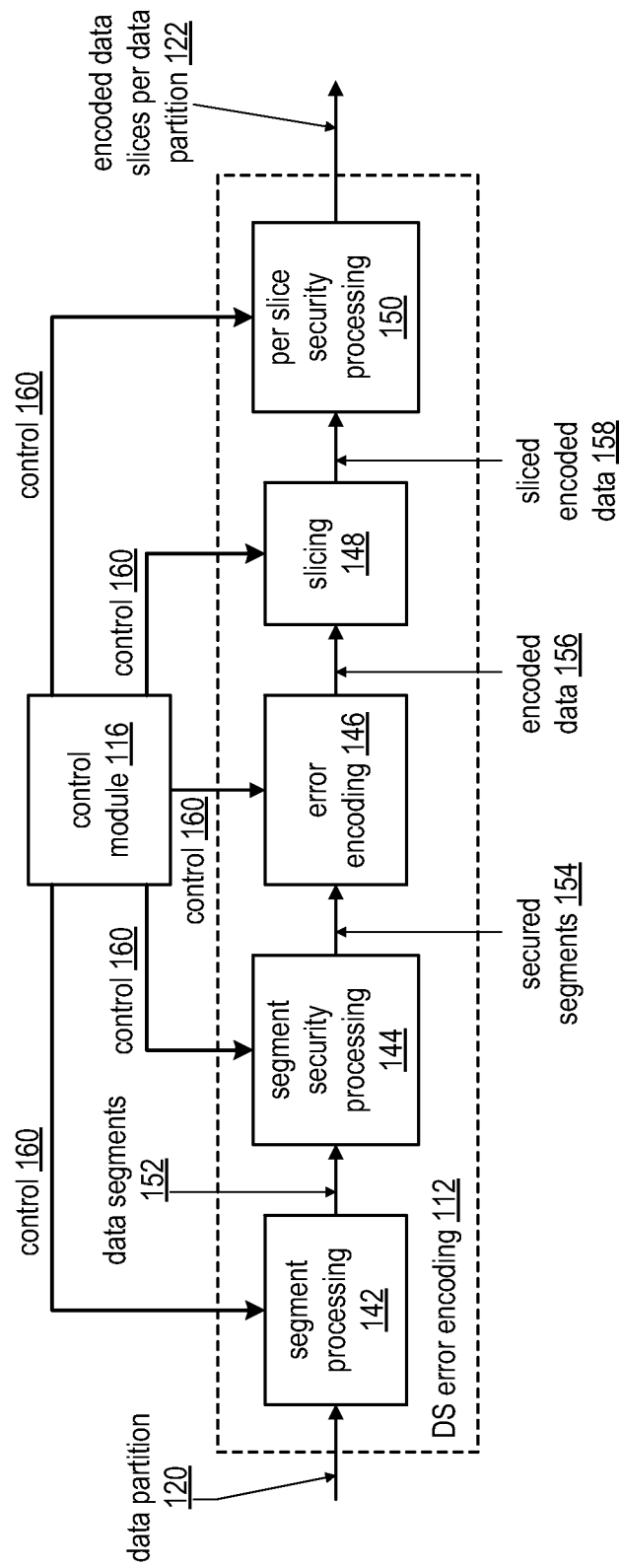
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
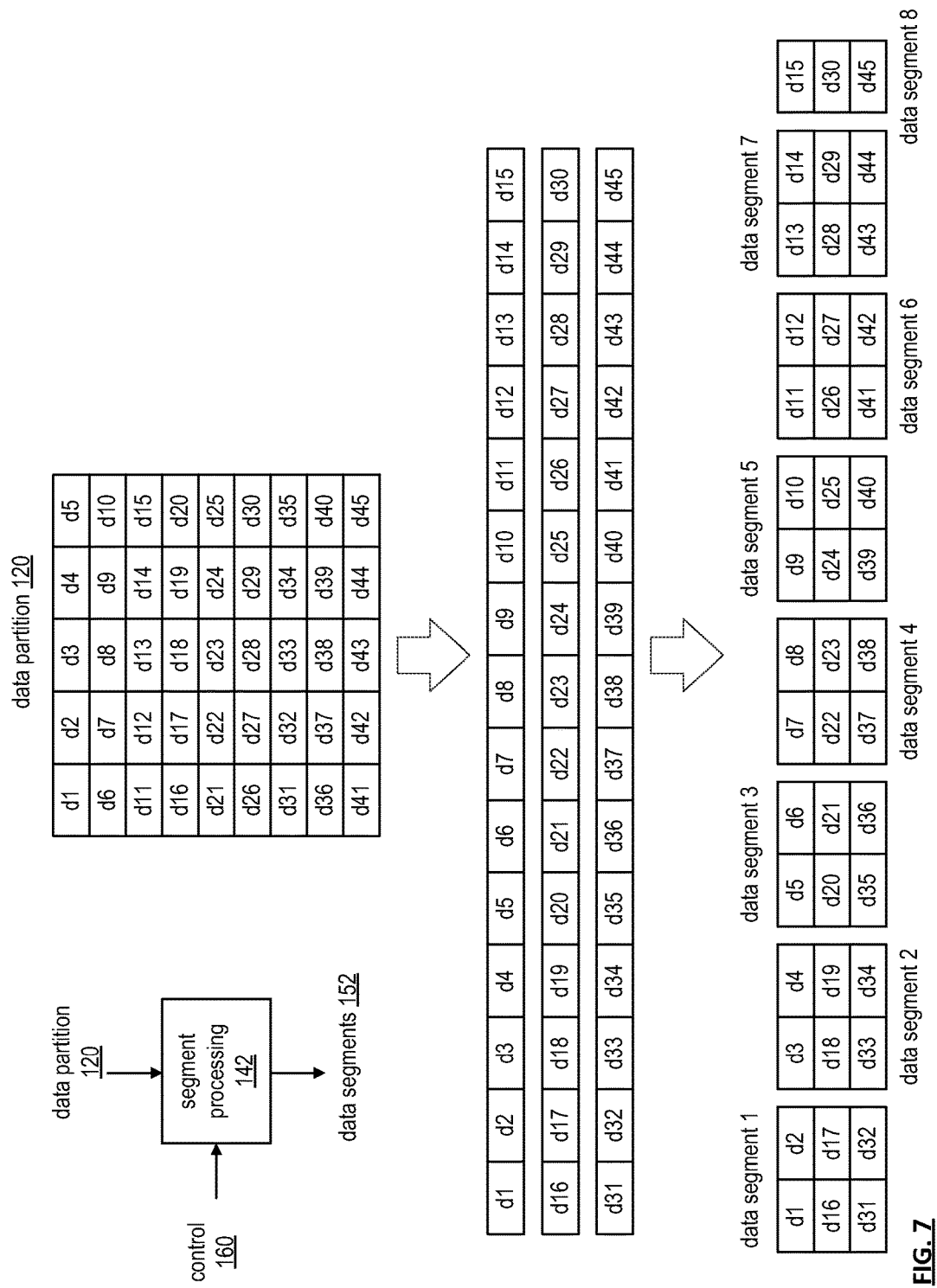
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
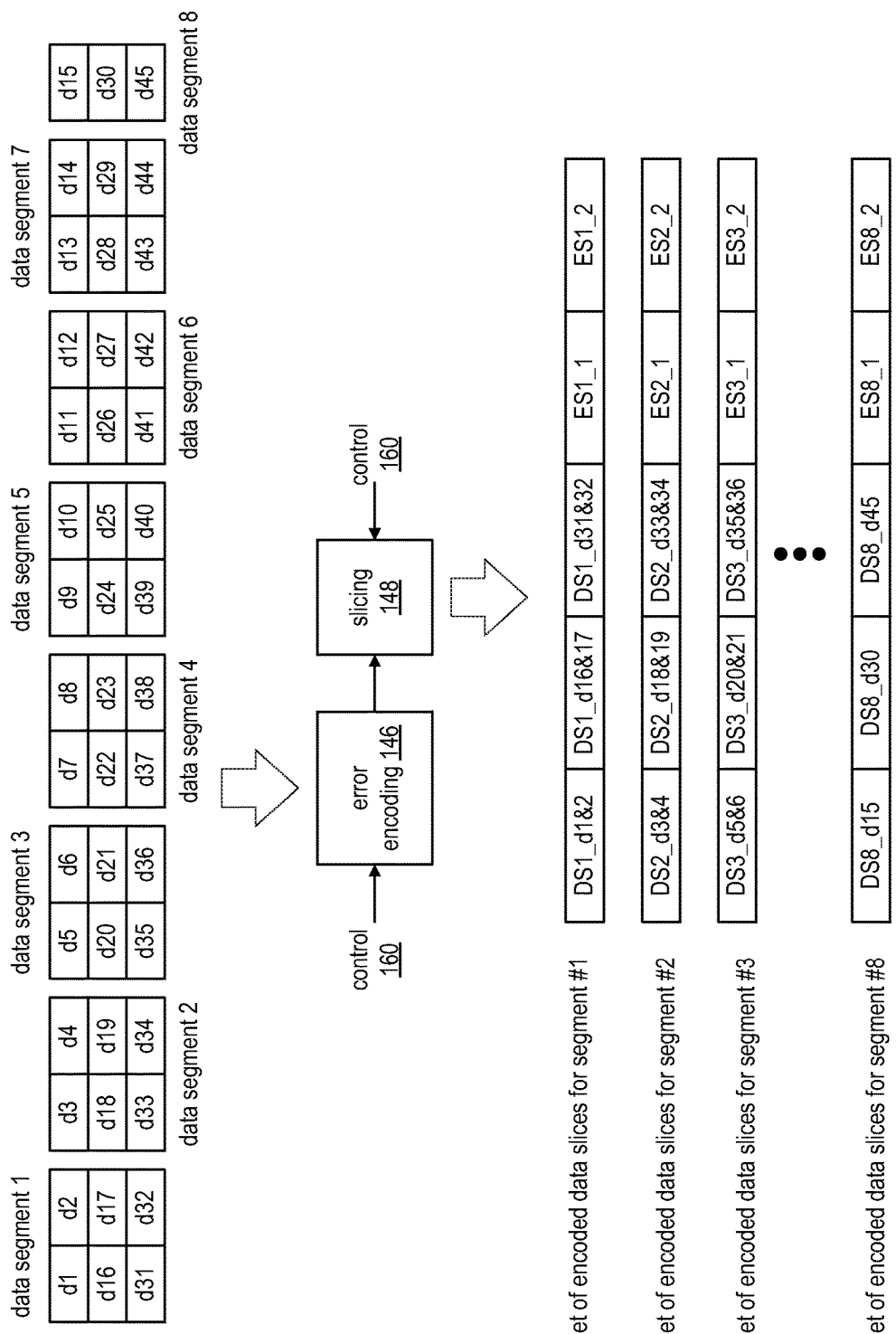
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
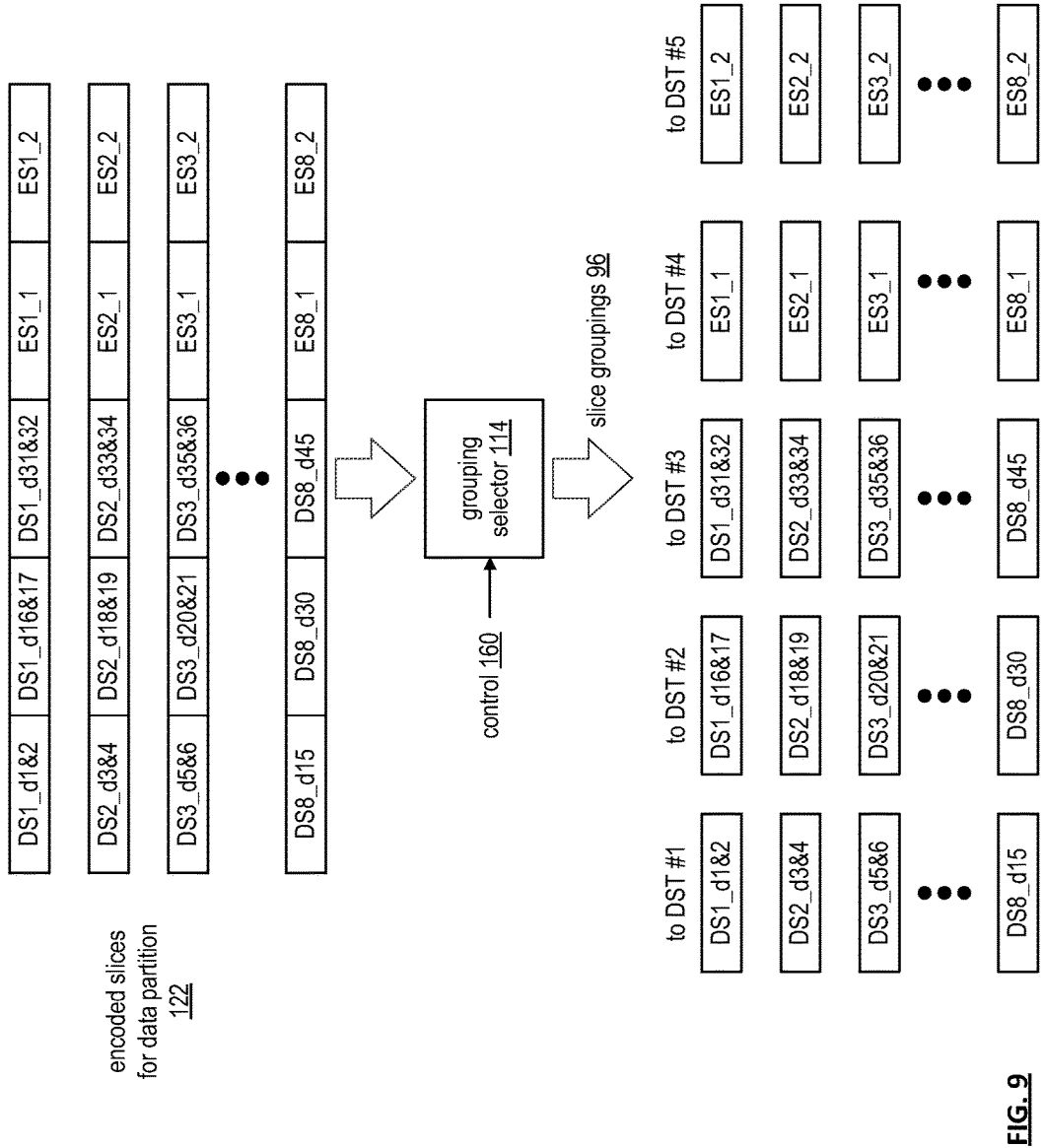
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
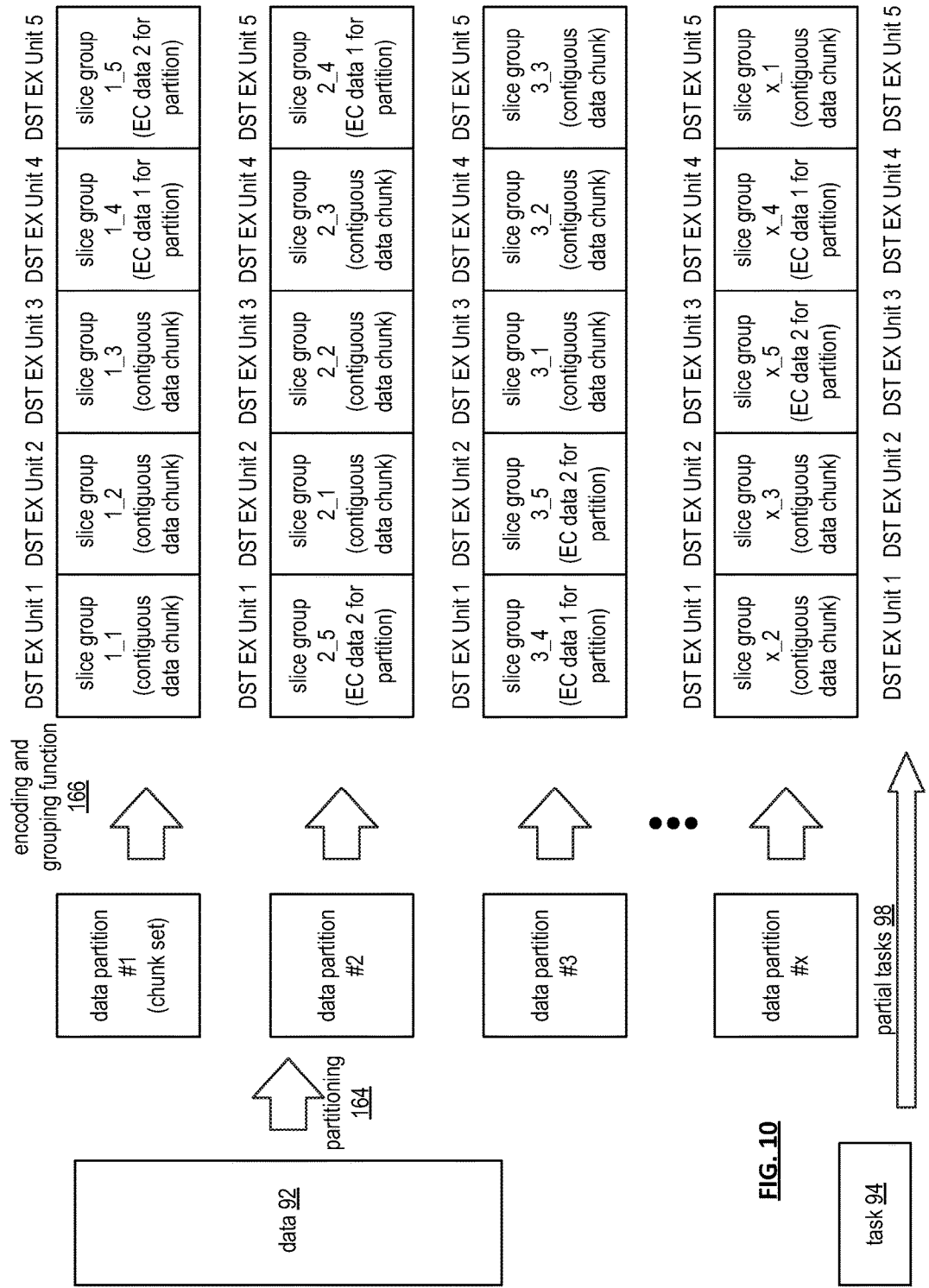
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
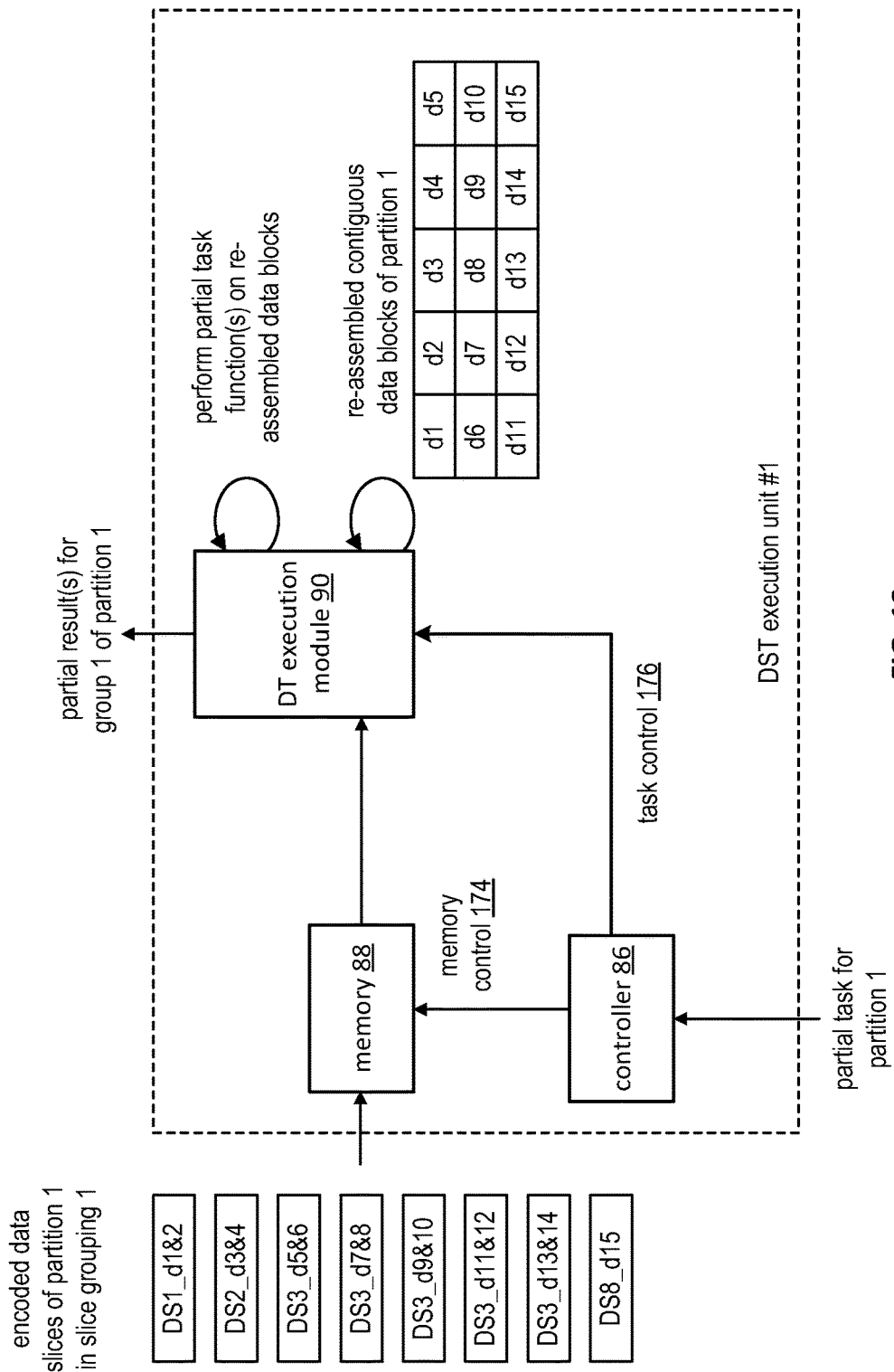
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
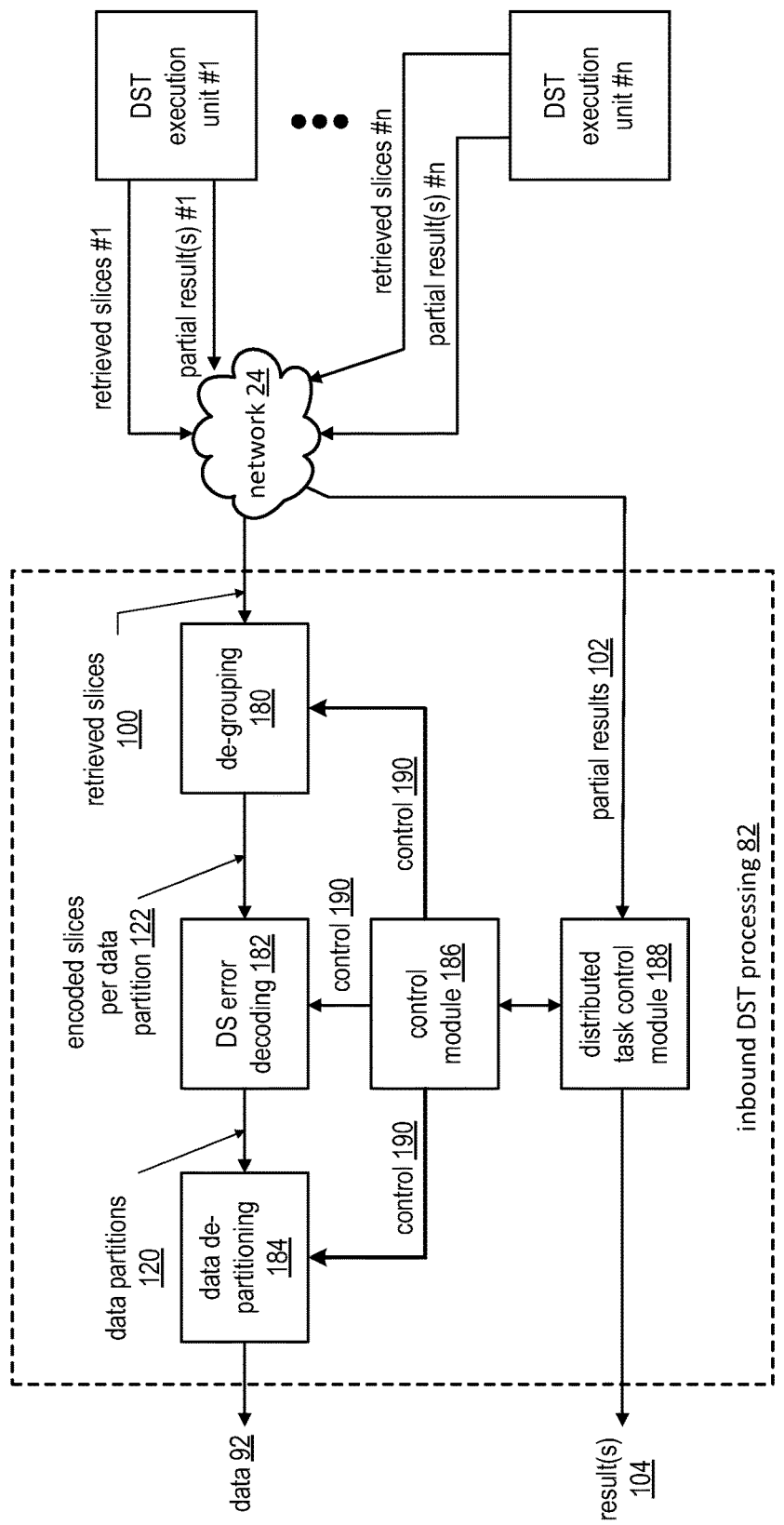
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
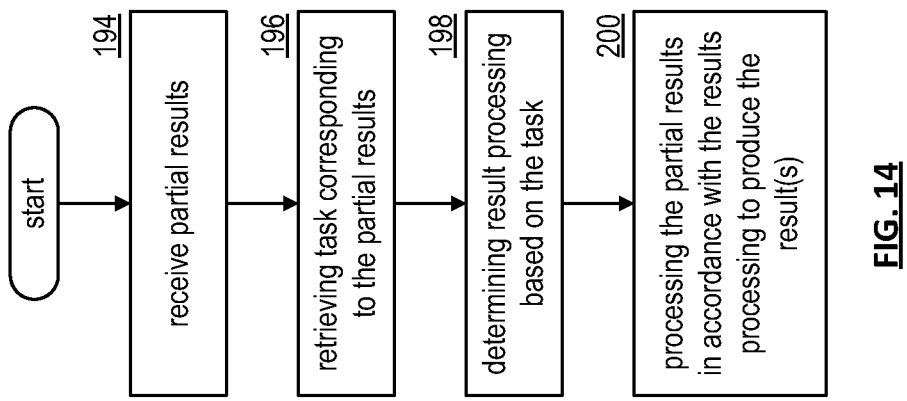
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
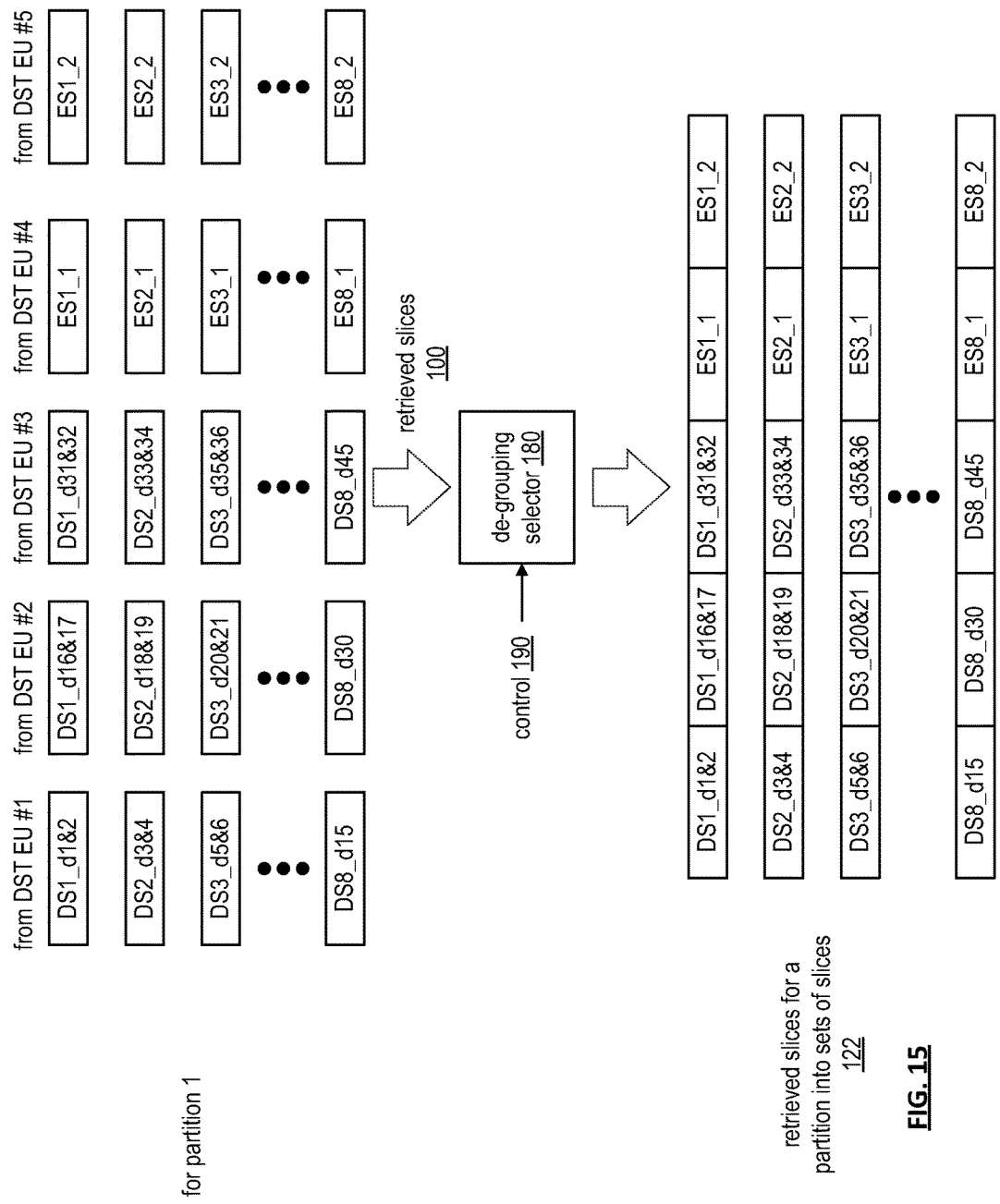
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
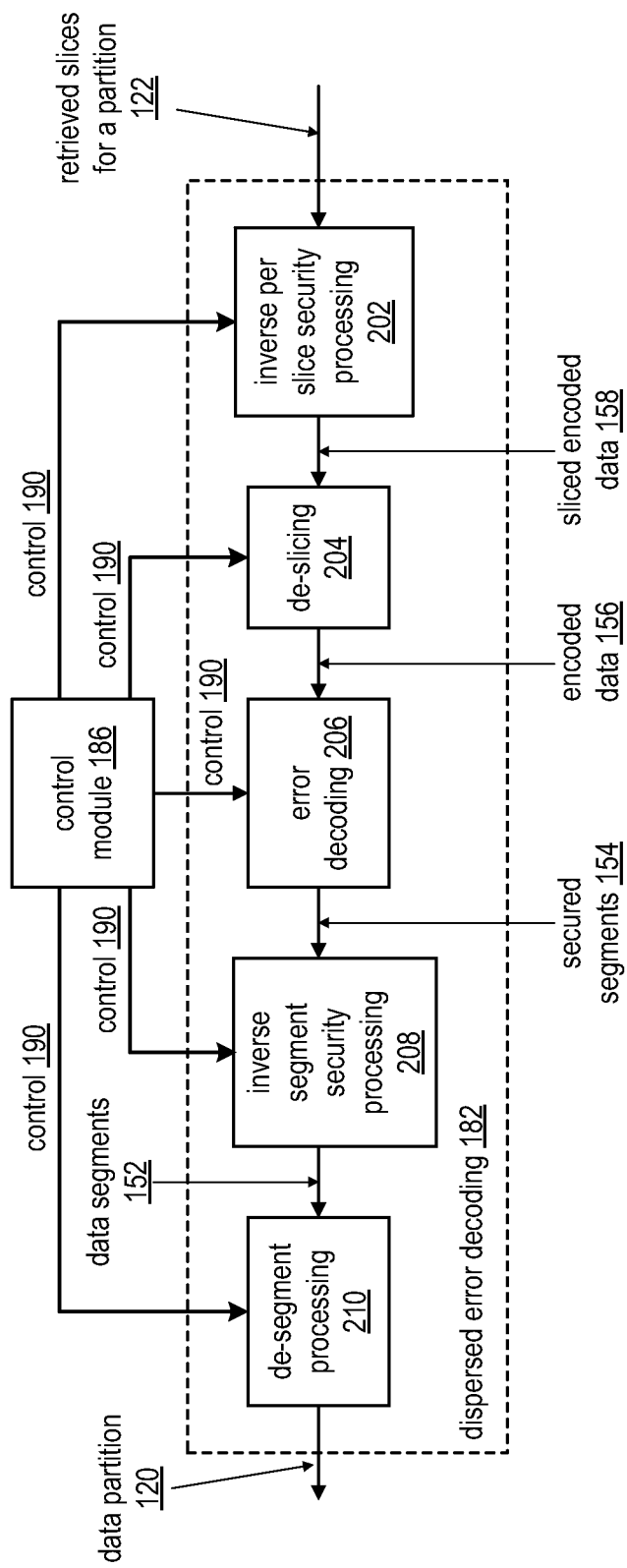
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
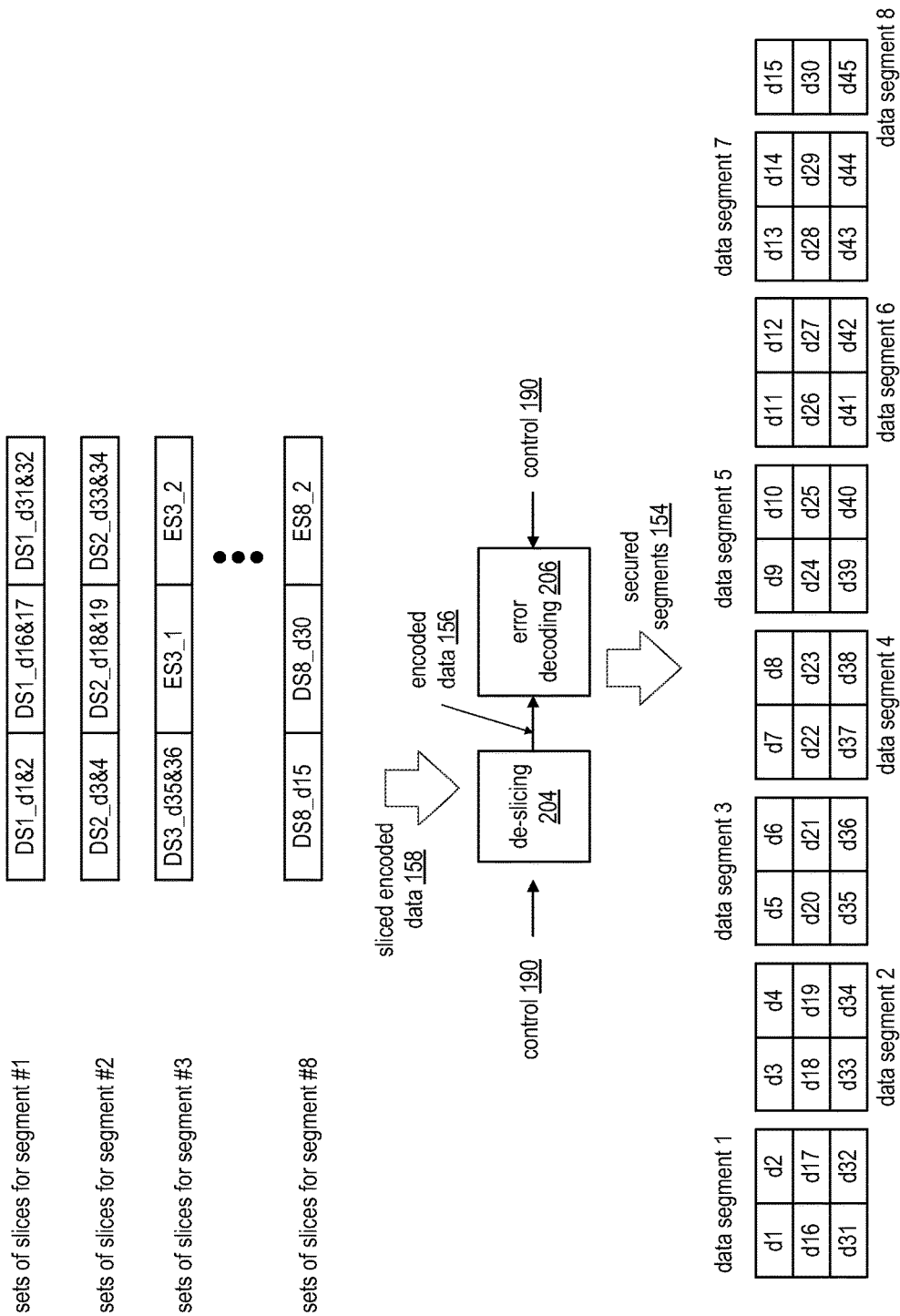
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
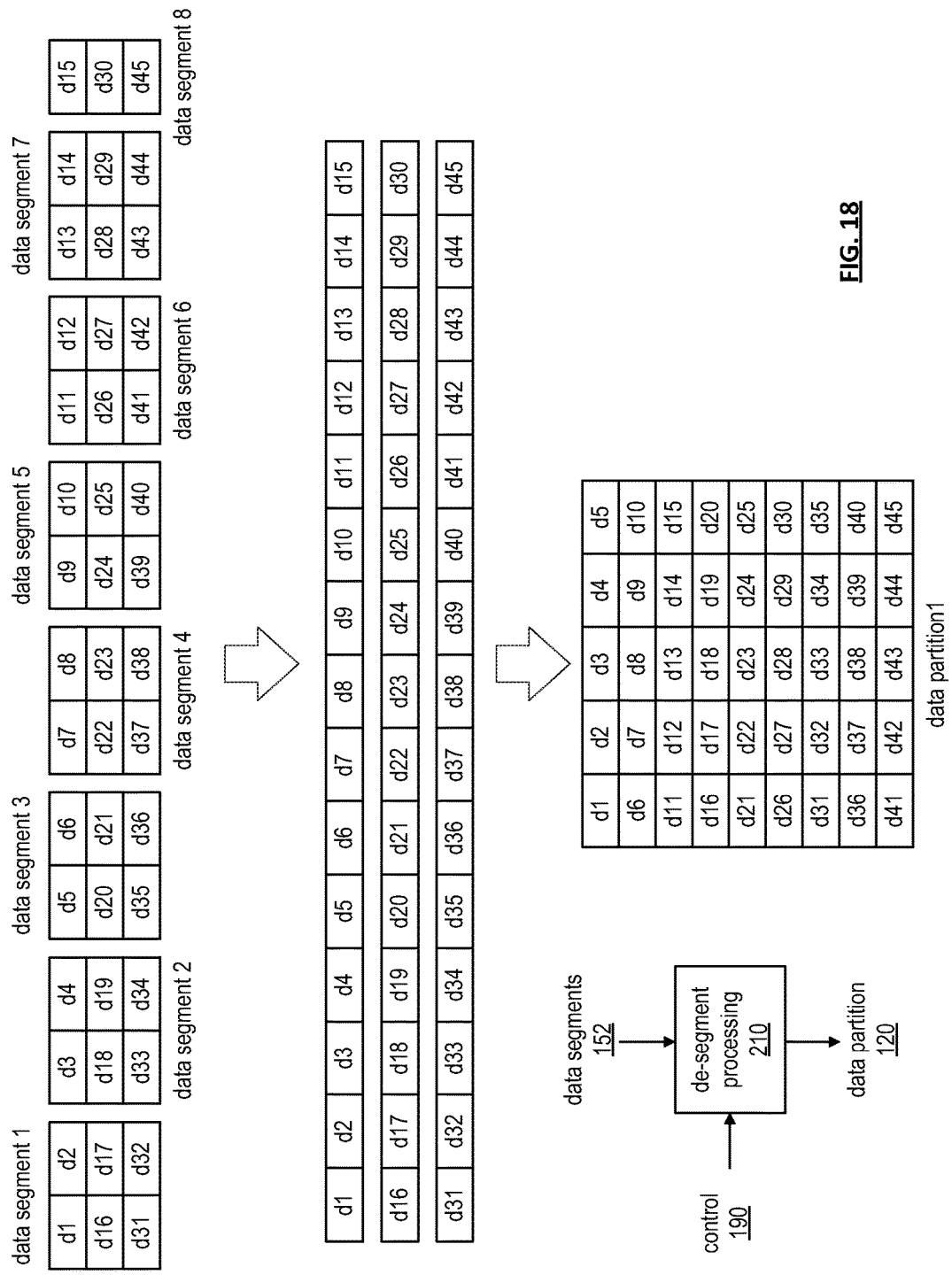
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
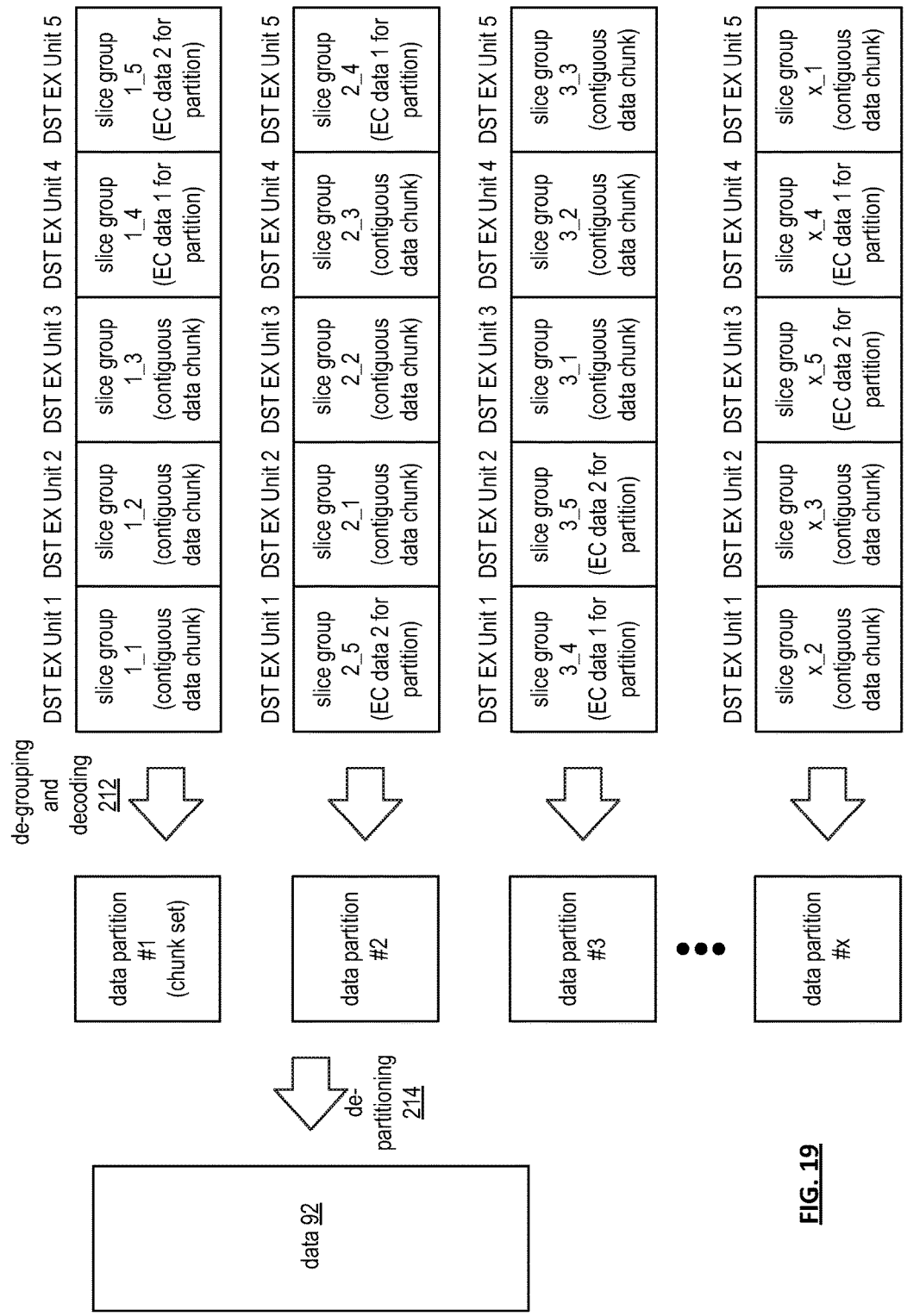
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
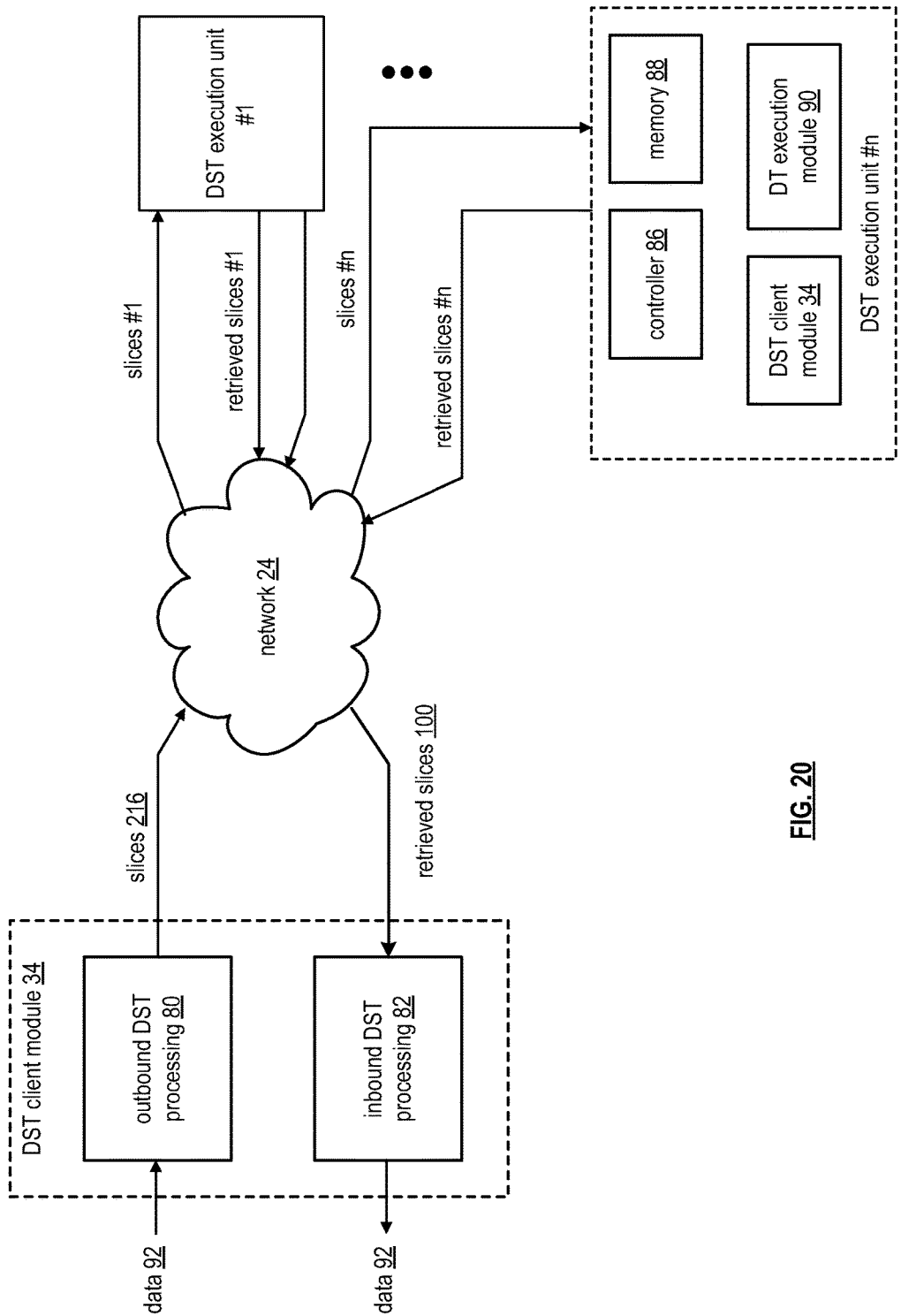
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
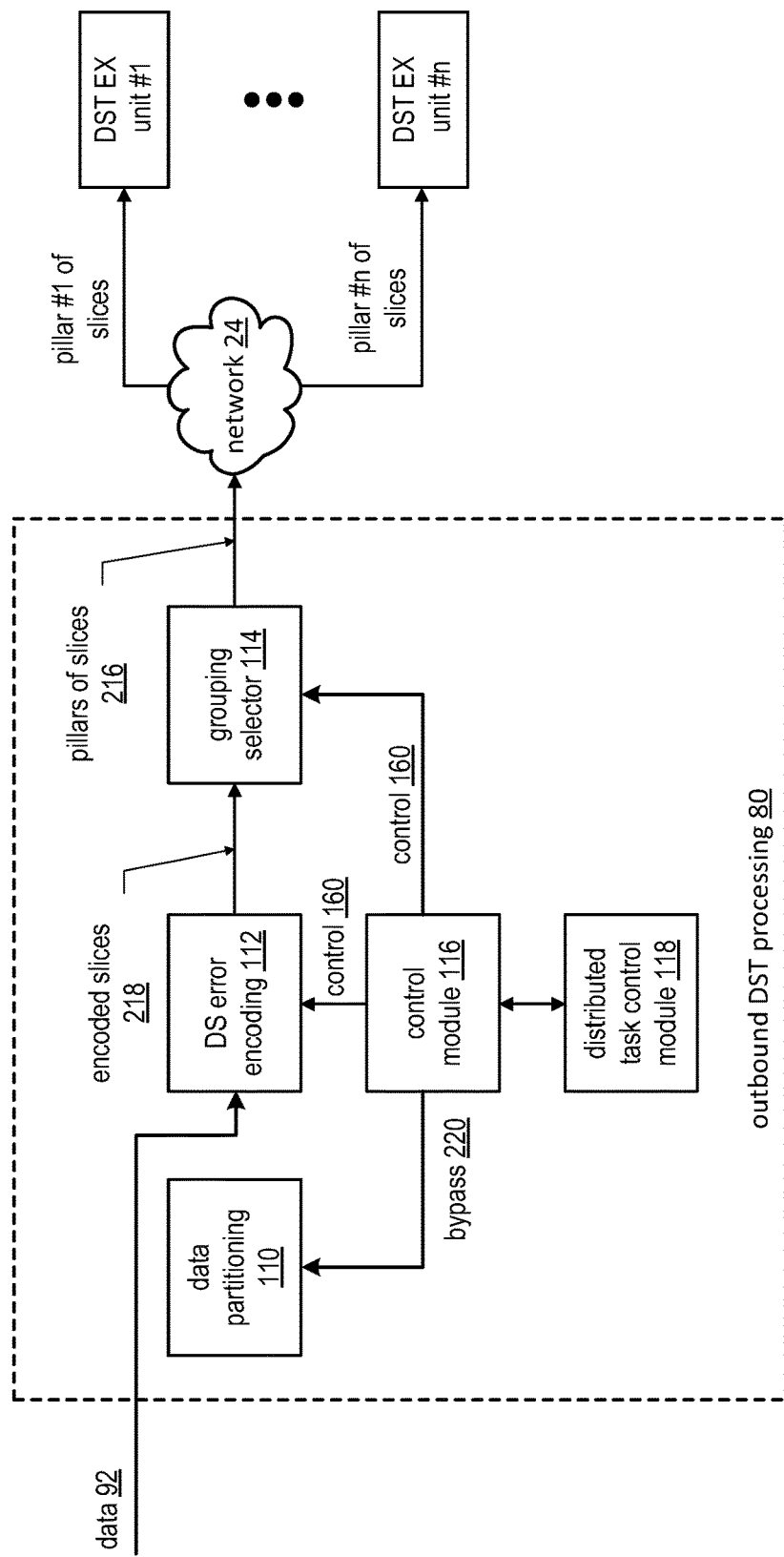
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
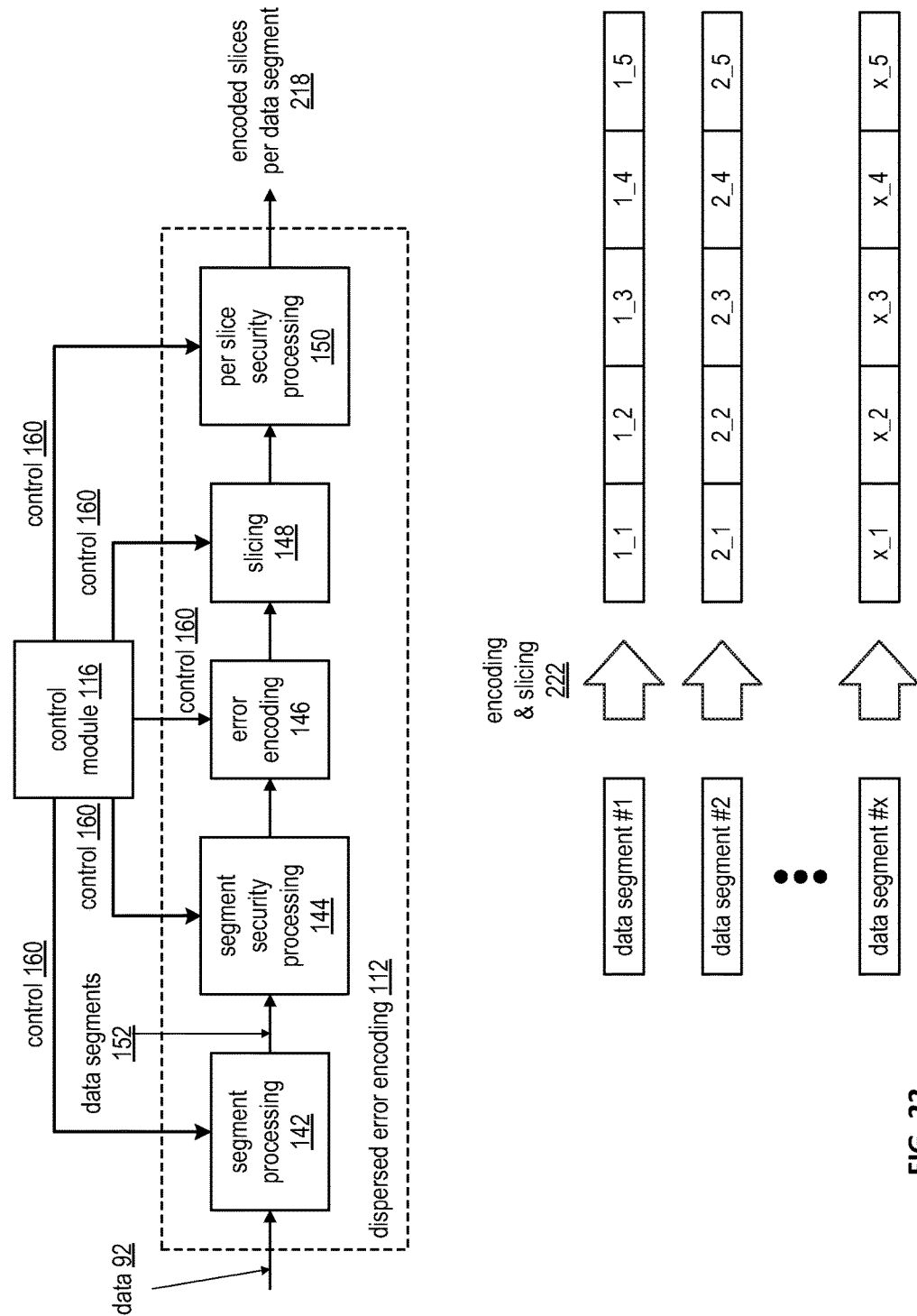
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
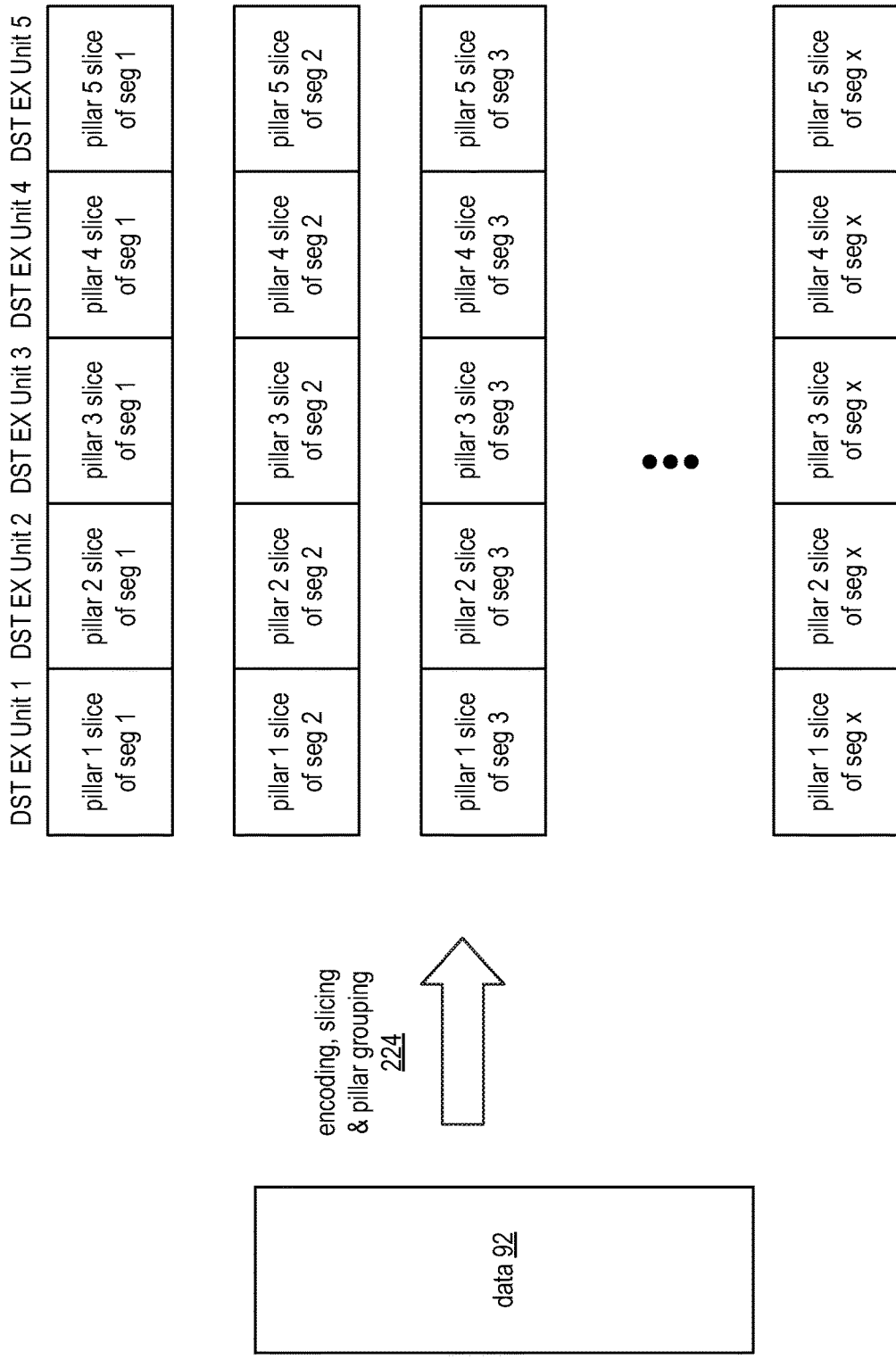
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
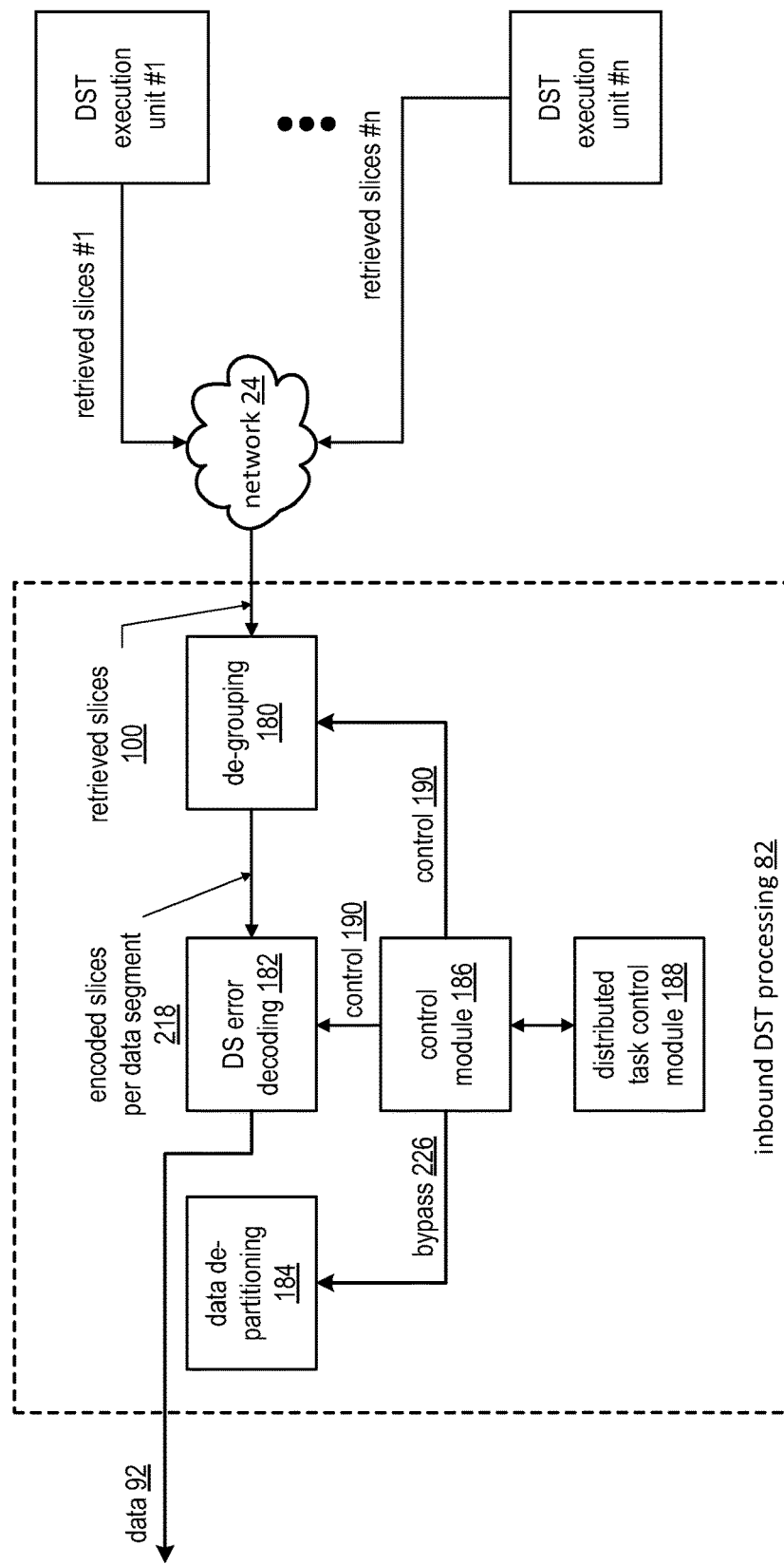
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
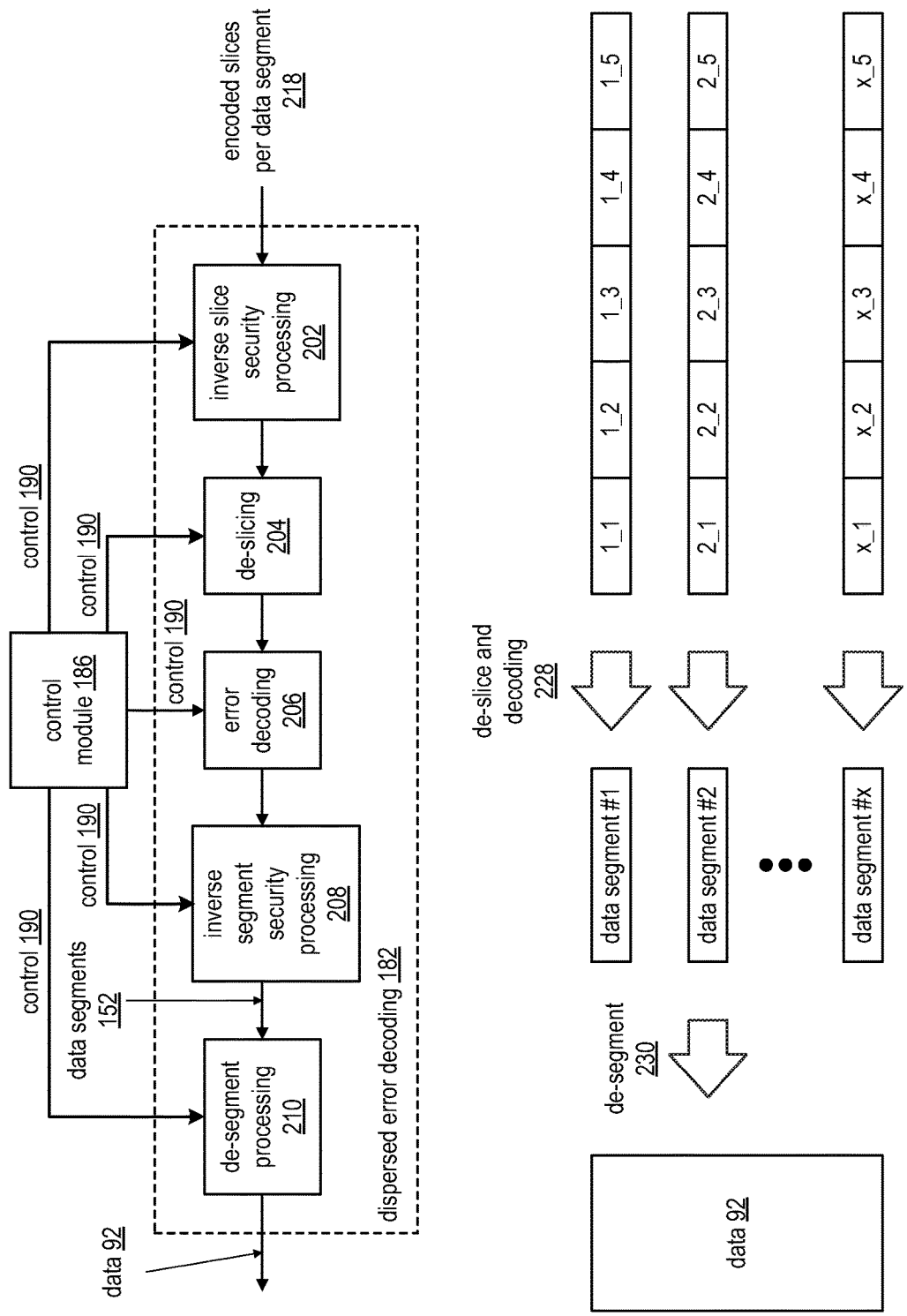
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
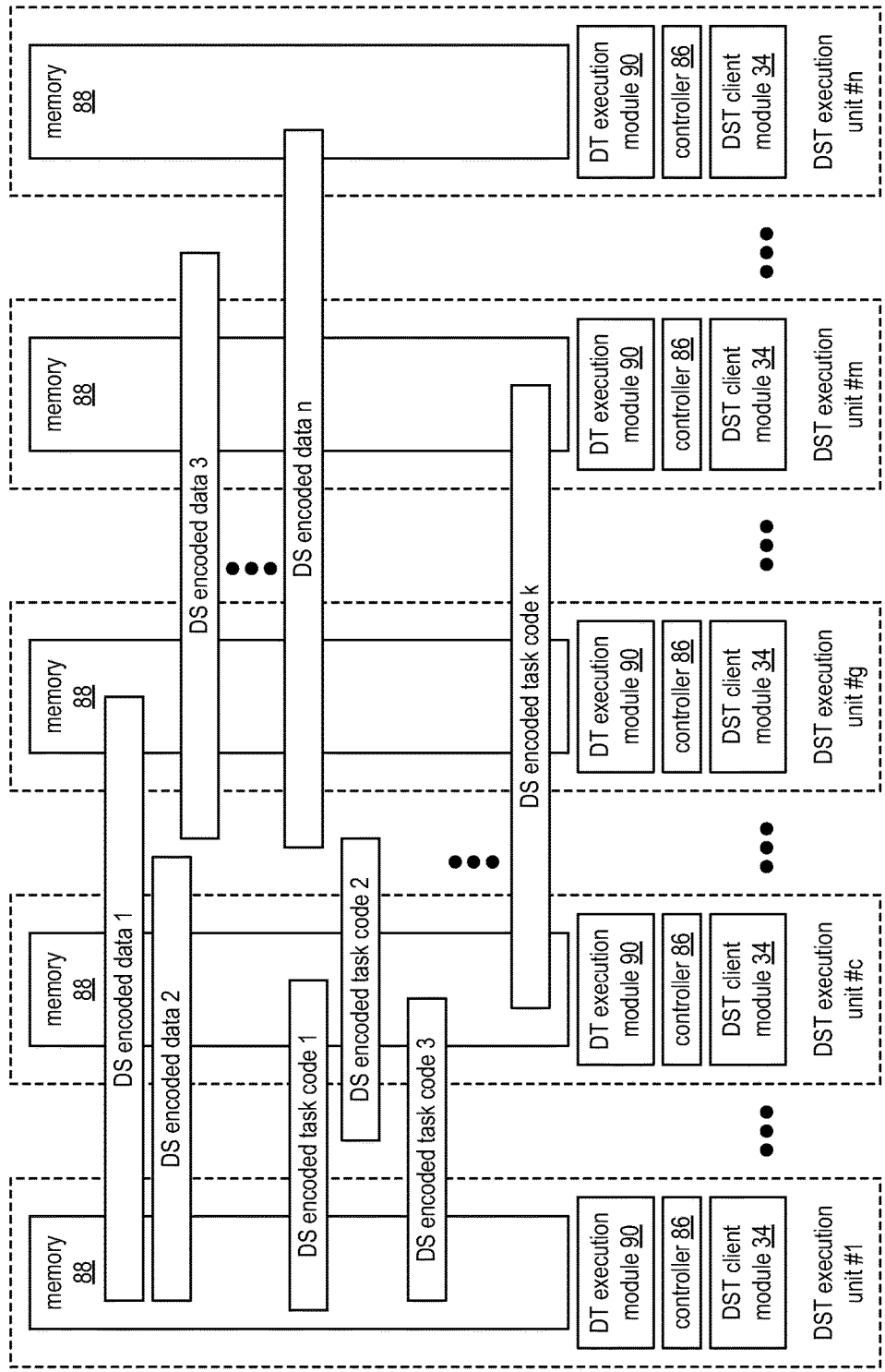
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
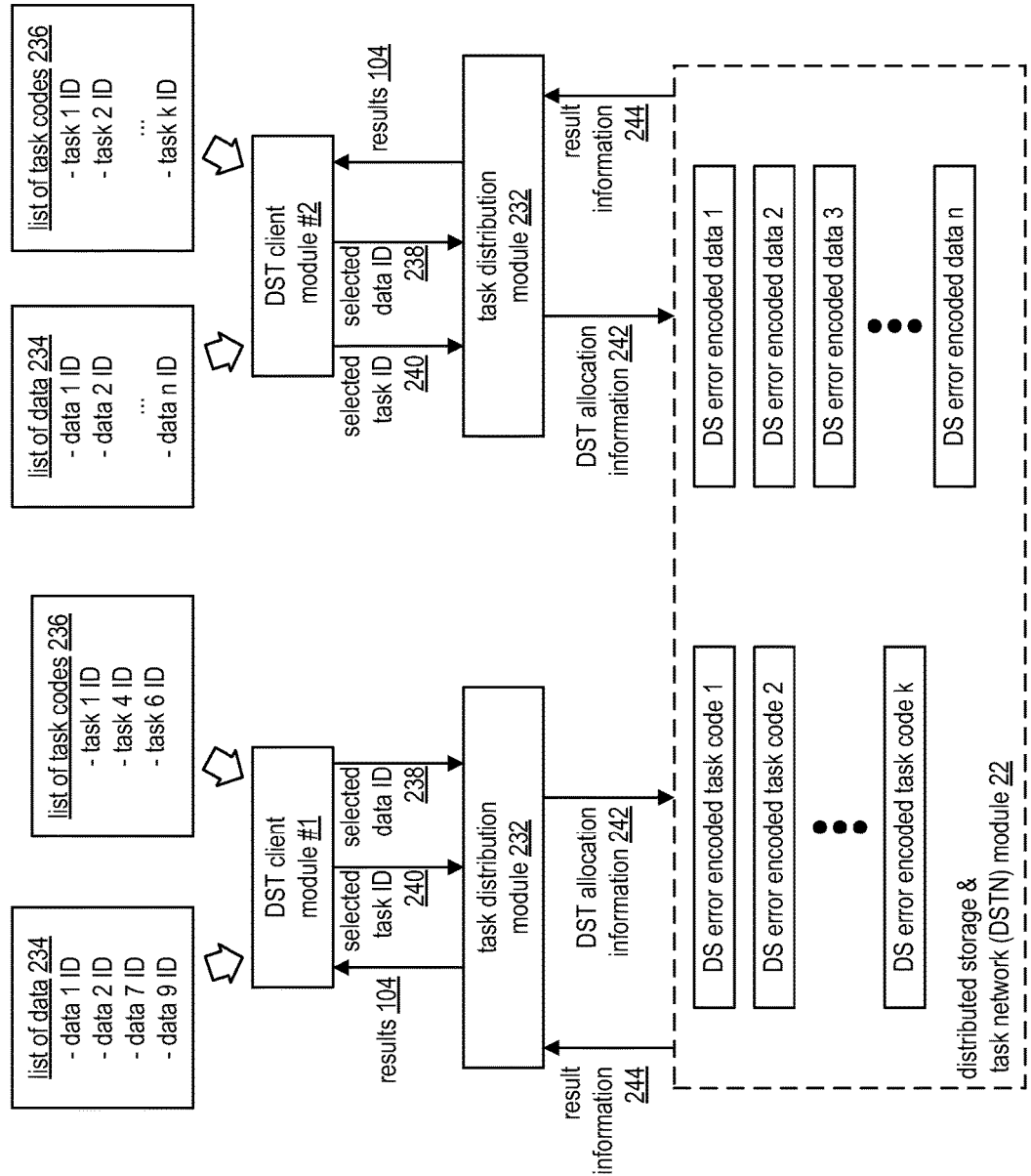
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
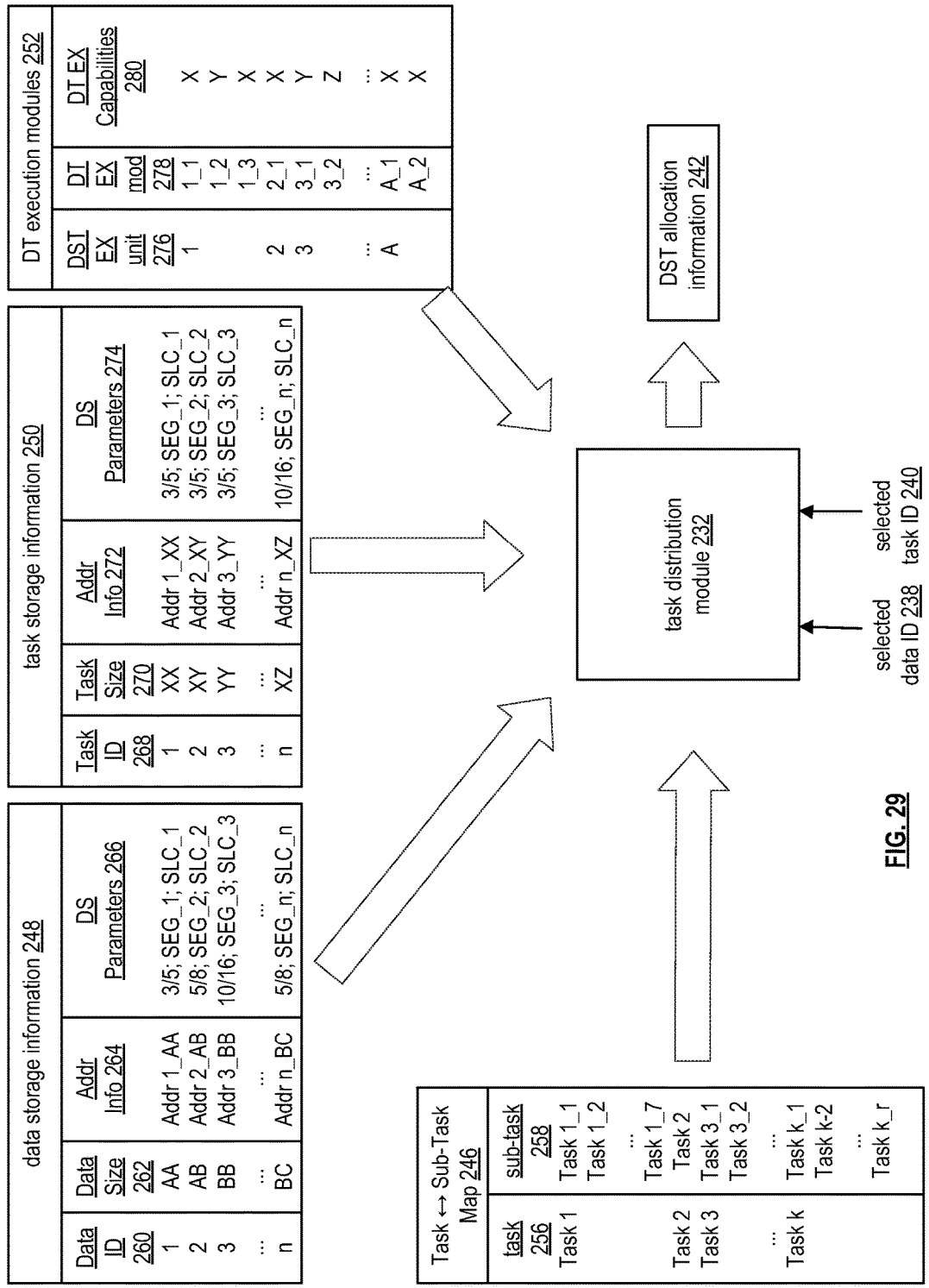
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/ pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
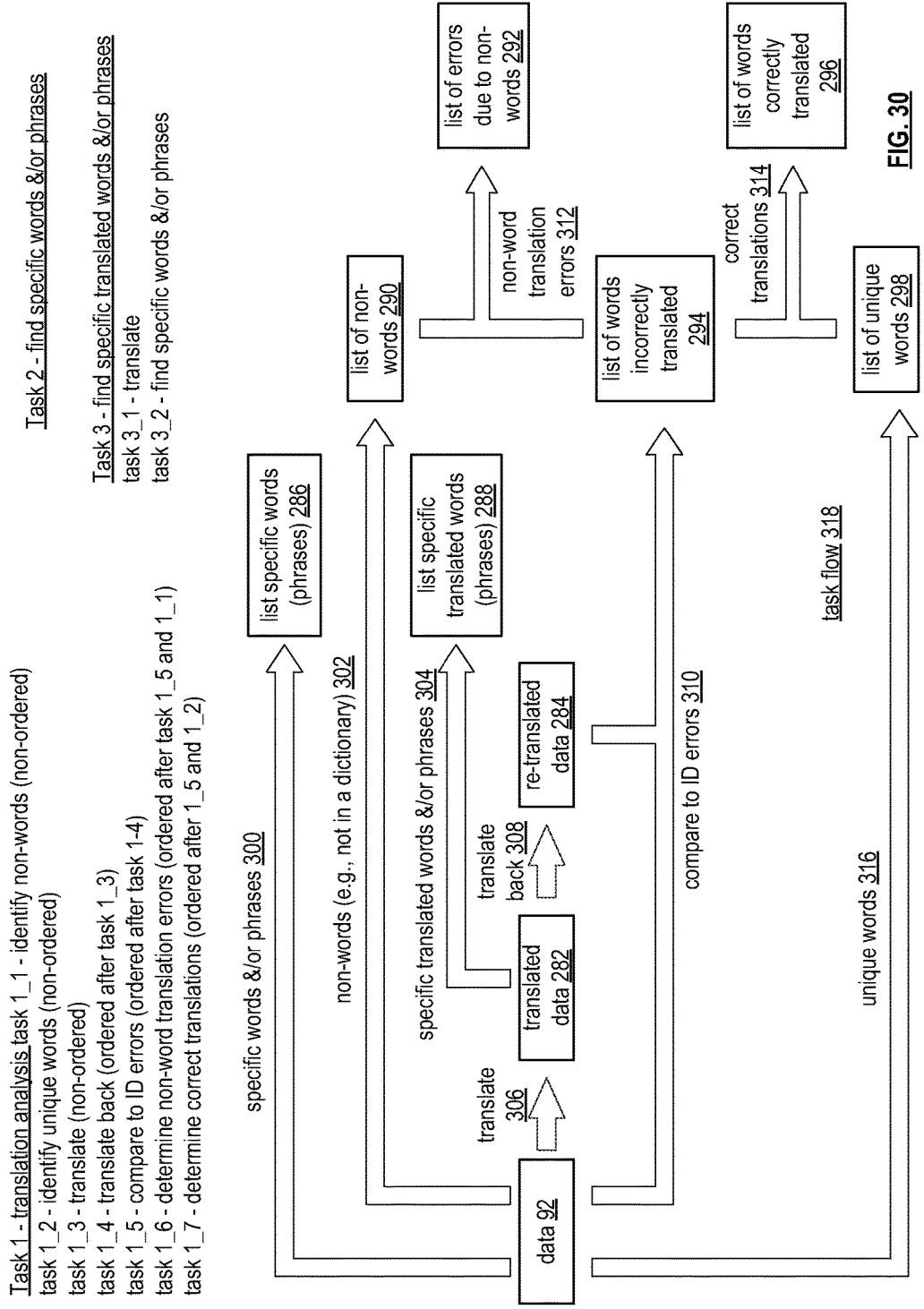
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
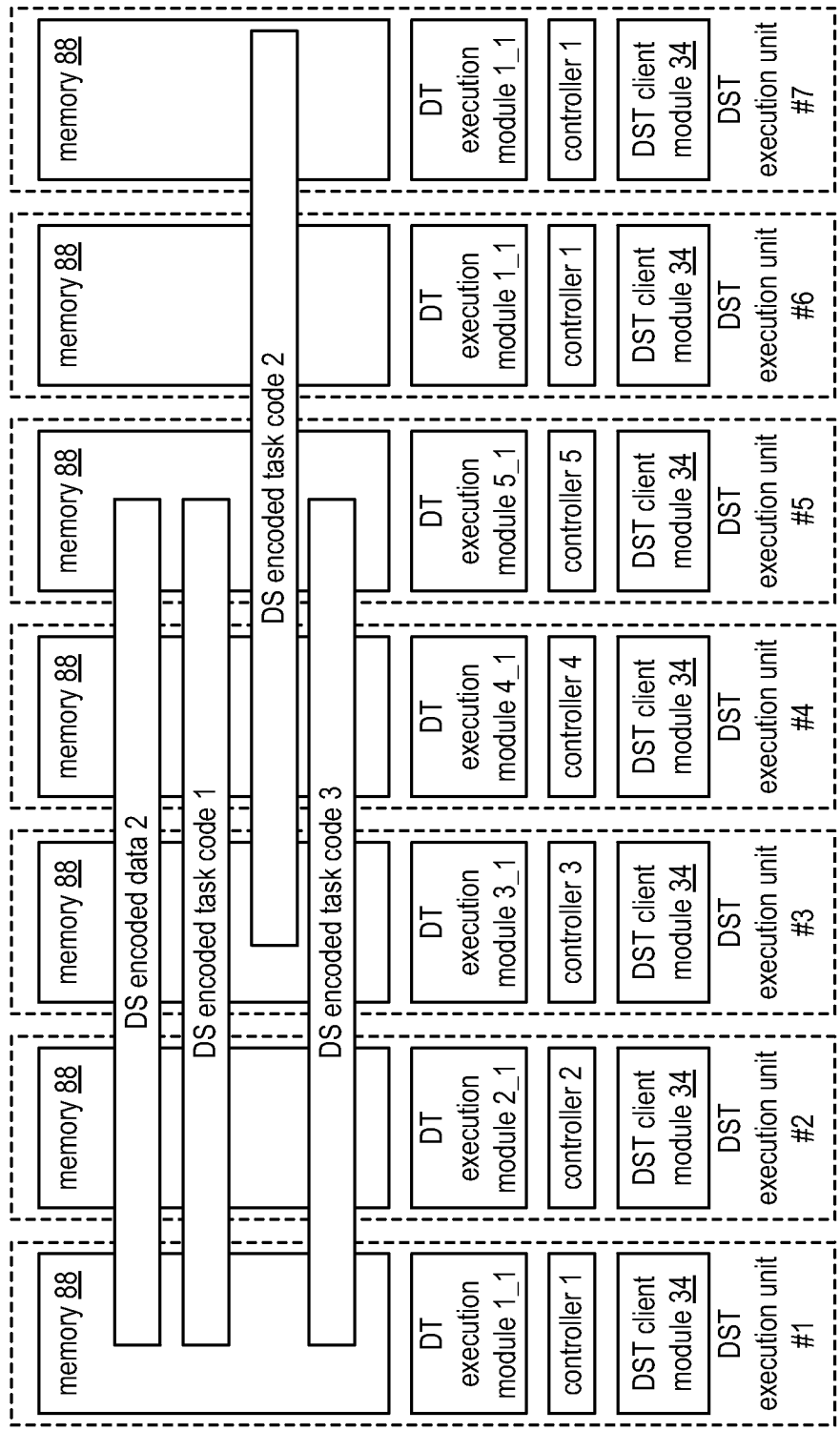
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data.

DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
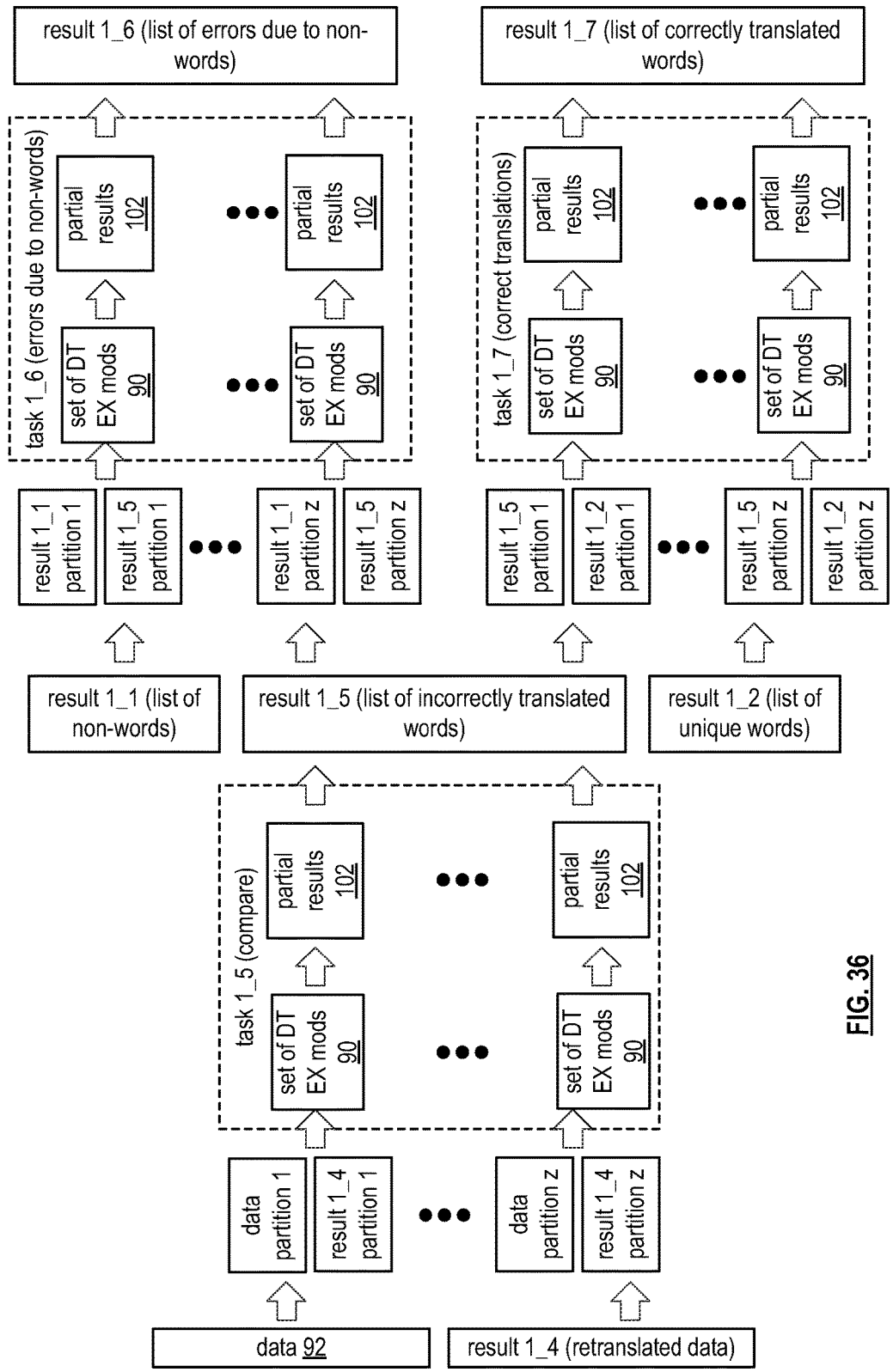

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
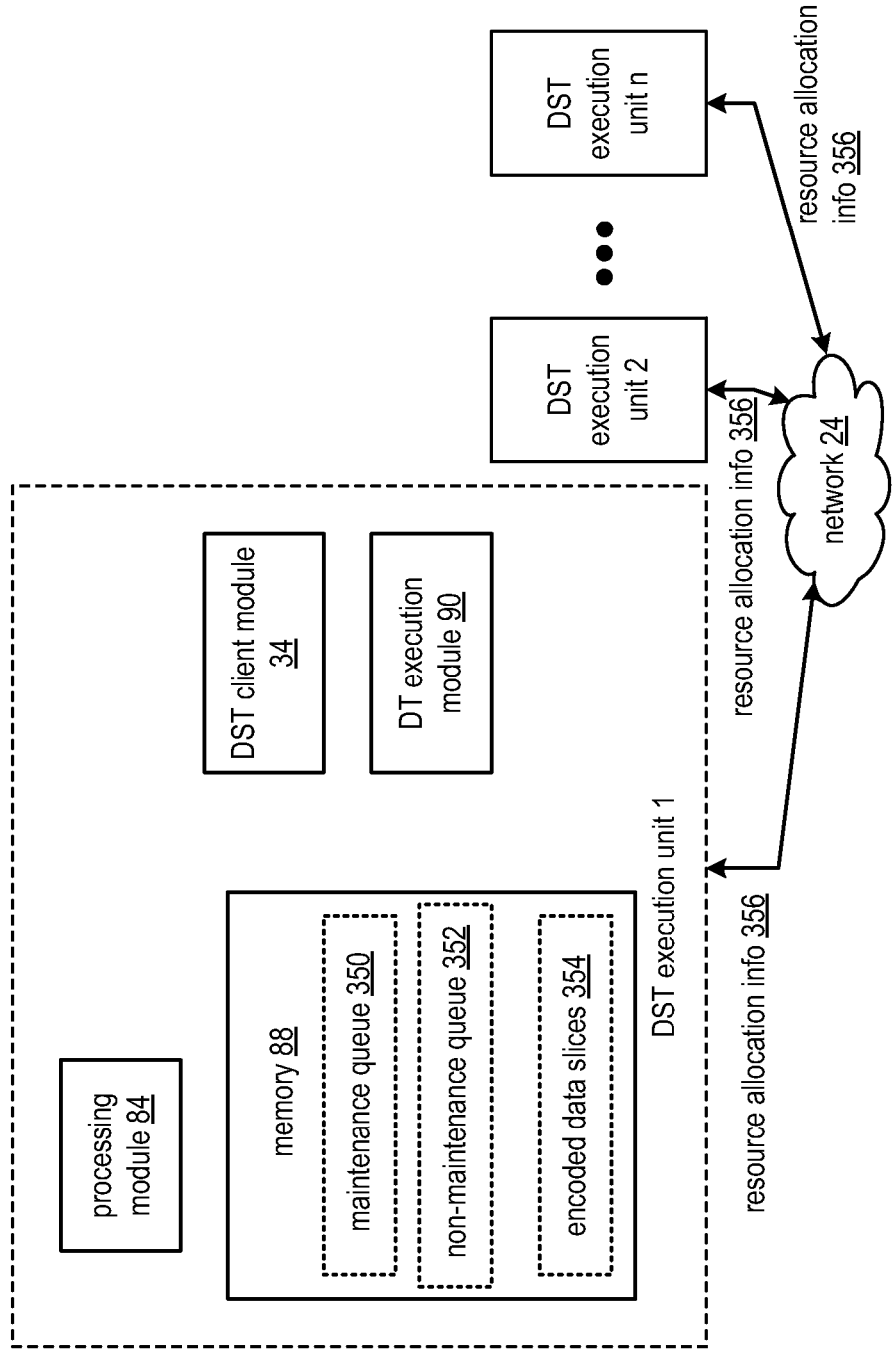
FIG. 40A is a schematic block diagram of an embodiment of a dispersed storage network (DSN) in accordance with the present invention.

FIG. 40A is a schematic block diagram of an embodiment of a dispersed storage network (DSN) that includes a set of distributed storage and task (DST) execution units 1-$n$ and the network 24 of FIG. 1. Alternatively, the DSN may include any number of DST execution units. Each DST execution unit may be implemented utilizing the DST execution unit 36 of FIG. 1. Each DST execution unit includes the processing module 84 of FIG. 3, the memory 88 of FIG. 3, the DST client module 34 of FIG. 3, and the distributed task (DT) execution module 90 of FIG. 3. One or more portions of the memory 88 are utilized for storage of a maintenance queue 350, a non-maintenance queue 352, and encoded data slices 354. The DSN functions to establish an operation execution schedule for instructions for execution by the set of DST execution units.

In an example of operation, the processing module 84 of each DST execution unit identifies pending maintenance operations. Such maintenance operations includes one or more of rebuilding encoded data slices associated with storage errors, migrating encoded data slices, transferring encoded data slices copying encoded data slices, and the DST client module 34 encoding encoded data slices to produce local redundancy slices. The identifying includes accessing the maintenance queue 350 of the memory 88, where the maintenance queue 350 includes instructions for execution associated with the maintenance operations.

Having identified the pending maintenance operations, the processing module 84 identifies pending non-maintenance operations. Such non-maintenance operations includes one or more of storing encoded data slices, retrieving encoded data slices, and the DT execution module 90 executing the partial tasks to produce partial results. The identifying includes accessing the non-maintenance queue 352 of the memory 88, where the non-maintenance queue 352 includes instructions for execution associated with the non-maintenance operations.

Having identified the pending non-maintenance operations, for a future timeframe, the processing module 84 determines a resource availability level to support execution of at least some of the pending maintenance and non-maintenance operations. For example, the processing module obtains, via the network 24, resource allocation information 356 from two or more of the DST execution units of the set of DST execution units. The resource allocation information 356 includes one or more of available resources, a current operation execution schedule, a list of pending operations, and an estimate of required resources associated with execution of the pending operations.

Having determined the resource availability level, the processing module 84 estimates a required resource level to execute at least some of the pending maintenance operations. For example, the processing module estimates the required resource level for each type of pending operation based on one or more of historical execution records, an operation type, a predetermination, performing a test, and interpreting test results. Having estimated the required resource level to execute the at least some of the pending maintenance operations, the processing module 84 estimates a required resource level to execute at least some of the pending non-maintenance operations.

Having estimated the required resource levels, the processing module 84 determines a balance factor to balance utilization of resources between the execution of pending maintenance operations and pending non-maintenance operations. The determining may be based on one or more of historical operation execution records, a priority level for the pending non-maintenance operations, and a number of pending maintenance operations. For example, the processing module 84 allocates a portion of an overall resource (e.g., time, number of modules) budget to execution of instructions associated with the maintenance queue in the non-maintenance queue. For instance, the processing module 84 allocates 15% of available resources for maintenance operations and a remaining 85% of available resources for non-maintenance operations.

Having determined the balance factor, the processing module 84 coordinates determination of required timing of pending operation execution with one or more other DST execution units of the set of DST execution units. For example, the processing module 84 coordinates producing of partial results for a common partial task substantially the same time. As another example, the processing module 84 coordinates retrieval of the set of encoded data slices 354 at substantially the same time. As yet another example, the processing module 84 coordinates scanning of the common DSN address range for storage errors by certain timeframe. Having coordinated the required timing, the processing module 84 updates an operation execution schedule based on one or more of the resource availability level, the required resource levels, the balance factor, and the required timing. For example, the processing module 84 coordinates with the at least one other DST execution unit to arrive at substantially similar time frames for initiation of execution of pending operations.

Figure 40B:
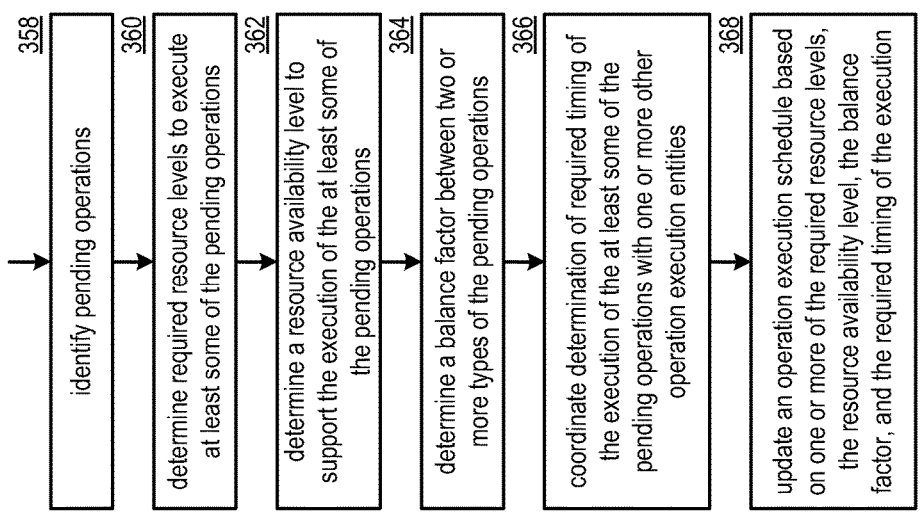
FIG. 40B is a flowchart illustrating an example of establishing an operation execution schedule in accordance the present invention.

FIG. 40B is a flowchart illustrating an example of establishing an operation execution schedule in accordance the present invention. The method begins or continues at step 358 where a processing module (e.g., of a distributed storage and task (DST) execution unit) identifies pending operations. The identifying includes at least one of receiving an operation request, interpreting a list of pending operations, and searching for pending operations. The identifying may further include identifying a type of pending operation, e.g., maintenance, and non-maintenance.

The method continues at step 360 where the processing module determines required resource levels to execute at least some of the pending operations. The method continues at step 362 where the processing module determines the resource availability level support execution of some of the pending operations. The method continues at step 364 where the processing module determines a balance factor between two or more types of the pending operations. The determining includes at least one of interpreting a goal, interpreting historical operation execution records, interpreting a priority level for an operation, identifying a number of pending maintenance operations, and identifying a current balance factor.

The method continues at step 366 where the processing module coordinates determining of required timing of the execution of the at least some of the pending operations with one or more other operation execution entities. The coordinating includes one or more of identifying candidate operations requiring coordination, sending identifiers of the candidate operations to the one or more other operation execution entities (e.g., other storage units), estimating the required timing of the execution, and modifying the estimate of the required timing of execution based on received resource allocation information.

The method continues at step 368 where the processing module updates an operation execution schedule based on one or more of the required resource levels, the resource availability level, the balance factor, and the required timing of the execution. For example, the processing module modifies a previous operation scheduled to achieve execution of pending operations within a desired time frame utilizing available resources.

Figure 41A:
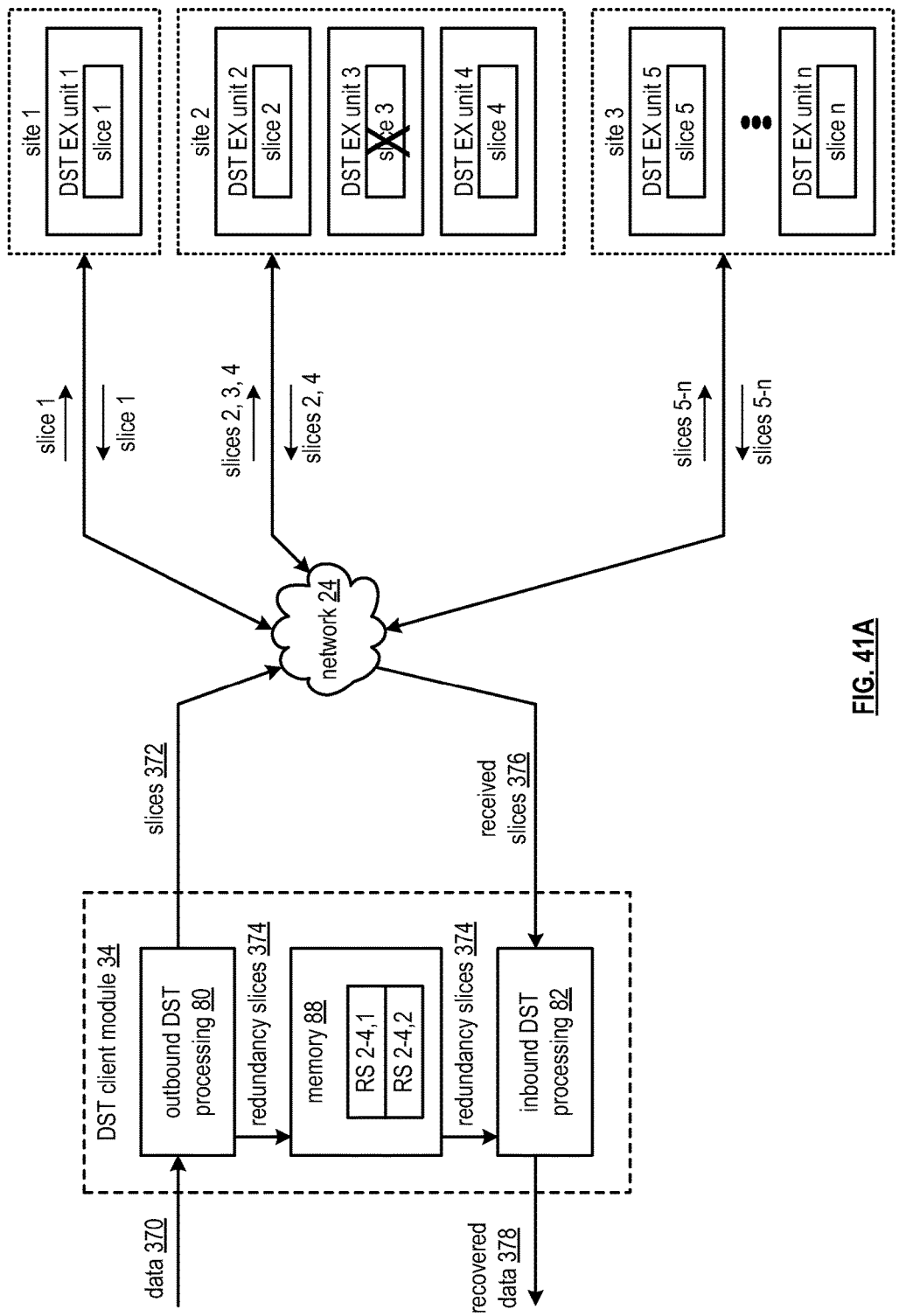
FIG. 41A is a schematic block diagram of another embodiment of a dispersed storage network (DSN) in accordance with the present invention.

FIG. 41A is a schematic block diagram of another embodiment of a dispersed storage network (DSN) that includes the distributed storage and task (DST) client module 34 of FIG. 1, the network 24 of FIG. 1, and a set of DST execution units 1-n implemented at sites 1-3. Alternatively, the set of DST execution units may be implemented up to as many as n sites. Each DST execution unit may be implemented utilizing the DST execution unit 36 of FIG. 1. The DST client module 34 includes the outbound DST processing 80 of FIG. 3, the memory 88 of FIG. 3, and the inbound DST processing 82 of FIG. 3. The DSN functions to access data 370 stored in the set of DST execution units. The accessing includes storing the data 370 and retrieving the stored data to produce recovered data 378.

In an example of operation of the storing of the data 370, the outbound DST processing 80 dispersed storage error encodes the data 370 that includes a data segment to produce slices 372 that includes a set of encoded data slices 1-n. Having produced the set of encoded data slices, the outbound DST processing 80 selects a subset of encoded data slices of the set of encoded data slices for local redundancy generation. The selecting may be based on one or more of an encoded data slice affiliation, historical slice retrieval reliability level information (e.g., by site, by the DST execution unit), interpreting an error message, and a predetermination. For example, the outbound DST processing 80 selects encoded data slices 2, 3, and 4 of the set of encoded data slices when encoded data slices 2, 3, and 4 are affiliated with storage by DST execution units 2, 3, and 4 at site 2 and slice retrieval reliability information associated with site 2 indicates a level of retrieval reliability that is less than a low retrieval reliability threshold level.

Having selected the subset of encoded data slices, the outbound DST processing 80 dispersed storage error encodes the subset of encoded data slices to produce one or more local redundant slices 374. For example, the outbound DST processing 80 dispersed storage error encodes encoded data slices 2, 3, and 4 to produce local redundancy slices 2-4, 1 and 2-4, 2. Having produced the one or more local redundancy slices three and 74, the outbound DST processing 80 stores the one or more local redundancy slices in a local memory. For example, the outbound DST processing 80 stores the local redundancy slices 2-4, 1 and 2-4, 2 in the memory 88.

Having stored the one or more local redundancy slices 374, the outbound DST processing 80 facilitates storage of the set of encoded data slices 1-n in the set of DST execution units 1-n. For example, the outbound DST processing 80 issues, via the network 24, a set of write slice requests to the set of DST execution units, where the set of write slice requests includes the set of encoded data slices 372. For instance, the outbound DST processing 80 sends encoded data slice 1 to DST execution unit 1, sends encoded data slices 2-4 to DST execution units 2-4 at site 2, and sends encoded data slices 5-n to DST execution units 5-n at site 3.

In an example of operation of the retrieving of the data 370, the inbound DST processing 82 issues read slice requests to the set of storage units, where the set of read slice requests includes a set of slice names associated with the set of encoded data slices. The set of DST execution units sends, via the network 24, available error-free encoded data slices to the inbound DST processing unit 82 to produce received slices 376. For example, DST execution unit 1 sends encoded data slice 1, DST execution units 2 and 4 send encoded data slices 2 and 4 when encoded data slice 3 is associated with a storage error, and DST execution units 5-n send encoded data slices 5-n.

Having received the encoded data slices 376, the inbound DST processing 82 identifies a missing encoded data slice, where the missing encoded data slices associated with the subset of encoded data slices. For example, the inbound DST processing 82 identifies that encoded data slice 3 is missing.

Having identified the missing encoded data slice, the inbound DST processing 82 generates a rebuilt encoded data slice for the missing encoded data slice utilizing at least one local redundancy slice 374. For example, the inbound DST processing 82 retrieves local redundancy slice 2-4, 1 from the memory 88, and dispersed storage error decodes received encoded data slices 2, 4 and local redundancy slice 2-4, 1 to produce the rebuilt encoded data slice 3. Having produced the rebuilt encoded data slice, the inbound DST processing 82 dispersed storage error decodes remaining received encoded data slices and the rebuilt encoded data slice to produce the recovered data 378.

Figure 41B:
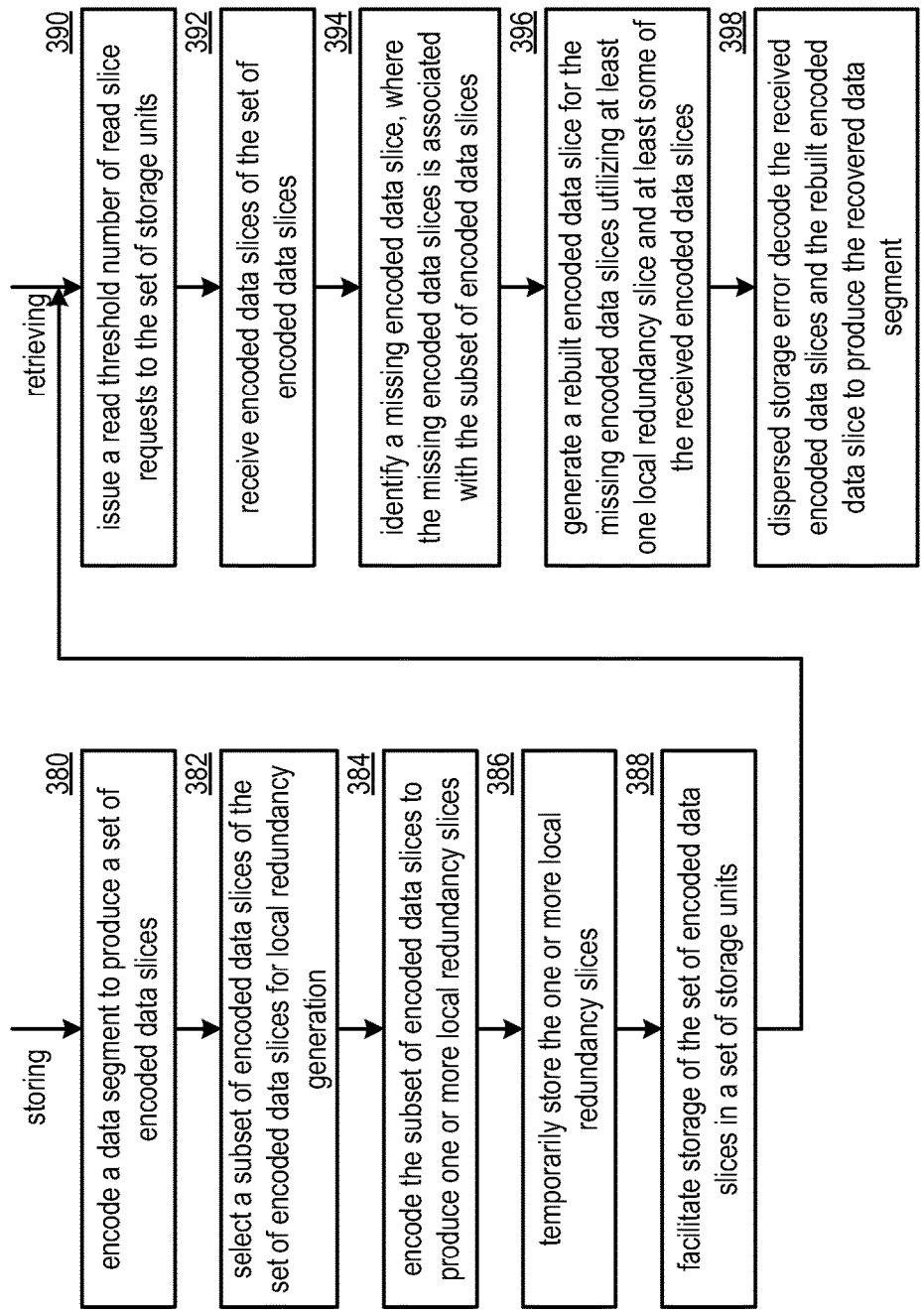
FIG. 41B is a flowchart illustrating an example of reproducing data utilizing local redundancy in accordance the present invention.

FIG. 41B is a flowchart illustrating an example of reproducing data utilizing local redundancy in accordance with the present invention. The method begins or continues at a storing step 380 where a processing module (e.g., of a distributed storage and task (DST) client module) dispersed storage error encodes a data segment to produce a set of encoded data slices. The method continues at step 382 where the processing module selects a subset of encoded data slices of the set of encoded data slices for local redundancy generation. The selecting may be based on one or more of a site mapping, an error message, a predetermination, and a slice affiliation indicator.

The method continues at step 384 where the processing module dispersed storage error encodes the subset of encoded data slices to produce one or more local redundancy slices. The method continues at step 386 where the processing module temporarily stores the one or more local redundancy slices. The storing may include one or more of storing the one or more local redundancy slices in a local memory and establishing a time frame of storage indicating when to delete the one or more local redundancy slices. For example, the establishing includes indicating to delete when storage is confirmed of each encoded data slice of the set of encoded data slices. As another example, the establishing includes deleting when a retrieval reliability indicator is greater than a retrieval reliability threshold level. As yet another example, the establishing includes deleting when retrieving a dilution request. The method continues at step 388 where the processing module facilitates storage of the set of encoded data slices in a set of storage units.

The method begins or continues at a retrieving step 390 where the processing module issues a read threshold number of read slice requests to the set of storage units. The method continues at step 392 where the processing module receives encoded data slices of the set of encoded data slices. The method continues at step 394 where the processing module identifies a missing encoded data slice, where the missing encoded data slice is associated with the subset of encoded data slices. For example, the processing module identifies the missing slice when receiving less than a read threshold number of encoded data slices.

The method continues at step 396 where the processing module generates a rebuilt encoded data slice for the missing encoded data slices utilizing at least one local redundancy slice and at least some of the received encoded data slices. For example, the processing module dispersed storage error decodes remaining encoded data slices of the set of encoded data slices and the at least one local redundancy slices to reproduce the subset of encoded data slices. The method continues at step 398 where the processing module dispersed storage error decodes the received encoded data slices and the rebuilt encoded data slice to reproduce the recovered data segment.

FIGS. 42A-C are a schematic block diagram of another embodiment of a dispersed storage network (DSN) that includes a plurality of distributed storage and task (DST) client modules 1-4, etc., the network 24 of FIG. 1, and a plurality of storage sets A-B. Alternatively, the DSN may include any number of storage sets. Each storage set may include a number of DST execution (EX) units in accordance with an information dispersal algorithm (IDA) width. For example, the storage set A includes DST execution units 1-15 when utilized with an IDA width of 15 and the storage set B includes DST execution units 1-6 when utilized with an IDA width of 6. Each DST execution unit may be implemented utilizing the DST execution unit 36 of FIG. 1. Hereafter, each DST execution unit may be interchangeably referred to as a storage unit. Each DST client module includes the outbound DST processing 80 of FIG. 3 and the inbound DST processing 82 of FIG. 3. Hereafter, each of the DST client modules may be interchangeably referred to as retrieving devices. For example, the DST processing unit 16 of FIG. 1 includes the DST client module 34 and may retrieve the stored data object 400 as a retrieving device. The DSN functions to maintain data storage in accordance with an access metric. The maintaining includes one or more of storing a data object 400 in at least one of the storage sets, re-storing the data object 400 in the at least one of the storage sets, and facilitating retrieval of the data object 400.

FIG. 42A illustrates an example of operation of the storing of the data object 400 where the outbound DST processing 80 determines storage efficiency dispersal parameters 402 to utilize when initially storing the data object 400 in at least one of the storage sets using a storage efficiency approach. Hereafter, the storage efficiency dispersal parameters 402 may be interchangeably referred to as first dispersed storage error encoding parameters. The determining may be based on one or more of an expected retrieval frequency, a storage utilization level, an available storage level, a storage efficiency goal, and a predetermination. The storage efficiency dispersal parameters 402 includes an information dispersal algorithm (IDA) width=n, a decode threshold number=k and a ratio of the decode threshold number to the IDA width such that the ratio is greater than a high threshold level to produce storage efficiency greater than a storage efficiency threshold level. For example, the outbound DST processing 80 determines the storage efficiency dispersal parameters 402 to include a decode threshold of 10 and an IDA pillar width of 15 such that the ratio is 0.75 when the expected retrieval frequency is less than a high retrieval frequency threshold level and as such, storage efficiency is more desirable than throughput efficiency when subsequently accessing the data object 400.

Having determined the storage efficiency dispersal parameters, the outbound DST processing 80 facilitates storage of the data object 400 in the storage set A when the storage set A is associated with the storage efficiency dispersal parameters 402 (e.g., includes 15 storage units when the IDA width is 15). For example, the outbound DST processing 80 dispersed storage error encodes the data object 400 using the storage efficiency dispersal parameters 402 to produce a first plurality of sets of encoded data slices A1-A15 and sends, via the network 24, the first plurality of sets of encoded data slices to the DST execution units 1-15 of the storage set A for storage.

FIG. 42B illustrates an example of operation of the re-storing of the data object where the DST client module 1 determines that an access metric regarding the encoded data object 400 exceeds an access threshold, where the encoded data object 400 is stored as the first plurality of sets of encoded data slices based on the first dispersed storage error encoding parameters. The access metrics includes one or more of network traffic loading information (e.g., a utilization level of the network 24), and access rate of the data object 400 (e.g., by the plurality of DST client modules), and storage unit loading of the set of storage units (e.g., storage set A) storing the first plurality of sets of encoded data slices (e.g., one or more storage units of the storage set A are overloaded). The determining may be based on one or more of interpreting a determination schedule (e.g., assess the access metric every 10 minutes), receiving an access metric verification request (e.g., from a managing unit), and receiving a retrieval request 404 with regards to recovering the data object 400.

When the access metric exceeds the access threshold, the inbound DST processing 82 retrieves, via the network 24, a first decode threshold number of encoded data slices (e.g., encoded data slices A1-A10) of each set of the first plurality of sets of encoded data slices. Having retrieved the encoded data slices, the inbound DST processing 82 decodes the first decode threshold number of encoded data slices (e.g., encoded data slices A1-A10) of each set to recover the data object as recovered data 408. Hereafter, the recovered data 408 may be interchangeably referred to as recovered data object 408.

Having produce the recovered data 408, the outbound DST processing 80 re-encodes the recovered data object 408 using second dispersed storage error encoding parameters to produce a re-encoded data object, where the re-encoded data object includes a second plurality of sets of encoded data slices and where a second decode threshold number associated with the second dispersed storage error encoding parameters is less than the first decode threshold number. Hereafter, the second dispersed storage error encoding parameters may be interchangeably referred to as throughput efficiency dispersal parameters 406.

At least one of the inbound DST processing 82 and the outbound DST processing 80 may determine the throughput efficiency dispersal parameters 406 based on one or more of the access rate of the data object, a number of the retrieving devices, the network traffic loading information, a predetermination, a historical access information, and a desired number of simultaneous data accesses. As a specific example, the inbound DST processing 82 determines the second decode threshold number to be less than or equal to one-half of the first decode threshold number when a desired level of network transactions is at least half of that associated with the first dispersed storage error encoding parameters. As another specific example, the inbound DST processing 82 determines the second decode threshold number to be less than or equal to one-half of a total number of encoded data slices in a set of the second plurality of sets of encoded data slices when a number of desired simultaneous data accesses is at least two. For instance, the inbound DST processing 82 determines the second decode threshold number to be two when the IDA width of the second dispersed storage error encoding parameters is six when the number of desired simultaneous data accesses is at least three.

Having re-encoded the recovered data object 408 using the second dispersed storage error encoding parameters, the outbound DST processing 80 sends, via the network 24, the second plurality of sets of encoded data slices to storage units of the DSN for storage. For example, the outbound DST processing 80 sends, via the network 24, encoded data slices B1-B6 to the DST execution units 1-6 of the storage set B for storage. Having facilitated storage of the second plurality of sets of encoded data slices, the outbound DST processing 80 may send a message to retrieving devices of the DSN, where the message indicates use of the second plurality of sets of encoded data slices for the data object. For example, the outbound DST processing 80 updates system registry information to indicate one or more of the use of the second plurality of sets of encoded data slices for the data object and the second dispersed storage error encoding parameters.

FIG. 42C illustrates an example of operation of the facilitating of the retrieving of the data object where one or more of the DST client modules (e.g., retrieving devices) receives, substantially simultaneously, the retrieval request 404 for the re-encoded data object. Having received the retrieval requests 404, each of the DST client modules identifies particular encoded data slices of each of the sets of encoded data slices of the second plurality of sets of encoded data slices for retrieval and issues, via the network 24, read slice requests to the corresponding storage units of the storage set B. The identifying may be based on one or more of a predetermination, the system registry information, a round robin selection process, and a random selection of all possible permutations of the second decode threshold number of encoded data slices of each set of the second plurality of sets of encoded data slices. For example, DST client module 1 selects and retrieves encoded data slices B1-B2, DST client module 2 selects and retrieves encoded data slices B3-B4, DST client module 3 selects and retrieves encoded data slices B5-B6, and DST client module 4 selects and retrieves encoded data slices B1-B2 (e.g., wraparound in the round robin selection process).

Having issued the read slice requests, each storage unit in a first subset (e.g., storage units 1 and 2) of the storage units, outputs, via the network 24, an encoded data slice (e.g., encoded data slices B1 and/or B2) of a set of the second plurality of sets of encoded data slices in response to a first retrieval request for the re-encoded data object. Each storage unit in a second subset (e.g., storage units 3-4) of the storage units, outputs, via the network 24, an encoded data slice (e.g., encoded data slices B3 and/or B4) of the set of the second plurality of sets of encoded data slices in response to a second retrieval request for the re-encoded data object. The storage units may receive the first and second retrieval requests for the re-encoded data object from first and second retrieving devices of the retrieving devices at substantially the same time (e.g., before completion of one request, the other was received). Each DST client modules receives the encoded data slices and reproduces the recovered data 408. For example, DST client module 2 receives encoded data slices B3-B4 to reproduce the recovered data 408 and DST client module 3 receives encoded data slices B5-B6 to reproduce the recovered data 408 etc.

Alternatively, or in addition to, when the access metric drops below the access threshold (e.g., with some hysteresis), the DST client module 1 sends a second message to the retrieving devices, where the second message indicates use of the first plurality of sets of encoded data slices for the data object (e.g., from storage set A). Further alternatively, the DST client module 1 sends, via the network 24, deletion messages to the storage units of the storage set B, where the deletion messages instruct the storage units to delete the second plurality of sets of encoded data slices.

FIG. 42D is a flowchart illustrating an example of maintaining data storage in accordance with an access metric in accordance the present invention. In particular, a method is presented for use in conjunction with one or more functions and features described in conjunction with FIGS. 1-39, 42A-C, and also FIG. 42D. The method begins at step 410 where a processing module of a computing device (e.g., of a distributed storage and task (DST) processing unit) of one or more computing devices of a dispersed storage network (DSN) determines that an access metric regarding an encoded data object exceeds an access threshold, where the encoded data object is stored as a first plurality of sets of encoded data slices based on first dispersed storage error encoding parameters.

When the access metric exceeds the access threshold, the method continues at step 412 where the processing module retrieves a first decode threshold number of encoded data slices of each set of the first plurality of sets of encoded data slices. The method continues at step 412 where the processing module decodes the first decode threshold number of encoded data slices of each set to recover the data object.

The method continues at step 414 where the processing module re-encodes the recovered data object using second dispersed storage error encoding parameters to produce a re-encoded data object, where the re-encoded data object includes a second plurality of sets of encoded data slices and where a second decode threshold number associated with the second dispersed storage error encoding parameters is less than the first decode threshold number. For example, the second decode threshold number is less than or equal to one-half of the first decode threshold number. As another example, the second decode threshold number is less than or equal to one-half of a total number of encoded data slices in a set of the second plurality of sets of encoded data slices.

The method continues at step 416 where the processing module outputs the second plurality of sets of encoded data slices to storage units of the DSN for storage therein. The method continues at step 418 where the processing module sends a message to retrieving devices of the DSN, where the message indicates use of the second plurality of sets of encoded data slices for the data object. For example, the processing module updates system registry information to indicate the usage of the second plurality of sets of encoded data slices for the data object.

The method continues at step 420 where each storage unit in a first subset of the storage units outputs an encoded data slice of a set of the second plurality of sets of encoded data slices in response to a first retrieval request for the re-encoded data object. The method continues at step 422 where each storage unit in a second subset of the storage units outputs an encoded data slice of the set of the second plurality of sets of encoded data slices in response to a second retrieval request for the re-encoded data object. The storage units may receive the first and second retrieval requests for the re-encoded data object from first and second retrieving devices of the retrieving devices at substantially the same time (e.g., before completion of one request, the other was received).

When the access metric drops below the access threshold (e.g., with some hysteresis) the method continues at step 424 where the processing module sends a second message to the retrieving devices, where the second message indicates use of the first plurality of sets of encoded data slices for the data object. The method continues at step 426 where the processing module sends deletion messages to the storage units, where the deletion messages instruct the storage units to delete the second plurality of sets of encoded data slices.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

FIG. 43A is a schematic block diagram of another embodiment of a dispersed storage network (DSN) that includes the distributed storage and task (DST) client module 34 of FIG. 1, the network 24 of FIG. 1, and a plurality of storage sets 1-2. Alternatively, the DSN may include any number of storage sets. Each storage set includes a set of any number of n DST execution (EX) units 1-n. Each DST execution unit may be implemented utilizing the DST execution unit 36 of FIG. 1. The DST client module 34 includes the outbound DST processing 80 of FIG. 3, the inbound DST processing 82 of FIG. 3, and a transfer module 430. The transfer module 430 may be implemented utilizing the processing module 84 of FIG. 3. Alternatively, the transfer module 430 may be implemented by any DST execution unit of the DSN. The DSN functions to access data and to balance storage of the data stored in the plurality of storage sets. The accessing includes storing the data and retrieving stored data.

In an example of operation of the storing of the data, the outbound DST processing 80 receives a first data object 432, dispersed storage error encodes the first data object 432 to produce a first plurality of sets of encoded data slices 1-n, sends, via the network 24, the first plurality of sets of encoded data slices 1-n 434 to the DST execution units 1-n of the storage set 1 for storage. As another example, the outbound DST processing 80 receives a second data object, dispersed storage error encodes the second data object to produce a second plurality of sets of encoded data slices 1-n, sends, via the network 24, the second plurality of sets of encoded data slices 1-n to the DST execution units 1-n of the storage set 2 for storage.

In an example of operation of the retrieving of the data, the inbound DST processing 82 generates a plurality of sets of slice names associated with the plurality of sets of encoded data slices associated with the first data object, generates a read threshold number of read slice requests that includes a read threshold number of slice names of each set of slice names, sends, via the network 24, the read threshold number of read slice requests to a read threshold number of DST execution units of the storage set 1, receives encoded data slices 438, and dispersed storage error decodes a decode threshold number of encoded data slices of each set of encoded data slices of the first plurality of sets of encoded data slices to reproduce the first data object as recovered data 440

In an example of operation of the balancing of the storage of the data, the transfer module 430 detects that an input/output loading level of a storage set of the plurality of storage sets is greater than a high loading threshold level. The detecting includes at least one of interpreting a system activity logging record, interpreting a loading measurement, receiving an error message, and counting data access requests. Such input/output loading may result from one or more of storing new encoded data slices and retrieving previously stored encoded data slices.

When detecting the loading level of the storage set is greater than the high loading threshold level, the transfer module 430 identifies a high-demand data object stored in the storage set. For example, the transfer module 430 counts data access requests for one or more data objects to identify the high-demand data object associated with the greatest number of access requests. Having identified the high-demand data object stored in the storage set, the transfer module 430 identifies another storage set, where the other storage set is associated with an input/output loading level that is less than the high loading threshold level.

Having identified the other storage set, the transfer module 430 identifies a low-demand data objects stored in the other storage set that is associated with a data size that is within a size threshold level of a data size of the high-demand data object. For example, the transfer module obtains slice transfer information 436 from the other storage set and the storage set to identify data sizes of stored data objects. Alternatively, the transfer module 430 issues slice transfer information 436 to the other storage set, where the slice transfer information 436 includes a request to swap the identified low-demand data object for the high-demand data object.

Having identified the low-demand data object stored in the other storage set, the transfer module 430 facilitates swapping storage of the high-demand data object in the low-demand data object between the storage set and the other storage set. For example, the transfer module recovers the high-demand data object from the storage set, stores the high-demand data object in the other storage set, recovers the low data object from the other storage set, and stores the low data object in the storage set. As another example, the transfer module 430 issues transfer slice requests to the storage set and the other storage set to request transfer of encoded data slices of the high-demand data object and the low-demand data object. Having facilitated swapping of the storage, the transfer module 430 updates an association of the high-demand data object and the low-demand data object in storage locations. The updating includes at least one of updating a directory and updating a dispersed hierarchical index associated with the stored data.

FIG. 43B is a flowchart illustrating an example of balancing loading of storage resources in accordance the present invention. The method begins or continues at step 442 where a processing module (e.g., of a transfer module) detects that a loading level of a storage set is greater than a high loading threshold level. The method continues at step 444 where the processing module identifies a high-demand data object stored in the storage set. The method continues at step 446 where the processing module determines a size of the high-demand data object. For example, the processing module accesses a storage record within a storage unit of the storage set.

The method continues at step 448 where the processing module identifies another storage set that is associated with a loading level that is less than the high loading threshold level. The method continues at step 450 where the processing module identifies a low-demand data object stored in the other storage said that is associated with a size that is within a size threshold level of a size of the high-demand data object.

The method continues at step 452 where the processing module facilitates swapping storage of the high-demand data object in the low-demand data object between the storage set and the other storage set. For example, the processing module directly moves data objects by retrieving and storing encoded data slices. As another example, the processing module issues transfer encoded data slice commands. The method continues at step 454 where the processing module updates a record that associates data objects in storage set identifiers. For example, the processing module associates the high-demand data object with the other storage set, disassociates the high-demand data object from the storage set, associates the low-demand data object with the storage set, and disassociates the low-demand data object with the other storage set.

FIG. 44A is a schematic block diagram of another embodiment of a dispersed storage network (DSN) that includes a rebuilding module 460, the network 24 of FIG. 1, and a set of distributed storage and task (DST) execution (EX) units implemented at sites 1-3. Alternatively, the DST execution units may be implemented at any number of sites. Each DST execution unit may be implemented utilizing the DST execution unit 36 of FIG. 1. The rebuilding module 460 includes the DST client module 34 of FIG. 1 and the memory 88 of FIG. 3. The rebuilding module 460 may be implemented utilizing at least one of the DST processing unit 16 of FIG. 1, any one or more DST execution units of the DSN, and the DST integrity processing unit 20 of FIG. 1. The DSN functions to rebuild an encoded data slice to produce a rebuilt encoded data slice when a storage error is detected for data stored as a plurality of sets of encoded data slices 1-*n* in the set of DST execution units 1-*n*.

In an example of operation of the rebuilding of the encoded data slice, the DST client module 34 of the rebuilding module identifies the encoded data slice associated with a detected storage error, where a data segment is dispersed storage error encoded to produce a set of encoded data slices that includes the encoded data slices and where the set of encoded data slices is stored in the set of DST execution units and where the set of DST execution units is associated with a plurality of associate a network topology configurations (e.g., number of DST execution units per site). The identifying includes at least one of detecting a missing encoded data slice, detecting a corrupted slice, receiving an indication of error, and interpreting an error message.

Having identified the encoded data slice associated with the detected storage error, the DST client module 34 determines a time frame for replacement of the encoded data slice with the rebuild encoded data slice. For example, the DST client module 34 determines how long postponement of rebuilding can be to achieve a desired level of retrieval reliability. The determining may be based on one or more of historical rebuilding records, historical data retrieval reliability records, a goal for retrieval reliability, and availability status of the DST execution units.

Having determined the time frame for replacement of the encoded data slice, the DST client module 34 determines a plurality of expected loading levels versus time over the time frame for the plurality of associated network topology configurations. For example, the DST client module 34 obtains expected loading information for each DST execution unit.

For each of the plurality of associated network topology configurations, the DST client module 34 identifies a sub-time frame of the time frame associated with an expected loading level that is less than a high loading threshold level. For example, the DST client module 34 identifies the sub-time frames from received expected loading information from each of the DST execution units.

Having identified the sub-time frame, the DST client module 34 generates a rebuilding schedule where the rebuilding schedule identifies when, over the time frame, to access each of the plurality of associated network topology configurations to gather slice rebuilding information 464 based on the identified sub-time frame of the associated network topology. For example, the DST client module 34 identifies that a sub time frame at t1 shall be utilized to acquire slice rebuilding information 1 from DST execution unit 1 at site 1, identifies that a sub time frame at t2 shall be utilized to acquire slice rebuilding information 2 from DST execution units 2-4 at site 2, and identifies that a sub time frame at t3 shall be utilized to acquire slice rebuilding information 3 from DST execution units 5-*n* at site 3 such that an extra burden of processing slice rebuilding information requests 462 can be accommodated in light of other loading of the set of DST execution units.

Having generated the rebuilding schedule, for each of the plurality of associated network topology configurations, the DST client module 34 obtains the slice rebuilding information 464 in accordance with the rebuilding schedule. For example, the DST client module 34 issues, via the network 24, a slice rebuilding information request 1 at time t1 to DST execution unit 1 at site 1, receives slice rebuilding information 1 as slice rebuilding information, and stores the slice rebuilding information 1 in the memory 88; issues, via the network 24, a slice rebuilding information request 2 at time t2 to DST execution unit 2 at site 2, receives slice rebuilding information 2 as further slice rebuilding information, and stores the slice rebuilding information 2 in the memory 88; issues, via the network 24, a slice rebuilding information request 3 at time t3 to DST execution unit 5 at site 3, receives slice rebuilding information 3 as still further slice rebuilding information, and stores the slice rebuilding information 3 in the memory 88.

The slice rebuilding information 464 includes at least one of a retrieved encoded data slice and a partially encoded data slice for the encoded data slice associated with the storage error based on one or more locally stored encoded data slices. For example, the slice rebuilding information 2 includes encoded data slice 2 and 4 when encoded data slice 3 is not available. As another example, the slice rebuilding information 2 includes a partially encoded data slice for the encoded data slice of the storage error based on the encoded data slices 2 and 4. For instance, DST execution unit 2 generates a first partially encoded data slice for the encoded data slice 3 associated with the storage error based on the encoded data slice 2, DST execution unit 4 generates a second partially encoded data slice for the encoded data slice 3 based on the encoded data slice 4, and DST execution unit 2 performs an exclusive OR function on the first and second partial encoded data slices to produce the slice rebuilding information 2.

Generating of a partially encoded data slice includes obtaining an encoding matrix utilized to generate the encoded data slice to be rebuilt, reducing the encoding matrix to produce a square matrix that exclusively includes rows associated with a decode threshold number of storage units, inverting the square matrix to produce an inverted matrix, matrix multiplying the inverted matrix by a locally stored encoded data slice associated with the storage unit to produce a vector, and matrix multiplying the vector by a row of the encoding matrix corresponding to the encoded data slice to be rebuilt to produce the partial encoded data slice.

When receiving a sufficient amount of slice rebuilding information 464, the DST client module 34 of the rebuilding module 460 generates the rebuilt encoded data slice using the slice rebuilding information 464 (e.g., retrieved from the memory 88). For example, when receiving encoded data slices as the slice rebuilding information, the DST client module 34 dispersed storage error decodes a decode threshold number of received encoded data slices to produce a recovered data segment and dispersed storage error encodes the recovered data segment to produce the rebuilt encoded data slice. As another example, when receiving partially encoded data slices as the sliced rebuilding information, the DST client module 34 performs the exclusive OR function on the partially encoded data slices to produce the rebuilt encoded data slice.

Having produced the rebuilt encoded data slice, the DST client module 34 facilitates storage of the rebuilt encoded data slice. For example, the DST client module 34 issues, via the network 24, a write slice request to DST execution unit 3, where the write slice request includes the rebuilt encoded data slice.

FIG. 44B is a flowchart illustrating an example of rebuilding an encoded data slice in accordance the present invention. The method begins or continues at step 466 where a processing module (e.g., of a distributed storage and task (DST) client module) identifies an encoded data slice associated with a detected storage error, where the encoded data slices stored in a storage unit of a group of storage units where a set of storage units includes a plurality of groups of storage units. The method continues at step 468 where the processing module determines a time frame for replacement of the encoded data slice with a rebuilt encoded data slice. For example, the processing module utilizes a predetermined maximum time frame value from a system registry.

For each group of storage units, the method continues at step 470 where the processing module determines an expected loading level over the time frame. For example, the processing module identifies a current loading level. As another example, the processing module interprets a historical loading level record. For each group of storage units, the method continues at step 472 where the processing module identifies a sub-timeframe of the timeframe where the sub-timeframe is associated with an expected loading level that is less than a high loading threshold level. For example, the processing module identifies a lightly loaded sub-timeframe. The method continues at step 474 where the processing module generates a rebuilding schedule based on the identified sub-time frames. For example, the processing module schedules retrieval of encoded data slice rebuilding information when lightly loaded for each group of storage units.

For each group of storage units, the method continues at step 476 where the processing module obtains slice rebuilding information in accordance with the rebuilding schedule. For example, the processing module issues a slice rebuilding information request at a time frame of the rebuilding schedule and receives the slice rebuilding information.

When receiving a sufficient amount of slice rebuilding information (e.g., a decode threshold number of encoded data slices, one or more partial encoded data slices that represents at least a decode threshold number of partial encoded data slices), the method continues at step 478 where the processing module generates the rebuilt encoded data slices using the received slice rebuilding information. For example, the processing module decodes the received slice rebuilding information to produce the rebuilt encoded data slice. The method continues at step 480 where the processing module facilitates storage of the rebuilt encoded data slice.

FIGS. 45A-C are a schematic block diagram of another embodiment of a dispersed storage network (DSN) that includes the distributed storage and task (DST) client module 34 of FIG. 1, the network 24 of FIG. 1, and a storage set 490. The storage set 490 includes a set of DST execution (EX) units. The storage set 490 may include a number of DST execution units in accordance with a width of dispersed storage error encoding parameters, where the dispersed storage error encoding parameters includes the width number and a decode threshold number. For instance, the storage set 490 includes DST execution units 1-9. Alternatively, the storage set 490 may include any number of DST execution units. Each DST execution unit may be implemented utilizing the DST execution unit 36 of FIG. 1. Hereafter, each DST execution unit may be referred to interchangeably as a storage unit and the storage set 490 may be interchangeably referred to as a set of storage units. The DST client module 34 includes the inbound DST processing 82 of FIG. 3 and one or more outbound DST processings 1-2. Each outbound DST processing may be implemented utilizing the outbound DST processing 80 of FIG. 3. Alternatively two or more DST client modules 34 may be utilized to implement the one or more outbound DST processings. The DSN functions to store data in the storage set and to verify a status level (e.g., revision level) of stored encoded data slices to facilitate further storage and subsequent recovery of revision compliant (e.g., a desired revision level) stored data from the storage set 490.

FIG. 45A illustrates steps of an example of operation of the verifying of the status level of the stored encoded data slices where each outbound DST processing 1-2 dispersed storage error encodes a common data object of different revisions (e.g., data object A revision 1, a data object A revision 2) using the dispersed storage error encoding parameters to produce one or more of sets of encoded data slices 1-9. For example, the outbound DST processing 1 divides the data object A revision 1 into a plurality of data segments and encodes a data segment of the plurality of data segments of the data object A revision 1 in accordance with the dispersed storage error encoding parameters to produce a set of encoded data slices that includes encoded data slice 1 revision 1 through encoded data slice 9 revision 1. The dispersed storage error encoding parameters includes the decode threshold number and the width number, where the decode threshold number corresponds to a minimum number of encoded data slices of the set of encoded data slices that are needed to recover the data segment. The width number corresponds to a total number of encoded data slices in the set of encoded data slices and the decode threshold number is less than or equal to one-half of the width number (e.g., a replication-type information dispersal algorithm (IDA) and/or dispersed storage error coding function). As such, it is possible to simultaneously recover data from two or more groups of a decode threshold number of encoded data slices of each set of encoded data slices where each group of a decode threshold number of encoded data slices may be associated with a common or a different revision level.

Having produced the set of encoded data slices, the outbound DST processing 1 sends, via the network 24, the set of encoded data slices to the storage set 490 for storage (e.g., where a corresponding set of slice names are also sent with the set of encoded data slices). In a similar fashion, the outbound DST processing 2 dispersed storage error encodes a data segment of the data object A revision 2 to produce another set of encoded data slices that includes encoded data slice 1 revision 2 through encoded data slice 9 revision 2. Having produced the other set of encoded data slices, the outbound DST processing 2 may send, substantially simultaneously with the sending of the set of encoded data slices by the outbound DST processing 1, via the network 24, the other set of encoded data slices to the storage set 490 for storage (e.g., where the same corresponding set of slice names are also sent with the other set of encoded data slices).

From time to time, it is possible, due to varying factors including one or more of conditions of the network 24, loading levels of DST execution units, storage or processing errors by the DST execution units, and other causes, for the different revisions of the sets of encoded data slices utilizing a common set of slice names to be stored in different storage units of the storage set 490. For instance, the revision 2 level of encoded data slices may have been successfully stored in the DST execution units 1, 2, 3, 7, 8, and 9 while the revision 1 level of encoded data slices may have been successfully stored in the DST execution units 4, 5, and 6. As such, it is possible to recover a data segment of two revisions of the data object A by retrieving and decoding two encoded data slices of DST execution units 1, 2, 3, 7, 8, and 9 or from another two encoded data slices of DST execution units 4, 5, and 6 when the decode threshold number is 2.

FIG. 45B illustrates further steps of the example of operation of the verifying of the status level of the stored encoded data slices where the inbound DST processing 82 retrieves a decode threshold number of encoded data slices of the set of encoded data slices from a first grouping of storage units of the DSN. For example, the inbound DST processing 82 issues, via the network 24, read slice requests for encoded data slices 1 and 2 to the DST execution units 1-2 and receives a first decode threshold number of encoded data slices (e.g., encoded data slice 1 revision 2 and encoded data slice 2 revision 2).

Having received the decode threshold number of encoded data slices, the inbound DST processing 82 determines whether each encoded data slice of the first decode threshold number of the encoded data slices have a same status level (e.g., same revision level, i.e., revision level 2). When each encoded data slice of the first decode threshold number of the encoded data slices have the same status level, the inbound DST processing 82 uses the first decode threshold number of encoded data slices as the decode threshold number of encoded data slices. For example, the inbound DST processing 82 uses the first decode threshold number of encoded data slices as the decode threshold number of encoded data slices when encoded data slices 1 and 2 both have the same revision level 2.

When each encoded data slice of the first decode threshold number of the encoded data slices do not have the same status level, the inbound DST processing 82 facilitates retrieving a second decode threshold number of encoded data slices and receives the second decode threshold number of encoded data slices (e.g., where at least one encoded data slice is different than the first set). When each encoded data slice of the second decode threshold number of the encoded data slices have the same status level, the inbound DST processing 82 uses the second decode threshold number of encoded data slices as the decode threshold number of encoded data slices.

FIG. 45C illustrates further steps of the example of operation of the verifying of the status level of the stored encoded data slices where, to verify that the decode threshold number of encoded data slices is of a common status level (e.g., a revision level, a version, a similar time stamp associated with a time of creation of encoded data slice, similar access permissions, etc.) as other encoded data slices of the set of encoded data slices, the inbound DST processing 82 determines a first status level indication of the retrieved decode threshold number of encoded data slices. For example, the inbound DST processing 82 identifies revision 2 as the first status level indication of the retrieved decode threshold number of encoded data slices that includes encoded data slices 1 and 2.

Having determined the first status level indication, the inbound DST processing 82 sends, via the network 24, check status request messages to a second grouping of storage units of the DSN, where a check status request message of the check status request messages is requesting that a storage unit of the second grouping of storage units provide a status level indication of one of the other encoded data slices stored by the storage unit. The inbound DST processing 82 may determine a number of encoded data slices of the other encoded data slices that is substantially equal to a read check number, where the read check number is in a range of numbers between the decode threshold number and the width number minus the decode threshold number. The determining may be based on one or more of achieving a satisfactory level of accuracy of predicting the indication of the common status level. For example, the inbound DST processing 82 determines the read check number to be 8 when the width is 9 when a highest level of accuracy is desired. As another example, the inbound DST processing 82 determines the read check number to be 6 when understanding the status level indication of 6 of 9 encoded data slices is sufficient. For instance, the inbound DST processing 82 establishes the number of check status request messages as 4 when the read check number is 6 and the decode threshold number is 2.

As an example of the sending of the check status request messages, the inbound DST processing 82 sends, via the network 24, four check requests 3-6 (e.g., that includes slice names corresponding to encoded data slices 3-6) to the corresponding DST execution units 3-6. Subsequent to sending the check status request messages, the inbound DST processing 82 receives, via the network 24, check status response messages, where a check status response message of the check status response messages includes the status level indication of the one of the other encoded data slices. For example, the inbound DST processing 82 receives check responses 3-6, where the check responses 3-6 indicates that DST execution unit 3 is storing encoded data slice 3 revision 2, DST execution unit 4 is storing encoded data slice 4 revision 1, DST execution unit 5 is storing encoded data slice 5 revision 1, and DST execution unit 6 is storing encoded data slice 6 revision 1.

Having received the check status response messages, the inbound DST processing 82 processes the check response messages to produce a second status level indication. For example, the inbound DST processing 82 processes the check responses (e.g., indicating one revision 2 and three revision 1's) to produce the second status level indication that includes an indication of revision 1 when at least a decode threshold number of encoded data slices associated with revision 1 are present. As another example, the inbound DST processing 82 processes the check responses to produce the second status level indication that includes an indication of revision 2 when revision 2 is a highest revision level of the received check responses (e.g., which does not conflict with the first status level indication).

When the second status level indication is substantially equal to the first status level indication, the inbound DST processing 82 indicates that the decode threshold number of encoded data slices is of the common status level as the other encoded data slices. When the decode threshold number of encoded data slices is of the common status level as the other encoded data slices, the inbound DST processing 82 may decode the decode threshold number of encoded data slices to recover the data segment contribute to producing recovered data 492.

When the second status level indication is not substantially equal to the first status level indication, the inbound DST processing 82 determines whether to maintain in the first and second groupings of storage units encoded data slices having different status level indications (e.g., to keep different revisions, or versions) or to update the encoded data slices having different status level indications (e.g., update all to a most current revision level or version). For example, when the second status level indication is greater than the first status level indication, the inbound DST processing 82 sends, via the network 24, a new retrieval request for the decode threshold number of encoded data slices having the second status level indication to the second grouping of storage units of the DSN (e.g., second group includes at least one different storage unit than the first group). For instance, the inbound DST processing 82 retrieves encoded data slices 4 and 5 associated with revision 1.

As another example of determining whether to maintain encoded data slices having different status level indications, when the second status level indication is less than the first status level indication, the inbound DST processing 82 determines whether to retrieve the decode threshold number of the other encoded data slices (e.g., when desiring both revisions). The determining may be based on one or more of data concurrency of the data object, time concurrency of write requests of the data segment (e.g., overlapping write requests where the first and second revs have different data), a request for all status levels of the data segment, and user identifiers of the first and second status levels of the data segment (e.g., an inter-dependency between users to insure that they each see revisions made by the other). When the determination is to retrieve the decode threshold number of the other encoded data slices, the inbound DST processing 82 retrieves, via the network 24, the decode threshold number of the other encoded data slices (e.g., encoded data slices 4 and 5) and decodes the decode threshold number of the other encoded data slices to recover the data segment having the second status level (e.g., revision 1).

Alternatively, the inbound DST processing 82 decodes the decode threshold number of the encoded data slices to recover the data segment having the first status level and when the decode threshold number of the other encoded data slices was retrieved based on the time concurrency of write requests of the data segment, the inbound DST processing 82 merges changes of the data segment having the second status level indication into the data segment having the first status level indication. For example, merging the data segments to provide merged data revisions.

FIG. 45D is a flowchart illustrating an example of verifying a status level of stored encoded data slices in a dispersed storage network in accordance the present invention. In particular, a method is presented for use in conjunction with one or more functions and features described in conjunction with FIGS. 1-39, 45A-C, and also FIG. 45D. The method begins or continues at step 500 where a processing module of a computing device (e.g., of the distributed storage and task (DST) processing unit 16 of FIG. 1 that includes the DST client module 34 of FIG. 1) of one or more computing devices of a dispersed storage network (DSN) retrieves a decode threshold number of encoded data slices of a set of encoded data slices from a first grouping of storage units of the DSN, where a data segment of a data object is encoded in accordance with dispersed storage error encoding parameters to produce the set of encoded data slices. The dispersed storage error encoding parameters includes the decode threshold number and the width number, where the decode threshold number corresponds to a minimum number of encoded data slices of the set of encoded data slices that are needed to recover the data segment and the width number corresponds to a total number of encoded data slices in the set of encoded data slices. The decode threshold number is less than or equal to one-half of the width number.

In an example of the retrieving of the decode threshold number of encoded data slices, the processing module receives a first decode threshold number of encoded data slices, determines whether each encoded data slice of the first decode threshold number of the encoded data slices have a same status level. When each encoded data slice of the first decode threshold number of the encoded data slices have the same status level, the processing module uses the first decode threshold number of encoded data slices as the decode threshold number of encoded data slices. When each encoded data slice of the first decode threshold number of the encoded data slices do not have the same status level, the processing module receives a second decode threshold number of encoded data slices (e.g., at least one slice different than the first set). When each encoded data slice of the second decode threshold number of the encoded data slices have the same status level, the processing module uses the second decode threshold number of encoded data slices as the decode threshold number of encoded data slices.

To verify that the decode threshold number of encoded data slices is of a common status level as other encoded data slices of the set of encoded data slices, the method continues at step 502 where the processing module determines a first status level indication of the retrieved decode threshold number of encoded data slices. The method continues at step 504 where the processing module sends check status request messages to a second grouping of storage units of the DSN, where a check status request message of the check status request messages is requesting that a storage unit of the second grouping of storage units provide a status level indication of one of the other encoded data slices stored by the storage unit. A number of encoded data slices of the other encoded data slices is substantially equal to a read check number, where the read check number is in a range of numbers between the decode threshold number and the width number minus the decode threshold number.

The method continues at step 506 where the processing module receives check status response messages, where a check status response message of the check status response messages includes the status level indication of the one of the other encoded data slices. The method continues at step 508 where the processing module processes the check response messages to produce a second status level indication. When the second status level indication is not substantially equal to the first status level indication, the method branches to step 514. When the second status level indication is substantially equal to the first status level indication, the method continues to step 510.

When the second status level indication is substantially equal to the first status level indication, the method continues at step 510 where the processing module indicates that the decode threshold number of encoded data slices is of the common status level as the other encoded data slices. When the decode threshold number of encoded data slices is of the common status level as the other encoded data slices, the method continues at step 512 where the processing module decodes the decode threshold number of encoded data slices to recover the data segment.

When the second status level indication is not substantially equal to the first status level indication, the method continues at step 514 where the processing module determines whether to maintain in the first and second groupings of storage units encoded data slices having different status level indications (e.g., keep the different revisions, or versions) or to update the encoded data slices having different status level indications (e.g., update all to a most current rev level or version). When the second status level indication is less than the first status level indication, the method branches to step 518. When the second status level indication is greater than the first status level indication, the method continues to step 516.

When the second status level indication is greater than the first status level indication, the method continues at step 516 where the processing module sends a new retrieval request for the decode threshold number of encoded data slices having the second status level indication to the second grouping of storage units of the DSN. For example, the second group includes at least one different storage unit than the first group.

When the second status level indication is less than the first status level indication, the method continues at step 518 where the processing module determines whether to retrieve the decode threshold number of the other encoded data slices (e.g., when desiring both revisions). The determining may be based on one or more of data concurrency of the data object, time concurrency of write requests of the data segment (e.g., overlapping write requests where the first and second revs have different data), a request for all status levels of the data segment, and user identifiers of the first and second status levels of the data segment (e.g., an interdependency between users to insure that they each see revisions made by the other).

When the determination is to retrieve the decode threshold number of the other encoded data slices, the method continues at step 520 where the processing module retrieves the decode threshold number of the other encoded data slices. The method continues at step 522 where the processing module decodes the decode threshold number of the other encoded data slices to recover the data segment having the second status level. Alternatively, or in addition to, the processing module decodes the decode threshold number of the encoded data slices to recover the data segment having the first status level. When the decode threshold number of the other encoded data slices was retrieved based on the time concurrency of write requests of the data segment, the processing module may merge changes of the data segment having the second status level indication into the data segment having the first status level indication.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

FIG. 46A is a schematic block diagram of another embodiment of a dispersed storage network (DSN) that includes the distributed storage and task (DST) client module 34 of FIG. 1, the network 24 of FIG. 1, and a storage set 530. The storage set 530 includes a set of DST execution (EX) units 1-$n$. Each DST execution unit may be implemented utilizing the DST execution unit 36 of FIG. 1. The DST client module 34 includes the outbound DST processing 80 of FIG. 3, the memory 88 of FIG. 3, and the inbound DST processing 82 of FIG. 3. The DSN functions to capture data for storage in the set of DST execution units, where the capturing of the data may include receiving one or more of a random writes and random updated writes for produce the received portions of the data. The data may be received as at least one of a data object, a data file, and a data stream 532.

In an example of operation, the outbound DST processing 80 initiates receiving the data stream 532 for storage in the storage set 530. The outbound DST processing 80 dispersed storage error encodes a first data portion of the data stream to produce a first slice grouping includes one or more sets of encoded data slices. Having produced the first slice group, the outbound DST processing 80 facilitates storing of the first slice group in the storage set 530. For example, at time t1, the outbound DST processing 80 sends, via the network 24, the first slice group to the set of DST execution units 1-$n$ for storage.

Having facilitated storing of the first slice group, the outbound DST processing 80 receives, prior to concluding receiving of the data stream, an update to a sub-portion of the first data portion. For example, the outbound DST processing 80 receives a random overwrite for the previously received sub-portion of the first data portion.

For each set of the one or more sets of encoded data slices of the first slice group, the inbound DST processing 82 recovers at least a decode threshold number of encoded data slices. For example, the inbound DST processing 82 issues read slice requests to the storage set and receives encoded data slices of the first slice group. Having received the encoded data slices of the first slice group, the inbound DST processing 82 dispersed storage error decodes the at least a decode threshold number of received encoded data slices of each of the one or more sets of encoded data slices to reproduce the first data portion. The inbound DST processing 82 may store the recovered data portion 1 in the memory 88.

The outbound DST processing 80 updates the recovered data portion 1 with the updates to recovered data portion 1 to produce an updated data portion 1. The updating may include one or more of overwriting data of the recovered data portion 1 with the update to the sub-portion, interleaving data of the recovered data portion 1 with the update to the sub-portion, inserting the update to the sub-portion into the recovered data portion 1, and appending the update to the sub-portion to the recovered data portion 1 to produce the updated data portion 1.

Having produced the updated data portion 1, the outbound DST processing 80 dispersed storage error encodes the updated data portion 1 to produce an updated first slice group. Having produced the updated first slice group, the outbound DST processing 80 facilitates storing of the updated first slice group in the storage set 530. For example, at a time frame t2, the outbound DST processing 80 sends, via the network 24, the updated slice group 1 to the set of DST execution units 1-$n$ for storage.

When detecting conclusion of receiving of the data stream, the outbound DST processing 80 facilitates committing of the storage of the updated first slice group. For example, at a time frame t3, the outbound DST processing 80 sends, via the network 24, a commit transaction request to the set of DST execution units 1-$n$, where the commit transaction request includes a transaction number associated with the storing of the updated first slice group.

Alternatively, while receiving the first data portion, the outbound DST processing 80 stores the first data portion in the memory 88. The outbound DST processing 80 stops storing the data in the memory 88 when receiving the update to the sub-portion. When detecting conclusion of the receiving of the data stream, the outbound DST processing 80 dispersed storage error encodes the updated data portion from the memory 88 for storage in the storage set.

Alternatively, when receiving the update to the sub-portion, the inbound DST processing 82 recovers a corresponding portion of the first data portion from the storage set for modification using the update. Having modified the recovered corresponding portion of the first data portion, the outbound DST processing 80 dispersed storage error encodes the modified first data portion to produce updated encoded data slices and overwrites previously stored encoded data slices and the storage set with the updated encoded data slices.

FIG. 46B is a flowchart illustrating an example of updating captured data in accordance the present invention. The method begins or continues at step 534 where a processing module (e.g., of a distributed storage and task (DST) client module) initiates receiving a data stream for storage in a set of storage units. The initiating may include one or more of initiating a query, receiving a header, and receiving a large data file. The method continues at step 536 where the processing module dispersed storage error encodes a first data portion of the data stream to produce a first slice group, where the first slice group includes one or more sets of encoded data slices.

The method continues at step 538 where the processing module facilitates storage of the first slice group in the set of storage units. The method continues at step 540 where the processing module receives, prior to concluding receiving of the data stream, an update to a sub-portion of the first data portion. For example, the processing module receives a random write request with an indicator associated with the first data portion and/or the sub-portion of the first data portion.

The method continues at step 542 where the processing module recovers at least a decode threshold number of encoded data slices for each set of encoded data slices of the first slice group from the set of storage units. The method continues at step 544 where the processing module decodes the recovered encoded data slices to reproduce the first data portion. For example, the processing module decodes a decode threshold number of encoded data slices for each set of encoded data slices to reproduce the first data portion.

The method continues at step 546 where the processing module modifies the reproduced first data portion using the update to the sub-portion to produce an updated first data portion. The modifying includes at least one of replacing, overwriting, and appending the reproduced first data portion with the update to the sub-portion to produce the updated first data portion. The method continues at step 548 where the processing module dispersed storage error encodes the updated first data portion to produce an updated first slice group that includes an updated one or more sets of encoded data slices.

The method continues at step 550 where the processing module facilitates storage of the updated first slice group in the set of storage units. When concluding the receiving of the data stream, the method continues at step 552 where the processing module facilitates committing of the storage of the updated for slice group. For example, the processing module detects an indicator that the data stream has been received and issues a set of commit transaction requests to the set of storage units, where the set of commit transaction request includes a transaction number associated with write slice requests of the storage of the updated for slice group in the set of storage units.

FIG. 47A is a schematic block diagram of another embodiment of a dispersed storage network (DSN) that includes the outbound distributed storage and task (DST) processing 80 of FIG. 3, the network 24 of FIG. 1, and a storage set 560. The storage set 560 includes a set of DST execution (EX) units 1-*n*. Each DST execution unit may be implemented utilizing the DST execution unit 36 of FIG. 1. The outbound DST processing 80 includes the data partition 110 of FIG. 4, a dispersed storage (DS) error encoding 1, a dispersed storage (DS) error encoding 2, and an auxiliary data generator module 562. The auxiliary data generator module 562 may be implemented utilizing the processing module 84 of FIG. 3. The DS error encoding 1 and the DS error encoding 2 may be implemented utilizing the DS error encoding 112 of FIG. 4. The DSN functions to store data 564 and associated auxiliary data 574 in the storage set 560.

In an example of operation, the outbound DST processing 80 receives the data 564 for storage. Having received the data 564 for storage, the auxiliary data generator module 562 processes one or more of the data 564 and other data 572 to produce the auxiliary data 574. The other data 572 may include one or more of a requesting entity identifier, a data owner identifier, a timestamp, and an identifier associated with the data. The processing includes one or more of counting bytes of the data to produce a data size indicator, performing a hashing function over the data to produce a hash value, appending the other data, and analyzing the data to produce a data type indicator.

The DS error encoding 2 dispersed storage error encodes the auxiliary data 574 to produce auxiliary data slices 576. The outbound DST processing 80 obtains a DSN address 566 for storage of the auxiliary data. For example, the outbound DST processing 80 generates slice names for the auxiliary data slices based on the data identifier of the data. As another example, the outbound DST processing 80 generates slice names for the auxiliary data slices based on a random number.

The outbound DST processing 80 sends, via the network 24, the auxiliary data slices 576 to the storage set 560 for storage using the DSN address of the auxiliary data 566. For example, the outbound DST processing 80 generates a set of write slice requests that includes the slice names for the auxiliary data slices and the auxiliary data slices 576, sends, via the network 24, the write slice requests to the set of DST execution units 1-*n*.

The data partitioning 110 generates data partitions 120 to include a plurality of data segments from the data 564 and the DSN address of the auxiliary data 566, where at least one data segment includes the DSN address of the auxiliary data 566. For example, the data partition 110 generates a first data segment to include the DSN address of the auxiliary data 566 and a first data portion to complete the first data segment, and generates data segments 2-Y from remaining data portions of the data such that each data segment is substantially a same size.

The outbound DST processing 80 facilitates storage of the data partitions 120 in the storage set. For example, for each data segment of the Y data segments, the DS error encoding 1 dispersed storage error encodes the data segment to produce a set of encoded data slices of Y sets of encoded data slices 570. The outbound DST processing 80 sends, via the network 24, the Y sets of encoded data slices 570 to the storage set 560 for storage. For example, the outbound DST processing 80 generates a set of write slice requests to include the Y sets of encoded data slices, and sends, via the network 24, the set of write slice requests to the set of DST execution units 1-n. When retrieving the data 564, the first data segment is recovered, the DSN address of the auxiliary data is extracted from the first data segment, and the auxiliary data is recovered using the extracted DSN address of the auxiliary data.

FIG. 47B is a flowchart illustrating an example of associating storage of data and auxiliary data in a dispersed storage network in accordance the present invention. The method begins or continues at step 578 where a processing module (e.g., of an outbound distributed storage and task (DST) processing module) receives data for storage in a set of storage units of a dispersed storage network (DSN) memory. The method continues at step 580 where the processing module processes the data to produce auxiliary data. For example, the processing module analyzes the data to produce the interim auxiliary data and integrates other data with the interim auxiliary data to produce the auxiliary data.

The method continues at step 582 where the processing module obtains a DSN address for storage of the auxiliary data. For example, the processing module generates a new DSN address based on a vault identifier associated with storage of the data and a random number. The method continues at step 584 where the processing module facilitate storage of the auxiliary data in the set of storage units using the DSN address for storage of the auxiliary data. For example, the processing module generates a set of slice names based on the DSN address for storage of the auxiliary data, dispersed storage error encodes the auxiliary data to produce a set of encoded auxiliary data slices, generates a set of write slice requests to include the set of slice names and the set of encoded auxiliary data slices, and sends the set of write slice requests to the set of storage units.

The method continues at step 586 where the processing module generates a plurality of data segments from the data in the DSN address of the auxiliary data, where at least one data segment includes the DSN address of the auxiliary data. For example, the processing module selects a data segment for inclusion of the DSN address of the auxiliary data, partitions the data to produce the plurality of data segments for the selected data segment includes the DSN address of the auxiliary data, and where each data segment is substantially a same size.

The method continues at step 588 where the processing module facilitates storage of the plurality of data segments in the set of storage units. For example, for each data segment, the processing module disperse storage error encodes the data segment to produce a set of encoded data slices, and sends the set of encoded data slices to the set of storage units.

FIG. 48A is a diagram of an embodiment of a backup file system structure that includes a temporary report for a data file group, one or more backup files, and a master index file. The backup file system structure may be utilized to periodically, from time to time, produce a backup record of the data file group (e.g., archiving storage of a copy of at least part of the data file group), where the data file group includes a plurality of affiliated data files. Such an affiliation may include one or more of a family of DSN directory files, a family of dispersed hierarchical index files, a group of data files associated with a particular user of a dispersed storage network, a group of data files associated with a particular group of users of the dispersed storage network, etc.

Each data file is associated with a name of the data file. For example, at a time t0 data file group includes data file 1 with an associated name of the data file 1, a data file 2 with an associated name of the data file 2, and a data file 3 with an associated name of the data file 3.

In an example of operation of an initial generation of the backup file system structure, at time t0, a processing module of a dispersed storage network (DSN) generates a temporary report for the data file group. The temporary report includes each name of each data file and, for each name, a corresponding hash value of the data file associated with the name. For example, the processing module performs a hashing function on data file 1 to produce the hash of data file 1, and associates a hash of the data file 1 with the name of the data file 1.

Having produced the temporary report for the data file group, the processing module generates a first backup file, at time t0, by including each data file of the data file group and each associated hash value of each data file. For example, the processing module generates the backup file 1 to include the data file 1 and the associated hash of data file 1, the data file 2 and the associated hash of data file 2, and the data file 3 and the associated hash of data file 3. Having produced the backup file 1, the processing module facilitates storage of the backup file 1 in a dispersed storage network memory. For example, the processing module dispersed storage error encodes the backup file 1 to produce a plurality of sets of encoded backup file slices, sends the plurality of sets of encoded backup file slices to the DSN memory for storage using a DSN address for storage of the backup file 1, and updates a DSN directory to associate the DSN address for storage of the backup file 1 with a name of the backup file 1.

Having generated the backup file 1, the processing module creates the master index file at time t0. The processing module generates the master index file to include a series of entries where each entry includes a name of a data file, a name of the corresponding backup file that includes the data file associated with the name of the data file, and the hash of the data file. For example, the processing module generates a first entry of the master index file to include the name of the data file 1, the name of the backup file 1, and the hash of the data file 1; generates a second entry of the master index file to include the name of the data file 2, the name of the backup file 1, and the hash of the data file 2; and generates a third entry of the master index file to include the name of the data file 3, the name of the backup file 1, and the hash of the data file 3.

Having generated the master index file, the processing module facilitates storage of the master index file in the DSN memory. For example, the processing module dispersed storage error encodes the master index file to produce at least one set of encoded index file slices and sends the at least one set of encoded index file slices to the DSN memory for storage using a DSN address associated with the master index file (e.g., a predetermined DSN address).

In an example of operation of updating of the backup file system structure, at time t1, the processing module generates an updated temporary report for the data file group. For example, the processing module performs the hashing function on a newly updated data file 2 to produce a new hash of new data file 2 and creates a first entry to include the new hash of new data file 2 and the name of data file 2; performs the hashing function on the data file 3 to produce a hash of data file 3 and creates a second entry to include the hash of data file 3 and the name of data file 3; and performs the hashing function on a data file 4 to produce a hash of data file 4 and creates a third entry to include the hash of data file 4 and the name of data file 4 when, between time t0 and t1, data file 1 has been removed from the data file group, a data file 2 has been updated, data file 3 remains, and data file 4 has been added to the data file group.

Having produced the updated temporary report for the data file group, the processing module generates a second backup file, at time t1, by generating an entry for each newly added data file and each updated data file. For example, the processing module generates the backup file 2 to include a first entry that includes the new hash of data file 2 and the new data file 2; and the hash of data file 4 and the data file 4. Having produced the backup file 2, the processing module facilitates storage of the backup file 2 in the DSN memory. For example, the processing module dispersed storage error encodes the backup file 2 to produce another plurality of sets of encoded backup file slices, sends the other plurality of sets of encoded backup file slices to the DSN memory for storage using another DSN address for storage of the backup file 2, and updates a DSN directory to associate the DSN address for storage of the backup file 2 with a name of the backup file 2.

Having generated the backup file 2, the processing module updates the master index file at time t1. The processing module recovers the master index file from the DSN memory and updates the recovered master index file to produce an updated master index file. The processing module updates the master index file to include an entry corresponding to each data file that currently belongs to the data file group. For example, the processing module updates the master index file to include a first entry that includes the name of the data file 2, the name of the backup file 2, and the new hash of the data file 2; maintains a second entry of the master index file to include the name of the data file 3, the name of the backup file 1, and the hash of the data file 3; generates a new third entry of the master index file to include the name of the data file 4, the name of the backup file 2, and the hash of the data file 4.

Having generated the updated master index file, the processing module facilitates storage of the updated master index file in the DSN memory using the DSN address associated with the master index file. For example, the processing module dispersed storage error encodes the updated master index file to produce at least one set of updated encoded index file slices and sends the at least one set of updated encoded index file slices to the DSN memory for storage using the DSN address associated with the master index file.

The processing module may restore a corrupted or missing data file of the data file group by accessing the master index file from the DSN memory and accessing and associated backup file to recover the data file. Alternatively, or in addition to, the processing module may delete a backup file when each data file is no longer required. For example, the processing module deletes file 1 when data file 3 is no longer required (e.g., since data file 1 has already been removed from the data file group and data file 2 has been modified).

FIG. 48B is a flowchart illustrating an example of performing an efficient backup of a group of data files using a dispersed storage network in accordance the present invention. The method begins or continues at step 590 where a processing module (e.g., of a distributed storage and task (DST) client module), for each data file of the data file group, performs a hashing function on the data file to produce a hash value of the data file where each data file has a name of the data file. For example, the processing module searches a data file group to identify each data file and data file name. For instance, the processing module searches a dispersed storage network directory. As another example, the processing module searches a dispersed hierarchical index to obtain each node file of the index. Alternatively, the processing module performs an integrity function on the data file to produce an integrity check value. The integrity function includes at least one of a deterministic function, a hash-based message authentication code function, a mask generating function, a cyclic redundancy check function, and a sponge function.

The method continues at step 592 where the processing module recovers a backup record from a dispersed storage network (DSN) memory, where the backup record includes a name of a backed up data file, a name of a backup file that includes a backed up data file, and a hash value of the backed up data file. For example, the processing module obtains a DSN address for the backup record (e.g., based on a lookup, based on accessing the dispersed hierarchical index, based on accessing a directory, based on accessing a portion of the system registry), issues a set of read slice requests to the DSN memory using the DSN address for the backup record, receives at least a decode threshold number of encoded backup record slices, and dispersed storage error decodes the decode threshold number of encoded backup record slices to reproduce the backup record.

The method continues at step 594 where, for each pairing of name of the data file and the corresponding hash value, the processing module determines whether a similar pairing exists for a previous backup based on the backup record. For example, the processing module indicates that a new version of a data file exists when a data file name matches but a data file hash does not. As another example, the processing module indicates a new data file when a data file name of the data file group does not match any data file name of the backup record. As yet another example, the processing module indicates no changes to an existing file when a pairing matches.

For each pairing without a similar pairing of the previous backup, the method continues at step 596 where the processing module generates a new backup file to include the data file in the corresponding hash value. For example, the processing module generates the new backup file to include the data file and the corresponding hash value for each modified or new data file. The method continues at step 598 where the processing module facilitates storage of the new backup file in the DSN memory. For example, the processing module encodes the new backup file to produce a set of encoded backup file slices, obtains a name of the new backup file, generates a set of slice names based on the name of the new backup file, and issues read slice requests to the DSN memory, where the write slice requests includes the set of slice names and the set of encoded backup file slices.

The method continues at step 600 where the processing module updates the backup record to include the pairing without the similar pairing of the previous backup in the name of the new backup file. For example, the processing module includes the non-matching hash value, the name of the corresponding data file, in the name of the new backup file. The processing module stores the updated backup record in the DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
   retrieving a decode threshold number of encoded data slices of a set of encoded data slices from a first grouping of storage units of the DSN, wherein a data segment of a data object is encoded in accordance with dispersed storage error encoding parameters to produce the set of encoded data slices, wherein the dispersed storage error encoding parameters includes the decode threshold number and a width number, wherein the decode threshold number corresponds to a minimum number of encoded data slices of the set of encoded data slices that are needed to recover the data segment, wherein the width number corresponds to a total number of encoded data slices in the set of encoded data slices, and wherein the decode threshold number is less than or equal to one-half of the width number; and
   to verify that the decode threshold number of encoded data slices is of a common status level as other encoded data slices of the set of encoded data slices:
      determining a first status level indication of the retrieved decode threshold number of encoded data slices;
      sending check status request messages to a second grouping of storage units of the DSN, wherein a check status request message of the check status request messages is requesting that a storage unit of the second grouping of storage units provide a status level indication of one of the other encoded data slices stored by the storage unit, wherein the second grouping of storage units store remaining encoded data slices of the set of encoded data slices, wherein the remaining encoded data slices is the total number of encoded data slices less the decode threshold number of encoded data slices;
      receiving check status response messages from the second grouping of storage units, wherein a check status response message of the check status response messages includes the status level indication of the one of the other encoded data slices;
      processing the check response messages to produce a second status level indication;
      when the second status level indication is greater than the first status level indication, sending a new retrieval request for the decode threshold number of encoded data slices having the second status level indication to the second grouping of storage units of the DSN; and
      when the second status level indication is substantially equal to the first status level indication, indicating that the decode threshold number of encoded data slices is of the common status level as the other encoded data slices.

2. The method of claim 1, wherein the retrieving the decode threshold number of encoded data slices comprises:
   receiving a first decode threshold number of encoded data slices;
   determining whether each encoded data slice of the first decode threshold number of the encoded data slices have a same status level;
   when each encoded data slice of the first decode threshold number of the encoded data slices have the same status level, using the first decode threshold number of encoded data slices as the decode threshold number of encoded data slices; and
   when each encoded data slice of the first decode threshold number of the encoded data slices do not have the same status level,
      receiving a second decode threshold number of encoded data slices; and
      when each encoded data slice of the second decode threshold number of the encoded data slices have the same status level, using the second decode threshold number of encoded data slices as the decode threshold number of encoded data slices.

3. The method of claim 1 further comprises:
   when the decode threshold number of encoded data slices is of the common status level as the other encoded data slices, decoding the decode threshold number of encoded data slices to recover the data segment.

4. The method of claim 1 further comprises:
   when the second status level indication is less than the first status level indication, determining whether to retrieve the decode threshold number of the other encoded data slices; and
   when the determination is to retrieve the decode threshold number of the other encoded data slices:
      retrieving the decode threshold number of the other encoded data slices; and
      decoding the decode threshold number of the other encoded data slices to recover the data segment having the second status level.

5. The method of claim 4 further comprises:
   determining to retrieve the decode threshold number of the other encoded data slices based on one or more of:
   data concurrency of the data object;
   time concurrency of write requests of the data segment;
   a request for all status levels of the data segment; and
   user identifiers of the first and second status levels of the data segment.

6. The method of claim 5 further comprises:
   decoding the decode threshold number of the encoded data slices to recover the data segment having the first status level; and
   when the decode threshold number of the other encoded data slices was retrieved based on the time concurrency of write requests of the data segment, merging changes of the data segment having the second status level indication into the data segment having the first status level indication.

7. The method of claim 1 further comprises:
   a number of encoded data slices of the other encoded data slices is substantially equal to a read check number, wherein the read check number is in a range of numbers between the decode threshold number and the width number minus the decode threshold number.

8. The method of claim 1 further comprises:
when the second status level indication is not substantially equal to the first status level indication, determining whether to maintain in the first and second groupings of storage units encoded data slices having different status level indications or to update the encoded data slices having different status level indications.

9. A non-transitory computer readable storage medium comprises:
at least one memory section that stores operational instructions that, when executed by one or more processing modules of one or more computing devices of a dispersed storage network (DSN), causes the one or more computing devices to:
retrieve a decode threshold number of encoded data slices of a set of encoded data slices from a first grouping of storage units of the DSN, wherein a data segment of a data object is encoded in accordance with dispersed storage error encoding parameters to produce the set of encoded data slices, wherein the dispersed storage error encoding parameters includes the decode threshold number and a width number, wherein the decode threshold number corresponds to a minimum number of encoded data slices of the set of encoded data slices that are needed to recover the data segment, wherein the width number corresponds to a total number of encoded data slices in the set of encoded data slices, and wherein the decode threshold number is less than or equal to one-half of the width number; and
to verify that the decode threshold number of encoded data slices is of a common status level as other encoded data slices of the set of encoded data slices:
determine a first status level indication of the retrieved decode threshold number of encoded data slices;
send check status request messages to a second grouping of storage units of the DSN, wherein a check status request message of the check status request messages is requesting that a storage unit of the second grouping of storage units provide a status level indication of one of the other encoded data slices stored by the storage unit, wherein the second grouping of storage units store remaining encoded data slices of the set of encoded data slices, wherein the remaining encoded data slices is the total number of encoded data slices less the decode threshold number of encoded data slices;
receive check status response messages from the second grouping of storage units, wherein a check status response message of the check status response messages includes the status level indication of the one of the other encoded data slices;
process the check response messages to produce a second status level indication;
when the second status level indication is greater than the first status level indication, sending a new retrieval request for the decode threshold number of encoded data slices having the second status level indication to the second grouping of storage units of the DSN; and
when the second status level indication is substantially equal to the first status level indication, indicate that the decode threshold number of encoded data slices is of the common status level as the other encoded data slices.

10. The non-transitory computer readable storage medium of claim 9, wherein the one or more processing modules functions to execute the operational instructions stored by the at least one memory section to cause the one or more computing devices of the DSN to retrieve the decode threshold number of encoded data slices by:
receiving a first decode threshold number of encoded data slices;
determining whether each encoded data slice of the first decode threshold number of the encoded data slices have a same status level;
when each encoded data slice of the first decode threshold number of the encoded data slices have the same status level, using the first decode threshold number of encoded data slices as the decode threshold number of encoded data slices; and
when each encoded data slice of the first decode threshold number of the encoded data slices do not have the same status level,
receiving a second decode threshold number of encoded data slices; and
when each encoded data slice of the second decode threshold number of the encoded data slices have the same status level, using the second decode threshold number of encoded data slices as the decode threshold number of encoded data slices.

11. The non-transitory computer readable storage medium of claim 9 further comprises:
the at least one memory section stores further operational instructions that, when executed by the one or more processing modules, causes the one or more computing devices of the DSN to:
when the decode threshold number of encoded data slices is of the common status level as the other encoded data slices, decode the decode threshold number of encoded data slices to recover the data segment.

12. The non-transitory computer readable storage medium of claim 9 further comprises:
the at least one memory section stores further operational instructions that, when executed by the one or more processing modules, causes the one or more computing devices of the DSN to:
when the second status level indication is less than the first status level indication, determine whether to retrieve the decode threshold number of the other encoded data slices; and
when the determination is to retrieve the decode threshold number of the other encoded data slices:
retrieve the decode threshold number of the other encoded data slices; and
decode the decode threshold number of the other encoded data slices to recover the data segment having the second status level.

13. The non-transitory computer readable storage medium of claim 12 further comprises:
the at least one memory section stores further operational instructions that, when executed by the one or more processing modules, causes the one or more computing devices of the DSN to:
determine to retrieve the decode threshold number of the other encoded data slices based on one or more of:
data concurrency of the data object;
time concurrency of write requests of the data segment;
a request for all status levels of the data segment; and
user identifiers of the first and second status levels of the data segment.

14. The non-transitory computer readable storage medium of claim 13 further comprises:

the at least one memory section stores further operational instructions that, when executed by the one or more processing modules, causes the one or more computing devices of the DSN to:
decode the decode threshold number of the encoded data slices to recover the data segment having the first status level; and
when the decode threshold number of the other encoded data slices was retrieved based on the time concurrency of write requests of the data segment, merge changes of the data segment having the second status level indication into the data segment having the first status level indication.

15. The non-transitory computer readable storage medium of claim 9 further comprises:
a number of encoded data slices of the other encoded data slices is substantially equal to a read check number, wherein the read check number is in a range of numbers between the decode threshold number and the width number minus the decode threshold number.

16. The non-transitory computer readable storage medium of claim 9 further comprises:
the at least one memory section stores further operational instructions that, when executed by the one or more processing modules, causes the one or more computing devices of the DSN to:
when the second status level indication is not substantially equal to the first status level indication, determine whether to maintain in the first and second groupings of storage units encoded data slices having different status level indications or to update the encoded data slices having different status level indications.

17. A computing device of a group of computing devices of a dispersed storage network (DSN), the computing device comprises:
an interface;
a local memory; and
a processing module including a processor operably coupled to the interface and the local memory, wherein the processing module functions to:
retrieve, via the interface, a decode threshold number of encoded data slices of a set of encoded data slices from a first grouping of storage units of the DSN, wherein a data segment of a data object is encoded in accordance with dispersed storage error encoding parameters to produce the set of encoded data slices, wherein the dispersed storage error encoding parameters includes the decode threshold number and a width number, wherein the decode threshold number corresponds to a minimum number of encoded data slices of the set of encoded data slices that are needed to recover the data segment, wherein the width number corresponds to a total number of encoded data slices in the set of encoded data slices, and wherein the decode threshold number is less than or equal to one-half of the width number; and
to verify that the decode threshold number of encoded data slices is of a common status level as other encoded data slices of the set of encoded data slices:
determine a first status level indication of the retrieved decode threshold number of encoded data slices;
send, via the interface, check status request messages to a second grouping of storage units of the DSN, wherein a check status request message of the check status request messages is requesting that a storage unit of the second grouping of storage units provide a status level indication of one of the other encoded data slices stored by the storage unit, wherein the second grouping of storage units store remaining encoded data slices of the set of encoded data slices, wherein the remaining encoded data slices is the total number of encoded data slices less the decode threshold number of encoded data slices;
receive, via the interface, check status response messages from the second grouping of storage units, wherein a check status response message of the check status response messages includes the status level indication of the one of the other encoded data slices;
process the check response messages to produce a second status level indication;
when the second status level indication is greater than the first status level indication, sending a new retrieval request for the decode threshold number of encoded data slices having the second status level indication to the second grouping of storage units of the DSN; and
when the second status level indication is substantially equal to the first status level indication, indicate that the decode threshold number of encoded data slices is of the common status level as the other encoded data slices.

18. The computing device of claim 17, wherein the processing module functions to retrieve the decode threshold number of encoded data slices by:
receiving, via the interface, a first decode threshold number of encoded data slices;
determining whether each encoded data slice of the first decode threshold number of the encoded data slices have a same status level;
when each encoded data slice of the first decode threshold number of the encoded data slices have the same status level, using the first decode threshold number of encoded data slices as the decode threshold number of encoded data slices; and
when each encoded data slice of the first decode threshold number of the encoded data slices do not have the same status level,
receiving, via the interface, a second decode threshold number of encoded data slices; and
when each encoded data slice of the second decode threshold number of the encoded data slices have the same status level, using the second decode threshold number of encoded data slices as the decode threshold number of encoded data slices.

19. The computing device of claim 17, wherein the processing module further functions to:
when the decode threshold number of encoded data slices is of the common status level as the other encoded data slices, decode the decode threshold number of encoded data slices to recover the data segment.

20. The computing device of claim 17, wherein the processing module further functions to:
when the second status level indication is less than the first status level indication, determine whether to retrieve the decode threshold number of the other encoded data slices; and
when the determination is to retrieve the decode threshold number of the other encoded data slices:
retrieve, via the interface, the decode threshold number of the other encoded data slices; and decode the decode threshold number of the other encoded data slices to recover the data segment having the second status level.

21. The computing device of claim 20, wherein the processing module further functions to:
   determine to retrieve the decode threshold number of the other encoded data slices based on one or more of:
      data concurrency of the data object;
      time concurrency of write requests of the data segment;
      a request for all status levels of the data segment; and
      user identifiers of the first and second status levels of the data segment.

22. The computing device of claim 21, wherein the processing module further functions to:
   decode the decode threshold number of the encoded data slices to recover the data segment having the first status level; and
   when the decode threshold number of the other encoded data slices was retrieved based on the time concurrency of write requests of the data segment, merge changes of the data segment having the second status level indication into the data segment having the first status level indication.

23. The computing device of claim 17 further comprises:
   a number of encoded data slices of the other encoded data slices is substantially equal to a read check number, wherein the read check number is in a range of numbers between the decode threshold number and the width number minus the decode threshold number.

24. The computing device of claim 17, wherein the processing module further functions to:
   when the second status level indication is not substantially equal to the first status level indication, determine whether to maintain in the first and second groupings of storage units encoded data slices having different status level indications or to update the encoded data slices having different status level indications.

* * * * *